US012665461B2

(12) United States Patent
Sugita et al.

(10) Patent No.:  US 12,665,461 B2
(45) Date of Patent:  Jun. 23, 2026

(54) DRIVE DEVICE AND DRIVE DEVICE UNIT

(71) Applicant: DENSO CORPORATION, Kariya-city (JP)

(72) Inventors: Shun Sugita, Kariya-city (JP); Masaharu Sakai, Kariya-city (JP); Kazutoshi Nishinakamura, Kariya-city (JP); Jiro Hayashi, Kariya-city (JP)

(73) Assignee: DENSO CORPORATION, Kariya (JP)

( * ) Notice: Subject to any disclaimer, the term of this patent is extended or adjusted under 35 U.S.C. 154(b) by 225 days.

(21) Appl. No.: 18/599,557

(22) Filed: Mar. 8, 2024

(65) Prior Publication Data

US 2024/0213855 A1  Jun. 27, 2024

Related U.S. Application Data

(63) Continuation of application No. PCT/JP2022/036950, filed on Oct. 3, 2022.

(30) Foreign Application Priority Data

Oct. 11, 2021  (JP) ................................. 2021-166881
Jul. 28, 2022  (JP) ................................. 2022-120697

(51) Int. Cl.
| | |
|---|---|
| *H02K 5/04* | (2006.01) |
| *B64D 27/34* | (2024.01) |
| *B64D 27/357* | (2024.01) |
| *H02K 7/14* | (2006.01) |
| *H02K 9/22* | (2006.01) |
| *B64C 29/00* | (2006.01) |

(52) U.S. Cl.
CPC .............. *H02K 5/04* (2013.01); *B64D 27/34* (2024.01); *B64D 27/357* (2024.01); *H02K 7/14* (2013.01); *H02K 9/22* (2013.01); *B64C 29/0016* (2013.01)

(58) Field of Classification Search
CPC ............... H02K 9/22; H02K 5/18; H02K 9/06
USPC ........................................... 310/60 R, 89, 52
See application file for complete search history.

(56) References Cited

U.S. PATENT DOCUMENTS

| | | | |
|---|---|---|---|
| 2010/0176671 A1 | 7/2010 | Ito et al. |
| 2017/0012504 A1 | 1/2017 | Sever |
| 2019/0386537 A1 | 12/2019 | Dib et al. |

FOREIGN PATENT DOCUMENTS

| | | | |
|---|---|---|---|
| CN | 207759049 U | * | 8/2018 |
| DE | 10 2015 221 130 A1 | | 5/2017 |
| EP | 3499000 A1 | | 6/2019 |
| FR | 3 091 063 A1 | | 6/2020 |

(Continued)

OTHER PUBLICATIONS

U.S. Appl. No. 18/600,936, filed Mar. 11, 2024 in the name of Hideaki Suzuki et al.

*Primary Examiner* — Jose A Gonzalez Quinones
(74) *Attorney, Agent, or Firm* — Oliff PLC

(57) ABSTRACT

An EDS includes a motor housing and an inverter housing. The inverter housing includes inverter fins. The motor housing includes motor fins and motor guide plates. The motor fins and the motor guide plates are provided on an outer peripheral surface. Each of the motor guide plates is aligned with the motor fins along the outer peripheral surface. The motor guide plate guides air sent by a blower fan in a circumferential direction to flow toward the motor fins and the inverter fins. The motor guide plate is bent in a convex shape to bulge toward an upstream side in an axial direction.

14 Claims, 37 Drawing Sheets

(56)                    References Cited

FOREIGN PATENT DOCUMENTS

JP          H11-234954  A      8/1999
JP          2021-030976  A     3/2021
SU            1203646  A1     1/1986
WO      WO-2022207545  A1  *  10/2022   .........  F04D 29/5806

* cited by examiner

DRIVE DEVICE AND DRIVE DEVICE UNIT

CROSS REFERENCE TO RELATED APPLICATION

The present application is a continuation application of International Patent Application No. PCT/JP2022/036950 filed on Oct. 3, 2022, which designated the U.S. and claims the benefit of priority from Japanese Patent Applications No. 2021-166881 filed on Oct. 11, 2021 and No. 2022-120697 filed on Jul. 28, 2022. The entire disclosures of all of the above applications are incorporated herein by reference.

TECHNICAL FIELD

The present disclosure relates to a drive device and a drive device unit.

BACKGROUND

Conventionally, an electric aircraft driven with an electric drive device has been developed.

SUMMARY

According to an aspect of the present disclosure, a drive device is configured to drive a rotor of a flight vehicle to rotate the rotor.

BRIEF DESCRIPTION OF THE DRAWINGS

The above and other objects, features and advantages of the present disclosure will become more apparent from the following detailed description made with reference to the accompanying drawings. In the drawings:

FIG. 23 is an enlarged view of a periphery of a high heat region guide plate in FIG. 20;

FIG. 25 is an enlarged view of a periphery of a high heat region guide plate in Modification 5-2;

DETAILED DESCRIPTION

Figure 1:
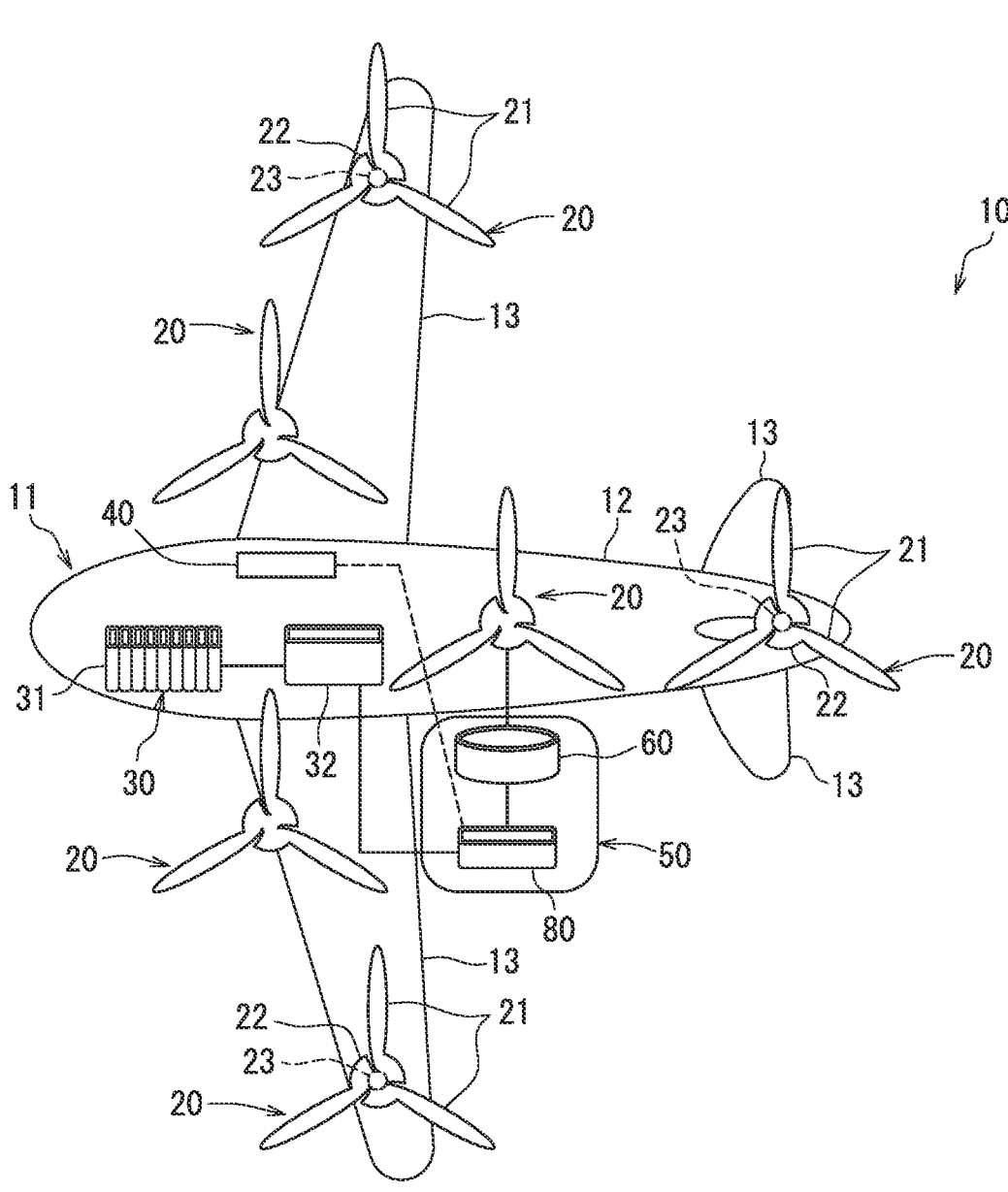
FIG. 1 is a diagram showing a configuration of an eVTOL in a first embodiment.

Hereinafter, examples of the present disclosure will be described.

According to an example of the present disclosure, a drive device is mounted on an electric vertical take-off and landing aircraft. The drive device is an EDS that drives a rotary wing to rotate. The drive device includes a motor and a driver. The driver includes an inverter circuit and the like, and drives the motor to rotate. The drive device causes the rotary blade to rotate by rotation of the motor.

In the drive device, it is conceivable that heat is generated due to rotation of the motor, driving of the driver, and the like. Therefore, in the drive device, in order to enhance a heat radiation effect, many radiation fins may be provided on a housing that accommodates the motor and the driver. However, in the drive device, when the number of radiation fins is large, the heat radiation effect is likely to be enhanced, whereas there is a concern that the drive device is too heavy as one be mounted on a flight vehicle such as the electric vertical take-off and landing aircraft.

According to an example of the present disclosure, a drive device is configured to drive a rotor of a flight vehicle to rotate the rotor. The drive device comprises:

a heat generator configured to generate heat when driven to rotate the rotor;

a housing accommodating the heat generator and having an outer peripheral surface extending along a rotation axis of a fan, the fan configured to send air;

a radiation fin extending along the outer peripheral surface in an axial direction in which the rotation axis extends, and configured to release the heat from the heat generator to a gas that flows along the outer peripheral surface due to rotation of the fan; and a guide portion aligned with the radiation fin along the outer peripheral surface, and configured to guide the gas in a circumferential direction of the rotation axis to flow toward the radiation fin.

According to the drive device described above, the gas is guided in the circumferential direction by the guide portion provided on the outer peripheral surface of the housing to flow toward the radiation fin. In the configuration, an amount of the gas passing through the radiation fin tends to be increased, and thus a cooling effect based on the radiation fin can be enhanced. Therefore, even if the number and a size of the radiation fin are limited to avoid a drive device from becoming too heavy for a flight vehicle, a decrease in the effect of cooling the drive device can be reduced by the guide portion. Therefore, both heat radiation effect enhancement and weight reduction of the drive device can be achieved by the guide portion. In this way, the drive device suitable for mounting on the flight vehicle can be implemented.

According to an example of the present disclosure, a drive device unit is to be mounted on a flight vehicle. The drive device unit comprises:

a drive device configured to drive a rotor of the flight vehicle to rotate the rotor; and a fan configured to rotate about a rotation axis to send a gas and aligned with the drive device along the rotation axis.

The drive device includes a heat generator configured to generate heat when driven to rotate the rotor, a housing accommodating the heat generator and having an outer peripheral surface extending along the rotation axis of the fan, the fan configured to send air, a radiation fin extending along the outer peripheral surface in an axial direction in which the rotation axis extends, and configured to release the heat from the heat generator to the gas that flows along the outer peripheral surface due to rotation of the fan, and a guide portion aligned with the radiation fin along the outer peripheral surface, and configured to guide the gas in a circumferential direction of the rotation axis to flow toward the radiation fin.

According to the drive device unit described above, the same effect as those of the drive device described above can be exhibited. Accordingly, the drive device unit suitable for mounting on the flight vehicle can be implemented.

Hereinafter, multiple embodiments for carrying out the present disclosure will be described with reference to the drawings. In each embodiment, the same reference numerals are assigned to portions corresponding to the items described in the preceding embodiments, and a repetitive description thereof may be omitted. In each embodiment, when only a part of the configuration is described, another embodiment previously described can be employed for the other part of the configuration. Not only combinations between portions that are specifically clarified as being able to be used in combination in each embodiment are possible, but also partial combinations between the embodiments whose combination is not specifically clarified are possible as long as no adverse effect is particularly generated on the combination.

First Embodiment

A drive system 30 shown in FIG. 1 is mounted on an eVTOL 10. The eVTOL 10 is an electric vertical take-off and landing aircraft, and can take off and land in a vertical direction. The eVTOL is an abbreviation of the electric vertical take-off and landing aircraft. The eVTOL 10 is an aircraft flying in an atmosphere and corresponds to a flight vehicle. The eVTOL 10 is a manned aircraft on which an occupant rides. The drive system 30 is a system that drives the eVTOL 10 to fly.

The eVTOL 10 includes an airframe 11 and rotors 20. The airframe 11 includes an airframe main body 12 and wings 13. The airframe main body 12 is a body of the airframe 11 and has, for example, a shape extending in a front-rear direction. The airframe main body 12 has an occupant compartment on which an occupant rides. Multiple wings 13 extend from the airframe main body 12 and are provided on the airframe main body 12. The wings 13 are fixed wings. The multiple wings 13 include main wings, tail wings, and the like.

Figure 3:
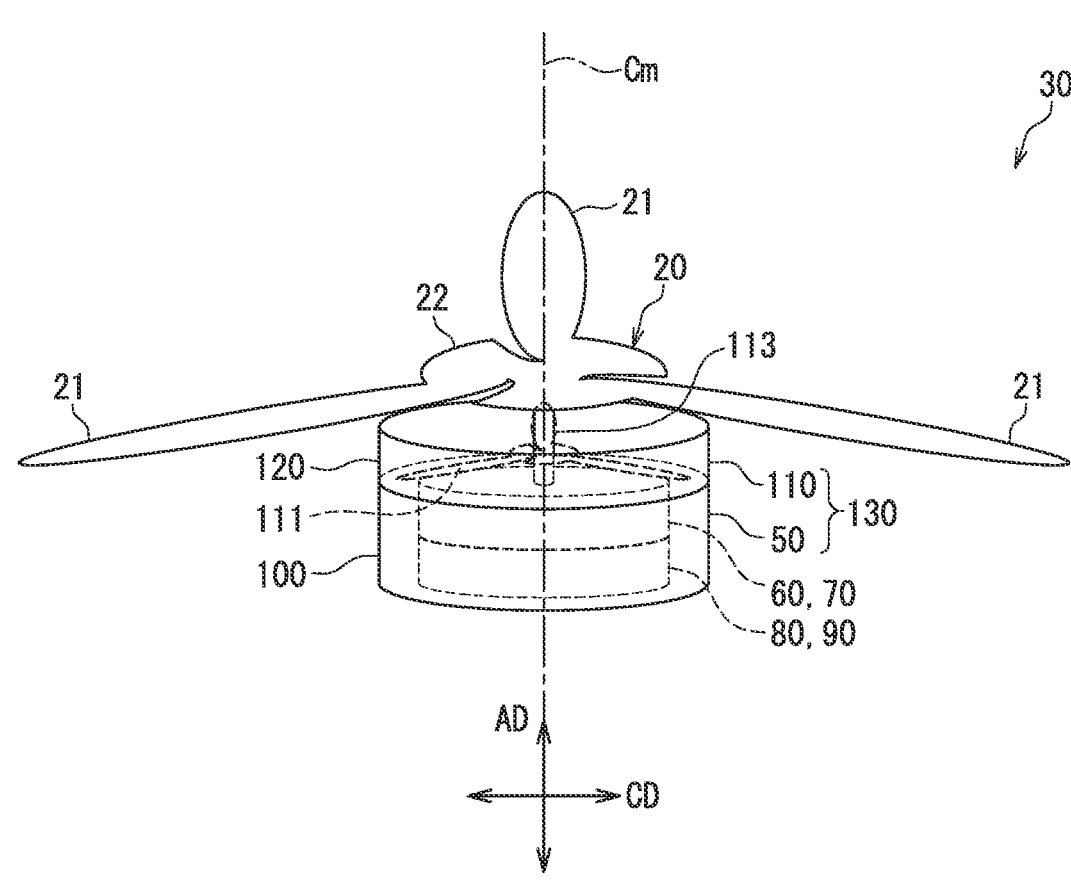
FIG. 3 is a perspective view of a rotor and an EDS unit.

Multiple rotors 20 shown in FIGS. 1 and 3 are provided on the airframe 11. The rotors 20 are provided on the airframe main body 12 and the wings 13. The rotor 20 rotates about a motor axis Cm to be described later. A rotation axis of the rotor 20 is the motor axis Cm. The motor axis Cm coincides with a center line of the rotor 20. When a direction in which the motor axis Cm extends is referred to as an axial direction AD, the axial direction AD, a radial direction RD, and a circumferential direction CD of the motor axis Cm are orthogonal to one another. The rotor 20 rotates in the circumferential direction CD. An outer side in the radial direction RD may be referred to as a radially outer side, and an inner side in the radial direction RD may be referred to as a radially inner side.

The rotor 20 includes blades 21, a rotor head 22, and a rotor shaft 23. Multiple blades 21 are arranged in the circumferential direction CD. The rotor head 22 couples the multiple blades 21. The blades 21 extend from the rotor head 22 in the radial direction RD. The blades 21 are vanes that rotate together with the rotor shaft 23. The rotor shaft 23 is a rotation shaft of the rotor 20 and extends from the rotor head 22 along the motor axis Cm.

The eVTOL 10 is a tiltrotor aircraft. In the eVTOL 10, the rotor 20 can be tilted. That is, a tilt angle of the rotor 20 is adjustable. For example, when the eVTOL 10 rises, an orientation of the rotor 20 is set such that the motor axis Cm extends in the vertical direction. In this case, the rotor 20 functions as a lift rotor for generating a lift force on the eVTOL 10. That is, the rotor 20 can function as a rotary blade. When the eVTOL 10 moves forward, the orientation of the rotor 20 is set such that the motor axis Cm extends in the front-rear direction. In this case, the rotor 20 functions as a cruise rotor for generating a thrust force on the eVTOL 10.

In the eVTOL 10, the wings 13 can be inclined relative to the airframe main body 12. That is, the rotors 20 can be tilted together with the wings 13. In the eVTOL 10, the tilt angle of the rotor 20 is adjusted by adjusting an inclination angle of the wing 13 with respect to the airframe main body 12. In the eVTOL 10, the rotor 20 may be capable of tilting relative to the airframe 11. For example, the tilt angle of the rotor 20 may be adjusted by adjusting a relative inclination angle of the rotor 20 relative to the wing 13.

Figure 2:
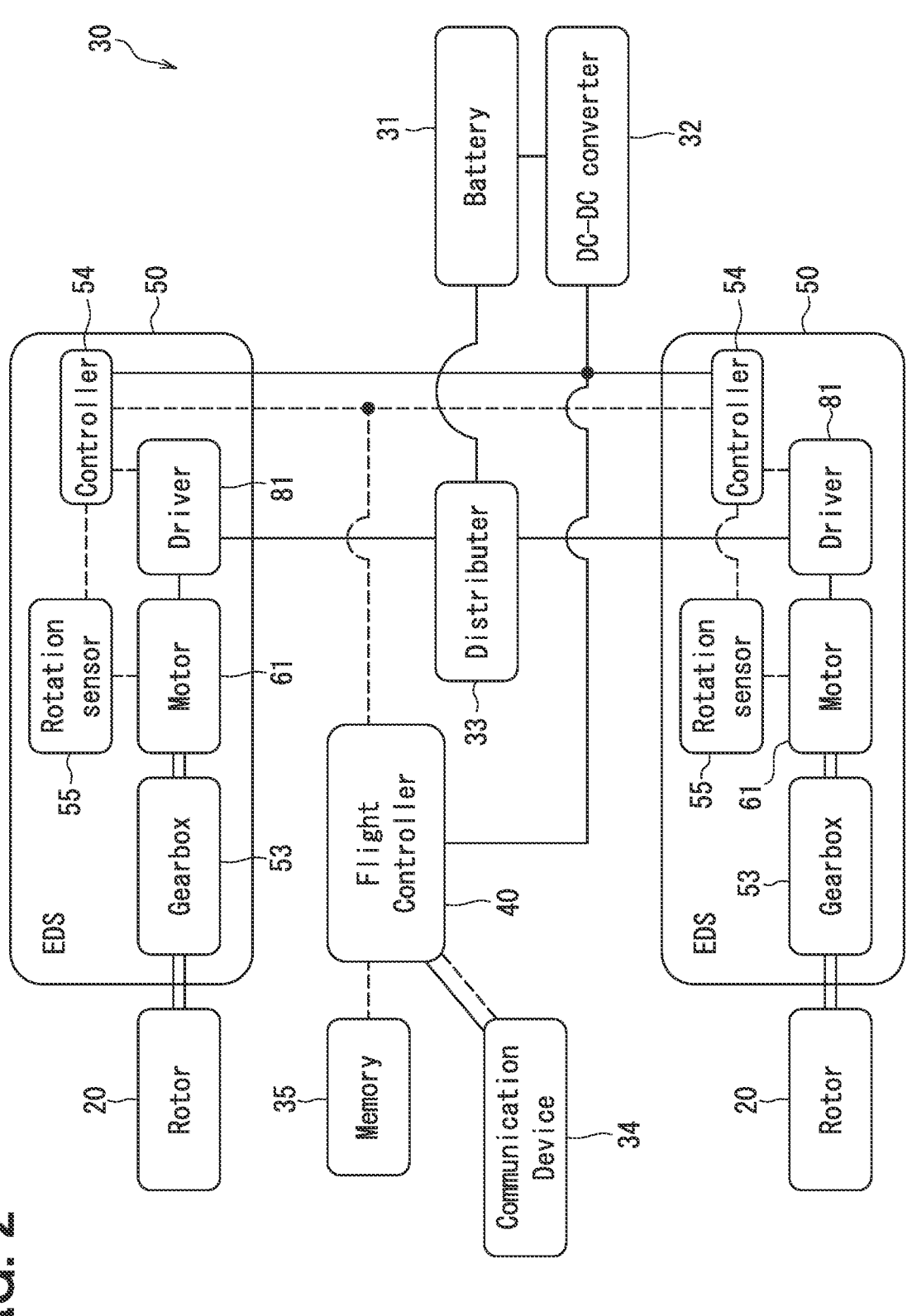
FIG. 2 is a block diagram showing an electrical configuration of an EDS in the eVTOL.

As shown in FIGS. 1 and 2, the drive system 30 includes a battery 31, a distributor 32, a converter 33, a communication device 34, a storage device 35, a flight controller 40, and an EDS 50. In FIG. 2, the rotor 20 is illustrated as Rotor, the battery 31 is illustrated as Battery, the distributor 32 is illustrated as Distributer, and the converter 33 is illustrated as DC-DC converter. The communication device 34 is illustrated as Communication Device, the storage device 35 is illustrated as Memory, and the flight controller 40 is illustrated as Controller.

The battery 31 is electrically connected to multiple EDS 50. The battery 31 is an electric power supply unit that supplies electric power to the EDS 50, and corresponds to an electric power supply unit. The battery 31 is a DC voltage source that applies a DC voltage to the EDS 50. The battery 31 includes a rechargeable secondary battery. Examples of the secondary battery include a lithium ion battery and a nickel-hydrogen battery. In addition to or instead of the battery 31, a fuel cell, a generator, or the like may be used as the power supply unit.

The distributor 32 is electrically connected to the battery 31 and the multiple EDS 50. The distributor 32 distributes the electric power from the battery 31 to the multiple EDS 50. In the EDS 50, a driver 81 to be described later is electrically connected to the distributor 32. The electric power from the battery 31 is supplied to the driver 81 via the distributor 32. When a voltage of the battery 31 is referred to as a high voltage, the high voltage is applied to the driver 81. The distributor 32 may be not provided as long as the electric power from the battery 31 is supplied to the multiple EDS 50. As the configuration in which the distributor 32 may be not provided, for example, there is a configuration in which each of the multiple EDS 50 is individually provided with the power supply unit.

The flight controller 40 is, for example, an ECU, and controls driving of the EDS 50. The ECU is an abbreviation of an electronic control unit. The flight controller 40 is mainly implemented by a microcomputer including, for example, a processor, a memory, an I/O, and a bus connecting these components. The microcomputer may be referred to as a micro. The memory is a non-transitory tangible storage medium that non-temporarily stores computer readable programs and data. The non-transitory tangible storage medium is implemented by a semiconductor memory, a magnetic disk, or the like.

The flight controller 40 is electrically connected to the storage device 35 and the EDS 50. The flight controller 40 executes a control program stored in at least one of the memory and the storage device 35 to execute various types of processing related to the driving of the EDS 50. The flight controller 40 performs flight control for causing the eVTOL 10 to fly. The flight control includes control of the EDS 50, tilt angle control for changing the tilt angle of the rotor 20, and the like. In the EDS 50, a drive controller 54 to be described later is electrically connected to the flight controller 40. The flight controller 40 controls the EDS 50 by outputting a control signal to the drive controller 54.

The converter 33 is electrically connected to the battery 31, the flight controller 40, and the EDS 50. In the EDS 50, the drive controller 54 is electrically connected to the converter 33. The converter 33 steps down or steps up the electric power from the battery 31, and then supplies the stepped down or stepped up electric power to the flight controller 40 and the drive controller 54. When a voltage of the electric power stepped down by the converter 33 is referred to as a low voltage, the low voltage is applied to the flight controller 40 and the drive controller 54. The low voltage is a voltage lower than the voltage of the battery 31. Meanwhile, when a voltage of the electric power stepped up by the converter 33 is referred to as a high voltage, the high voltage is applied to the flight controller 40 and the drive controller 54. The high voltage is a voltage higher than the voltage of the battery 31.

The EDS 50 is a device that drives the rotor 20 to rotate, and corresponds to a drive device. The EDS 50 drives the rotor 20 to rotate. The EDS 50 is an abbreviation of an electric drive system. The EDS 50 may be referred to as an electric drive device and an EPU. EPU is an abbreviation of an electric propulsion unit. The EDS 50 is individually provided for each of the multiple rotors 20. The EDS 50 is aligned with the rotor 20 along the motor axis Cm. All of the multiple EDS 50 are fixed to the airframe 11. The EDS 50 rotatably supports the rotor 20. The EDS 50 is mechanically connected to the rotor shaft 23. The multiple EDS 50 include at least one of the EDS 50 fixed to the airframe 11 in a state of protruding outside the airframe 11 and the EDS 50 fixed to the airframe 11 in a state of being embedded inside the airframe 11.

The rotor 20 is fixed to the airframe 11 via the EDS 50. The EDS 50 is designed to prevent tilting relative to the rotor 20. The EDS 50 may be tilted together with the rotor 20 relative to the airframe 11. When the tilt angle of the rotor 20 is adjusted, an orientation of the EDS 50 is set together with the rotor 20.

As shown in FIG. 2, the EDS 50 includes a gearbox 53, the drive controller 54, a rotation sensor 55, a motor 61, and the driver 81. In FIG. 2, the gearbox 53 is illustrated as Gearbox, the driver 81 is illustrated as Driver, the drive controller 54 is illustrated as Controller, the rotation sensor 55 is illustrated as Rotation sensor, and the motor 61 is illustrated as Motor.

The motor 61 is a multi-phase AC motor, for example, a three-phase AC rotary electric machine. The motor 61 functions as an electric motor that is a flight driving source of the eVTOL 10. The motor 61 includes a rotor and a stator. The motor 61 is electrically connected to the driver 81. The electric power from the battery 31 is supplied to the motor 61 via the driver 81. The motor 61 is driven according to a voltage and a current supplied from the driver 81. As the motor 61, for example, a brushless motor is used. An induction motor or a reactance motor may be used as the motor 61.

The gearbox 53 mechanically connects the motor 61 and the rotor 20. For example, the rotor shaft 23 is mechanically connected to a rotation shaft of the motor 61 via the gearbox 53. The gearbox 53 slows down rotation of the motor 61 and transmits the rotation to the rotor 20. The gearbox 53 includes multiple gears, and may be referred to as a transmission gear and a speed reducer. The gearbox 53 has a structure that matches motor characteristics of the motor 61.

The driver 81 drives the motor 61 by converting the electric power to be supplied to the motor 61. The driver 81 includes an inverter. The inverter converts the electric power to be supplied to the motor 61 from a direct current to an alternating current. The inverter is an electric power conversion unit that converts the electric power. The inverter is a multi-phase inverter, and performs electric power conversion for each of the multiple phases. The inverter is, for example, a three-phase inverter. The inverter is an inverter circuit including multiple switching elements. The switching elements include power elements such as IGBT and MOS-FET. The IGBT is an abbreviation of an insulated gate bipolar transistor. The MOSFET is an abbreviation of a metal-oxide-semiconductor field-effect transistor. The switching element may be referred to as a driving element.

In the inverter, the switching elements are connected in parallel in each of the multiple phases. For example, in a configuration in which the motor 61 is a three-phase AC motor, multiple switching elements are connected in parallel to the motor 61 in each of a U-phase, a V-phase, and a W-phase. In each of the multiple phases, the multiple switching elements may not be connected in parallel. For example, multiple switching elements may not be connected in parallel to the motor 61 in each of the U-phase, the V-phase, and the W-phase.

The rotation sensor 55 is provided for the motor 61. The rotation sensor 55 is a rotation detection unit that detects a rotation number and a rotation angle of the motor 61. The rotation sensor 55 outputs a detection signal corresponding to the rotation number of the motor 61 to the drive controller 54. The rotation sensor 55 includes, for example, an encoder and a resolver.

The drive controller 54 is, for example, an ECU, and controls the driver 81. Similarly to the flight controller 40, the drive controller 54 is mainly implemented by a microcomputer including, for example, a processor, a memory, an I/O, and a bus connecting these components.

The drive controller 54 is electrically connected to the flight controller 40 and the driver 81. The drive controller 54 is electrically connected to various sensors including the rotation sensor 55. The drive controller 54 controls the driver 81 by outputting a command signal to the driver 81. The drive controller 54 generates the command signal in response to the control signal received from the flight controller 40, the detection signal received from the various sensors such as the rotation sensor 55, and the like. In the driver 81, the inverter is driven in response to the command signal received from the drive controller 54, and the electric power conversion is performed by the inverter.

The various sensors include a current sensor and a voltage sensor in addition to the rotation sensor 55. The current sensor detects a current flowing through the motor 61 for each of the multiple phases, for example. The voltage sensor detects, for example, the voltage output from the battery 31.

As shown in FIG. 3, the rotor 20 and the EDS 50 are arranged along the motor axis Cm. The rotor 20 sends air to one side in the axial direction AD by rotation to generate the thrust force and the lift force on the eVTOL 10. The rotor 20 sends the air toward the EDS 50 in the axial direction AD. When the rotor 20 rotates, a swirling flow traveling along the motor axis Cm is generated. For the swirling flow, the air flows in the axial direction AD while swirling in the circumferential direction CD.

Figure 4:
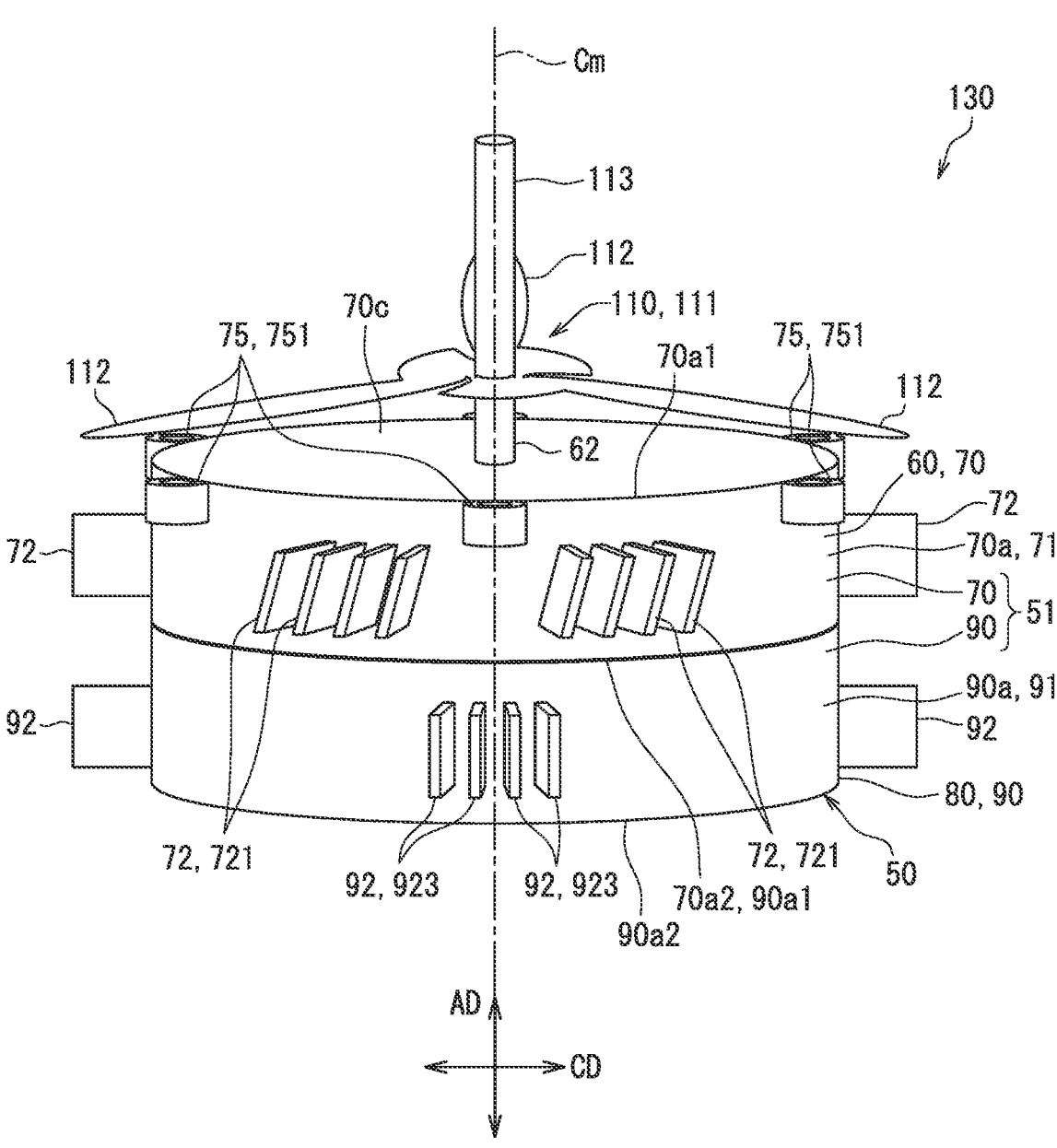
FIG. 4 is a perspective view of an EDS.

As shown in FIGS. 3 and 4, the EDS 50 includes a motor device 60, an inverter device 80, and a fin cover 100. The motor device 60 includes the motor 61 and a motor housing 70. The motor housing 70 accommodates the motor 61. The motor 61 includes a motor shaft 62. The motor shaft 62 is a rotation shaft of the motor 61 and rotates together with the rotor. When rotation of the rotor is referred to as the rotation of the motor 61, the motor 61 rotates about the motor axis Cm. The motor axis Cm is a virtual line extending linearly, and coincides with a center line of the motor 61. The motor shaft 62 extends along the motor axis Cm.

The inverter device 80 includes the driver 81 and an inverter housing 90. The inverter housing 90 accommodates the driver 81. The motor device 60 and the inverter device 80 are arranged along the motor axis Cm.

The motor housing 70 and the inverter housing 90 are arranged along the motor axis Cm. The motor housing 70 and the inverter housing 90 are formed in a tubular shape as a whole and extend along the motor axis Cm. The motor housing 70 and the inverter housing 90 are in a state of being overlapped with each other in the axial direction AD. The motor housing 70 and the inverter housing 90 are fixed to each other by fixing tools such as bolts. Each of the motor housing 70 and the inverter housing 90 is formed by a metal material or the like, and has a thermal conduction property.

The motor housing 70 and the inverter housing 90 constitute a housing of the EDS 50. The motor 61 and the driver 81 are driven to rotate the rotor 20, and heat is likely to be generated due to the driving. The motor 61 and the driver 81 correspond to a heat generator, and the motor housing 70 and the inverter housing 90 correspond to a housing. An outer peripheral surface 70a of the motor housing 70 and an outer peripheral surface 90a of the inverter housing 90 correspond to an outer peripheral surface of the housing. These outer peripheral surfaces 70a and 90a are arranged in the axial direction AD. For example, the outer peripheral surfaces 70a and 90a form a continuous surface continuously extending in the axial direction AD.

The fin cover 100 accommodates the motor housing 70 and the inverter housing 90. The fin cover 100 is formed in a tubular shape as a whole and extends along the motor axis Cm. The fin cover 100 is in a state of spanning the motor housing 70 and the inverter housing 90 in the axial direction AD. The fin cover 100 is in a state of covering the motor housing 70 and the inverter housing 90 from an outer peripheral side. The fin cover 100 is provided on an outer side of the motor housing 70 and the inverter housing 90 in the radial direction RD, and extends along the outer peripheral surfaces 70a and 90a. The fin cover 100 may be referred to as a duct.

The fin cover 100 is made of a resin material or the like, and is elastically deformable. The fin cover 100 is attached to the motor housing 70 and the inverter housing 90 in an elastically deformed state. The fin cover 100 extends toward at least the radially outer side due to the elastic deformation, and is in a state in which a position of the fin cover 100 with respect to the motor housing 70 and the inverter housing 90 is maintained by a restoring force toward the radially inner side. In this way, the fin cover 100 is attached to the motor housing 70 and the inverter housing 90 by using the restoring force generated due to the elastic deformation. The fin cover 100 corresponds to a housing cover. A thermal conduction property of the fin cover 100 is lower than the thermal conduction properties of the motor housing 70 and the inverter housing 90.

A blowing device 110 is attached to the EDS 50. The blowing device 110 is attached to the EDS 50, and constitutes an EDS unit 130 together with the EDS 50. The EDS unit 130 is mounted on the eVTOL 10. The blowing device 110 is arranged along the motor axis Cm with respect to the rotor 20 and the EDS 50. The blowing device 110 is provided between the rotor 20 and the EDS 50 in the axial direction AD. The EDS unit 130 corresponds to a drive device unit.

The blowing device 110 is driven to send the air. The blowing device 110 includes a blower fan 111 and a shroud 120. The blower fan 111 rotates about the motor axis Cm. A rotation axis of the blower fan 111 is the motor axis Cm. A center line of the blower fan 111 coincides with the motor axis Cm. The blower fan 111 rotates to send the air toward the EDS 50 in the axial direction AD. The blower fan 111 sends cooling air for cooling the EDS 50 toward the EDS 50. In the present embodiment, for the EDS 50, a blower fan 111 side is an upstream side.

When the blower fan 111 rotates, a swirling flow traveling along the motor axis Cm is generated. In the swirling flow generated by the blower fan 111, similarly to the swirling flow generated by the rotor 20, the air flows in the axial direction AD while swirling in the circumferential direction CD. The swirling flow generated by the blower fan 111 travels while swirling in the same direction as the swirling flow generated by the rotor 20. For example, both the swirling flow generated by the blower fan 111 and the swirling flow generated by the rotor 20 are clockwise swirling flows that travel while swirling clockwise.

The blower fan 111 includes fan vanes 112 and a fan shaft 113. Multiple fan vanes 112 are arranged in the circumferential direction CD. The fan vanes 112 are coupled by a fan head. The fan vanes 112 extend from the fan head in the radial direction RD. The fan vanes 112 are vanes that rotate together with the fan shaft 113. The fan shaft 113 is a rotation shaft of the blower fan 111 and extends from the fan head along the motor axis Cm.

The shroud 120 accommodates the blower fan 111. The shroud 120 is formed in a tubular shape and extends along the motor axis Cm. The shroud 120 is provided on an outer side of the blower fan 111 in the radial direction RD. The shroud 120 is attached to the EDS 50. The shroud 120 is fixed to, for example, the motor housing 70. The shroud 120 is made of a resin material or the like. A thermal conduction property of the shroud 120 is lower than the thermal conduction properties of the motor housing 70 and the inverter housing 90.

The motor shaft 62 is connected to the rotor 20 and the blower fan 111. For example, the rotor shaft 23 and the fan shaft 113 are connected to the motor shaft 62. When the motor 61 is driven, the rotor 20 and the blower fan 111 rotate together with the motor shaft 62. As described above, the motor shaft 62 is connected to the rotor 20 via the gearbox 53, but an illustration of the gearbox 53 is omitted in FIGS. 3 and 4. The motor shaft 62 may be connected to the rotor 20 without using the gearbox 53. The motor shaft 62 may be integrated with the fan shaft 113.

In the EDS 50, the air sent by the rotor 20 and the blower fan 111 flows along the outer peripheral surfaces 70a and 90a. In this way, the air is forced to flow along the outer peripheral surfaces 70a and 90a by the rotor 20 and the blower fan 111, and thus heat released from the motor housing 70 and the inverter housing 90 to the air is likely to be increased. That is, heat generated from the motor 61, the driver 81, and the like is easily released to an outside via the motor housing 70 and the inverter housing 90. A gas flowing along the outer peripheral surfaces 70a and 90a may not be air as long as the gas can exchange the heat with the motor housing 70 and the inverter housing 90.

In the present embodiment, it is assumed that the air flowing along the outer peripheral surfaces 70a and 90a is the air sent by the blower fan 111, but actually, the air sent by the rotor 20 also flows along the outer peripheral surfaces 70a and 90a. Therefore, both the blower fan 111 and the rotor 20 correspond to a fan. For the EDS 50, an upstream and downstream direction, which is a direction in which the air flows, is the axial direction AD. The blower fan 111 is located on an upstream side of the EDS 50.

As shown in FIG. 4, the motor housing 70 has an outer peripheral surface 70a, an inner peripheral surface 70b (see FIG. 7), and an upstream end surface 70c. The outer peripheral surface 70a and the inner peripheral surface 70b extend along the motor axis Cm in the axial direction AD and extend in an annular shape in the circumferential direction CD. The upstream end surface 70c is an end surface of the motor housing 70 and faces the blower fan 111. The upstream end surface 70c extends in a direction orthogonal to the axial direction AD. The outer peripheral surface 70a includes an outer peripheral upstream end 70a1 and an outer peripheral downstream end 70a2. The outer peripheral upstream end 70a1 is an upstream-side end portion of the outer peripheral surface 70a and extends along an outer peripheral edge of the upstream end surface 70c. The outer peripheral downstream end 70a2 is a downstream-side end portion of the outer peripheral surface 70a.

Figure 5:
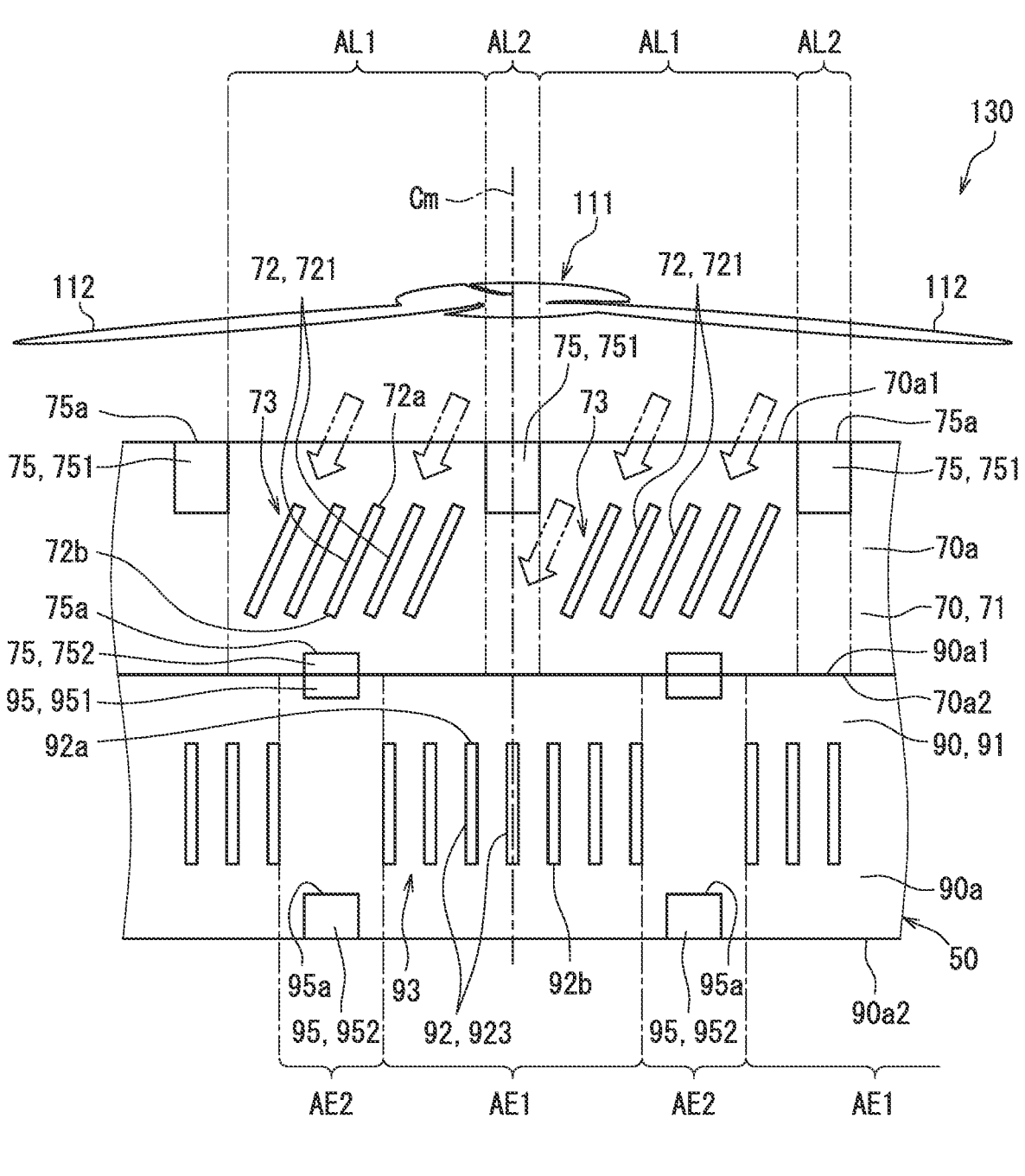
FIG. 5 is a partially developed view of outer peripheral surfaces of a motor and an inverter.

As shown in FIGS. 4 and 5, the motor housing 70 includes a housing main body 71, motor fins 72, and flanges 75. The housing main body 71 is formed in a tubular shape as a whole and extends along the motor axis Cm. On the housing main body 71, the outer peripheral surface 70a, the inner peripheral surface 70b, and the upstream end surface 70c are formed.

The motor fins 72 are fins provided on the outer peripheral surface 70a. The motor fin 72 can release heat of the motor device 60 to an outside, and correspond to a radiation fin. The motor fins 72 increase a surface area of the motor housing 70 to enhance a heat radiation effect from the motor housing 70.

The motor fins 72 protrude from the outer peripheral surface 70a. The motor fins 72 are provided integrally with the housing main body 71. Each of the motor fins 72 is formed in a plate shape. The motor fin 72 extends from the housing main body 71 toward the radially outer side and extends in the axial direction AD. For example, when a virtual straight line extending through the motor axis Cm in the radial direction RD is referred to as a radial line, the motor fin 72 extends in the radial direction RD in a manner of being overlapped with the radial line. Multiple motor fins 72 are arranged along the outer peripheral surface 70a in the circumferential direction CD. In two of the motor fins 72 adjacent to each other in the circumferential direction CD, respective plate surfaces face each other. The motor fins 72 are provided near a center of the outer peripheral surface 70a in the axial direction AD. Each of the motor fins 72 is located at a position separated from both the outer peripheral upstream end 70a1 and the outer peripheral downstream end 70a2 on the outer peripheral surface 70a. In the radial direction RD, a protrusion dimension of the motor fin 72 from the outer peripheral surface 70a is larger than a protrusion dimension of each of the flanges 75 from the outer peripheral surface 70a.

The motor fin 72 includes a fin upstream end 72a and a fin downstream end 72b. In both ends of the motor fin 72 arranged in the axial direction AD, an upstream-side end portion is the fin upstream end 72a, and a downstream-side end portion is the fin downstream end 72b.

The flange 75 is provided on the outer peripheral surface 70a and protrudes from the outer peripheral surface 70a. The flange 75 extends from the housing main body 71 toward the radially outer side. A width dimension of the flange 75 in the circumferential direction CD is larger than a plate thickness dimension of the motor fin 72. The flange 75 has an upstream surface 75a. The upstream surface 75a is a surface facing the upstream side among outer surfaces of the flange 75. The upstream surface 75a extends in the direction orthogonal to the axial direction AD. Since the flange 75 has the large width dimension and the upstream surface 75a thereof is orthogonal to the axial direction AD, the flange 75 tends to be an obstacle for the air flowing in the axial direction AD. The flange 75 is likely to restrict the air from flowing in the axial direction AD, and corresponds to an obstacle.

The flange 75 is, for example, a case fixing portion. The flange 75 is a portion for fixing the motor housing 70 to a fixing target such as the inverter housing 90 and the shroud 120. A fixing tool such as a bolt is screwed into the flange 75, for example.

As shown in FIG. 5, as the flanges 75, upstream flanges 751 and downstream flanges 752 are provided on the outer peripheral surface 70a. Each of the upstream flanges 751 is located at a position near the outer peripheral upstream end 70a1 on the outer peripheral surface 70a. The upstream flange 751 extends, for example, from the outer peripheral upstream end 70a1 toward the outer peripheral downstream end 70a2 in the axial direction AD. Each of the downstream flanges 752 is located at a position near the outer peripheral downstream end 70a2 on the outer peripheral surface 70a. The downstream flange 752 extends, for example, from the outer peripheral downstream end 70a2 toward the outer peripheral upstream end 70a1. Multiple upstream flanges 751 and multiple downstream flanges 752 are arranged along the outer peripheral surface 70a in the circumferential direction CD.

The outer peripheral surface 70a has exposed regions AL1 and hidden regions AL2. Each of the hidden regions AL2 is a region hidden behind the flange 75 with respect to the blower fan 111. For example, a region hidden on a downstream side of the upstream flange 751 with respect to the blower fan 111 is the hidden region AL2. The hidden region AL2 extends from the upstream flange 751 toward the downstream side in the axial direction AD. The hidden region AL2 is located on a side opposite to the blower fan 111 with the flange 75 interposed therebetween in the axial direction AD. Multiple hidden regions AL2 are arranged together with the upstream flanges 751 in the circumferential direction CD.

Each of the exposed regions AL1 is a region exposed without being hidden behind the flange 75 with respect to the blower fan 111. For example, a region exposed without being hidden on a downstream side of the upstream flange 751 with respect to the blower fan 111 is the exposed region AL1. The exposed region AL1 is a region aligned with the hidden region AL2 in the circumferential direction CD. The exposed region AL1 spans two of the hidden regions AL2 adjacent to each other in the circumferential direction CD. Multiple exposed regions AL1 are arranged together with the hidden regions AL2 in the circumferential direction CD. In the present embodiment, the exposed region AL1 corresponds to an axial arrangement region, the hidden region AL2 corresponds to a circumferential arrangement region, and the upstream flange 751 corresponds to the obstacle.

The motor fin 72 is provided in the exposed region AL1, and is not provided in the hidden region AL2. Multiple motor fins 72 are provided in each of the multiple exposed regions AL1. When the multiple motor fins 72 provided in one exposed region AL1 is referred to as a motor fin group 73, one motor fin group 73 is provided in one exposed region AL1. Multiple motor fin groups 73 are arranged together with the exposed regions AL1 in the circumferential direction CD. In the circumferential direction CD, the hidden region AL2 exists between two of the motor fin groups 73 adjacent to each other.

In the present embodiment, forward inclined fins 721 are provided on the outer peripheral surface 70a as the motor fins 72. Each of the forward inclined fins 721 is inclined with respect to the motor axis Cm in the circumferential direction CD. The forward inclined fin 721 extends straight in a direction in which the forward inclined fin 721 is inclined with respect to the motor axis Cm in the circumferential direction CD. In the forward inclined fins 721, all portion including an upstream portion extending from the fin upstream end 72a toward the downstream side are inclined with respect to the motor axis Cm in the circumferential direction CD. In the forward inclined fin 721, when a portion inclined with respect to the motor axis Cm in the circumferential direction CD is referred to as an inclined portion, in the present embodiment, the entire forward inclined fin 721 is the inclined portion.

An inclination angle of the forward inclined fin 721 is such an angle that the forward inclined fin 721 extends along the swirling flow from the blower fan 111. In the forward inclined fin 721, one of a pair of plate surfaces faces an upstream side and the other faces a downstream side. In the forward inclined fin 721, the pair of plate surfaces are both flat surfaces. That is, each of the plate surfaces of the forward inclined fin 721 has a flat shape.

In the forward inclined fin 721, the fin upstream end 72a and the fin downstream end 72b are located at positions deviated in the circumferential direction CD. The forward inclined fin 721 is inclined in a manner of extending along the swirling flow generated by the blower fan 111. In the forward inclined fin 721, the plate surface extends along the swirling flow. In the forward inclined fin 721, the plate surface is not parallel to the motor axis Cm. That is, in the forward inclined fin 721, the plate surface is inclined with respect to the motor axis Cm. The fin downstream end 72b is located at a position separated from the fin upstream end 72a toward the downstream side in the circumferential direction CD. The forward inclined fin 721 corresponds to the radiation fin and an inclined fin.

Multiple forward inclined fins 721 are arranged in the circumferential direction CD in each of the multiple exposed regions AL1. In one of the exposed regions AL1, the multiple forward inclined fins 721 have the same size and shape. The multiple forward inclined fins 721 are the same, for example, in a length dimension in the axial direction AD, a plate thickness dimension, and a protrusion dimension from the outer peripheral surface 70a. The inclination angles with respect to the motor axis Cm are the same for the multiple forward inclined fins 721. The inclination angle of the forward inclined fin 721 is, for example, 5 degrees to 45 degrees. The multiple forward inclined fins 721 extend parallel to each other. The multiple forward inclined fins 721 are arranged at equal intervals in the circumferential direction CD.

In the multiple exposed regions AL1, the forward inclined fins 721 have the same size and shape. The inclination angles of the forward inclined fins 721 with respect to the motor axis Cm are also the same in the multiple exposed regions AL1. The intervals between the multiple forward inclined fins 721 are also the same in the multiple exposed regions AL1.

Figure 7:
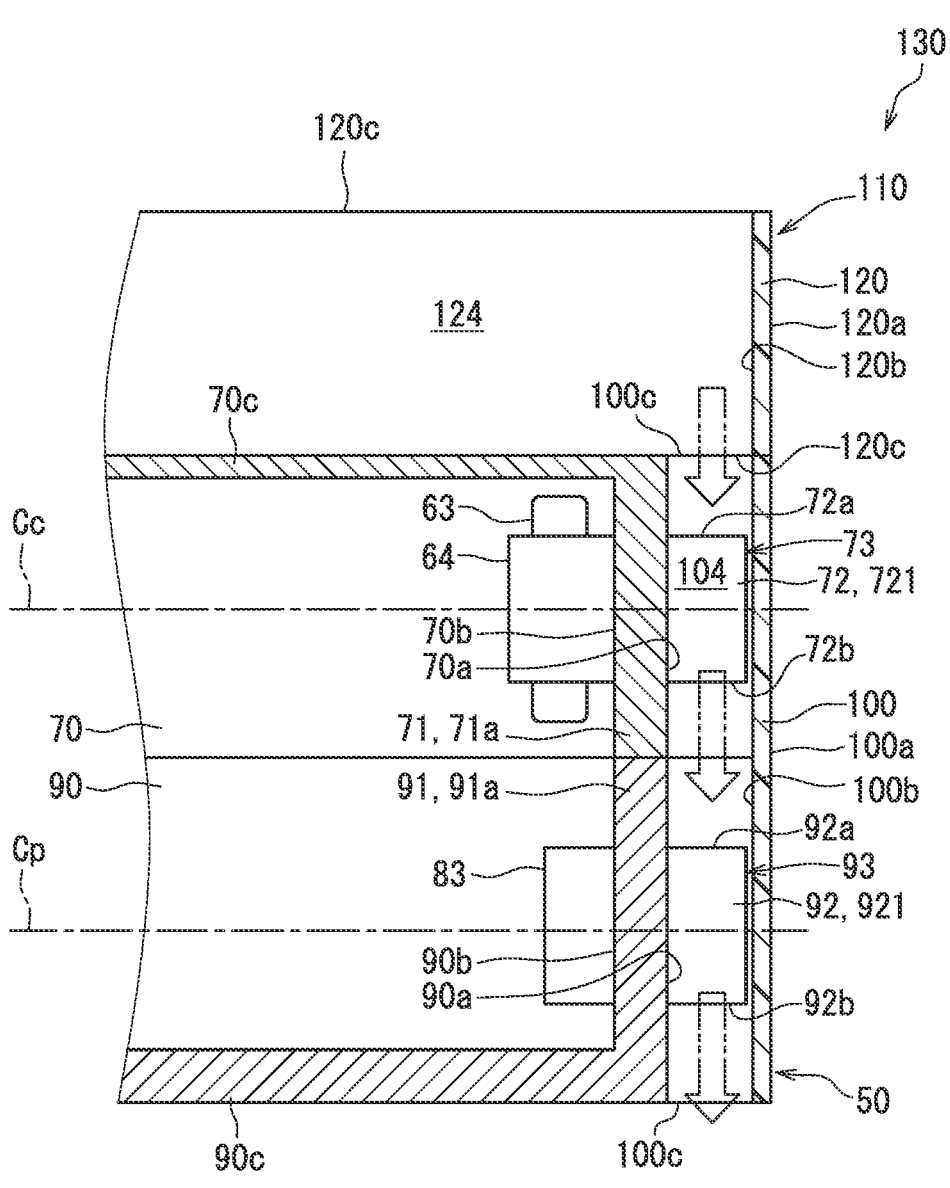
FIG. 7 is a partial cross-sectional view of the motor and the inverter.
Figure 7:
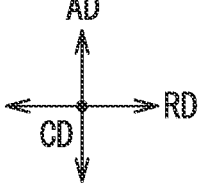

As shown in FIG. 7, a coil 63 and a coil support portion 64 are accommodated in the motor housing 70. The coil 63 and the coil support portion 64 are provided in the motor 61 and each of the coil 63 and the coil support portion 64 is one component constituting the motor 61. The coil 63 and the coil support portion 64 are likely to generate heat as the motor 61 is driven. The coil 63 and the coil support portion 64 correspond to a heat generation member. The coil 63 is a winding constituting the motor 61. The coil 63 is formed in an annular shape as a whole and extends along the inner peripheral surface 70b inside the motor housing 70. The coil support portion 64 is fixed to the motor housing 70 and supports the coil 63. Multiple coil support portions 64 are arranged along the inner peripheral surface 70b in the circumferential direction CD. The coil support portions 64 are attached to the inner peripheral surface 70*b*. Each of the coil support portions 64 is made of a resin material or the like.

The motor fin 72 is provided at a position aligned with the coil 63 in the radial direction RD. At least a part of the motor fin 72 is located at, in the axial direction AD, a position overlapped with the coil 63 in the radial direction RD. The motor fin 72 is located at a position through which a coil center line Cc passes. The coil center line Cc is a virtual straight line extending in the radial direction RD passing through a center of the coil 63. For example, the motor fin 72 is disposed such that the coil center line Cc passes through a center of the motor fin 72.

In the motor housing 70, an overlapping region of the outer peripheral surface 70*a* that is overlapped with the coil 63 in the radial direction RD extends in an annular shape in the circumferential direction CD. The overlapping region is a region to which the heat from the coil 63 serving as the heat generation member tends to be transferred. That is, the overlapping region is a region corresponding to a high heat region AE1 to be described later. The motor housing 70 is configured such that one high heat region AE1 makes one round of the outer peripheral surface 70*a* in the circumferential direction CD.

As shown in FIG. 4, the inverter housing 90 has an outer peripheral surface 90*a*, an inner peripheral surface 90*b* (see FIGS. 6 and 7), and a downstream end surface 90*c*. Each of the outer peripheral surface 90*a* and the inner peripheral surface 90*b* extends along the motor axis Cm in the axial direction AD and extends in an annular shape in the circumferential direction CD. The downstream end surface 90*c* is an end surface of the inverter housing 90 and faces a side opposite to the blower fan 111. The downstream end surface 90*c* extends in the direction orthogonal to the axial direction AD. The outer peripheral surface 90*a* includes an outer peripheral upstream end 90*a*1 and an outer peripheral downstream end 90*a*2. The outer peripheral upstream end 90*a*1 is an upstream-side end portion of the outer peripheral surface 90*a*. The outer peripheral downstream end 90*a*2 is a downstream-side end portion of the outer peripheral surface 90*a* and extends along an outer peripheral edge of the downstream end surface 90*c*.

As shown in FIGS. 4 and 5, the inverter housing 90 includes a housing main body 91, inverter fins 92, flanges 95, and a housing protrusion portion 96. The housing main body 91 is formed in a tubular shape as a whole and extends along the motor axis Cm. On the housing main body 91, the outer peripheral surface 90*a*, the inner peripheral surface 90*b*, and the downstream end surface 90*c* are formed.

The inverter fins 92 are fins provided on the outer peripheral surface 90*a*. The inverter fins 92 can release heat of the inverter device 80 to an outside, and corresponds to the radiation fin. The inverter fins 92 increase a surface area of the inverter housing 90, and thus enhance a heat radiation effect from the inverter housing 90.

The inverter fins 92 protrude from the outer peripheral surface 90*a*. The inverter fins 92 are provided integrally with the housing main body 91. Each of the inverter fins 92 is formed in a plate shape. The inverter fin 92 extends from the housing main body 91 toward the radially outer side and extends in the axial direction AD. For example, the inverter fin 92 extends in the radial direction RD in a manner of being overlapped with the radial line. Multiple inverter fins 92 are arranged along the outer peripheral surface 90*a* in the circumferential direction CD. In two of the inverter fins 92 adjacent to each other in the circumferential direction CD, respective plate surfaces face each other. The inverter fins 92 are provided near a center of the outer peripheral surface 90*a* in the axial direction AD. Each of the inverter fins 92 is located at a position separated from both the outer peripheral upstream end 90*a*1 and the outer peripheral downstream end 90*a*2 on the outer peripheral surface 90*a*. In the radial direction RD, a protrusion dimension of the inverter fin 92 from the outer peripheral surface 90*a* is larger than a protrusion dimension of each of the flanges 95 from the outer peripheral surface 90*a*.

The inverter fin 92 includes a fin upstream end 92*a* and a fin downstream end 92*b*. In both ends of the inverter fin 92 arranged in the axial direction AD, an end portion on a side facing the blower fan 111 is the fin upstream end 92*a*, and an end portion on an opposite side is the fin downstream end 92*b*.

The flange 95 is provided on the outer peripheral surface 90*a* and protrudes from the outer peripheral surface 90*a*. The flange 95 extends from the housing main body 91 toward the radially outer side. A width dimension of the flange 95 in the circumferential direction CD is larger than a plate thickness dimension of the inverter fin 92. The flange 95 has an upstream surface 95*a*. The upstream surface 95*a* is a surface facing the blower fan 111 among outer surfaces of the flange 95. The upstream surface 95*a* extends in the direction orthogonal to the axial direction AD. Since the flange 95 has the large width dimension and the upstream surface 95*a* thereof is orthogonal to the axial direction AD, the flange 95 tends to be an obstacle for the air flowing in the axial direction AD. The flange 95 is likely to restrict the air from flowing in the axial direction AD, and corresponds to the obstacle.

The flange 95 is, for example, a case fixing portion. The flange 95 is a portion for fixing the inverter housing 90 to a fixing target such as the motor housing 70. A fixing tool such as a bolt is screwed into the flange 95, for example.

As shown in FIG. 5, as the flanges 95, upstream flanges 951 and downstream flanges 952 are provided on the outer peripheral surface 90*a*. Each of the upstream flanges 951 is located at a position near the outer peripheral upstream end 90*a*1 on the outer peripheral surface 90*a*. The upstream flange 951 extends, for example, from the outer peripheral upstream end 90*a*1 toward the outer peripheral downstream end 90*a*2 in the axial direction AD. The downstream flange 952 is located at a position near the outer peripheral downstream end 90*a*2 on the outer peripheral surface 90*a*. The downstream flange 952 extends, for example, from the outer peripheral downstream end 90*a*2 toward the outer peripheral upstream end 90*a*1. Multiple upstream flanges 951 and multiple downstream flanges 952 are arranged along the outer peripheral surface 90*a* in the circumferential direction CD.

Figure 6:
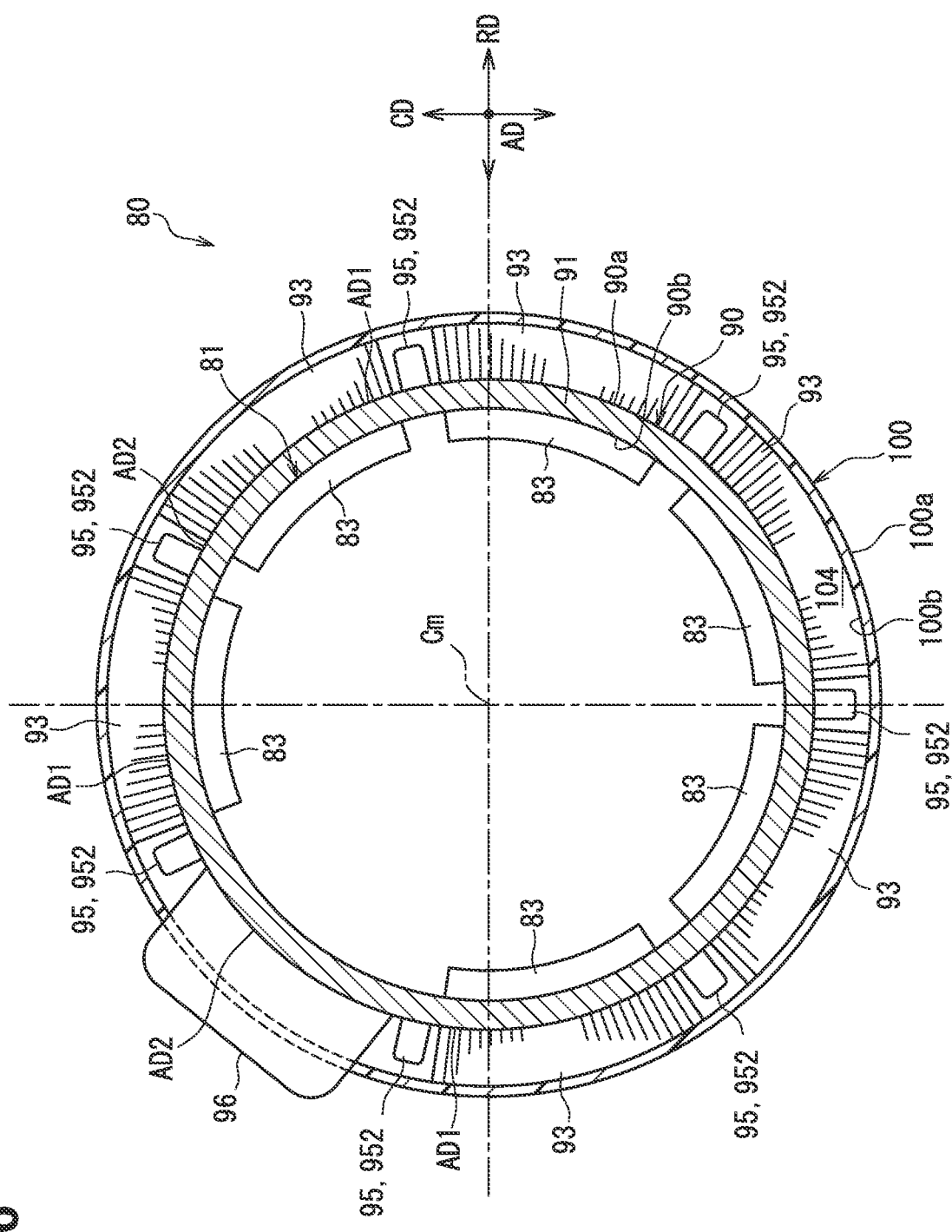
FIG. 6 is a horizontal cross-sectional view of the inverter.

As shown in FIG. 6, the housing protrusion portion 96 is a protrusion provided on the outer peripheral surface 90*a*. The housing protrusion portion 96 protrudes from the outer peripheral surface 90*a*. The housing protrusion portion 96 extends from the housing main body 91 toward the radially outer side. As the housing protrusion portion 96, there is a portion protruding toward the radially outer side to match an internal structure of the inverter housing 90, a connector portion for electrically connecting the inverter device 80 to an external device, and the like. For example, the housing protrusion portion 96 shown in FIG. 6 is a large protrusion.

Switch modules 83 are accommodated in the inverter housing 90. Each of the switch modules 83 is provided in the driver 81 and is one of components constituting the driver 81. The switch module 83 is likely to generate heat as the driver 81 is driven. The switch module 83 corresponds to the heat generation member. The switch module 83 includes a switching element and an element protection portion. The switching element is a semiconductor device constituting the inverter or the like. The element protection portion is made of a resin material and protects the switching element in a state of covering the switching element. Multiple switch modules 83 are arranged along the inner peripheral surface 90b inside the inverter housing 90 in the circumferential direction CD. Each switch module 83 is attached to the inner peripheral surface 90b.

Multiple switch modules 83 are provided for each of the multiple phases. For example, multiple switch modules 83 are provided for each of the U-phase, the V-phase, and the W-phase. In each of the U-phase, the V-phase, and the W-phase, the switching elements of the multiple switch modules 83 are connected in parallel.

As shown in FIGS. 5 and 6, the outer peripheral surface 90a has the high heat regions AE1 and low heat regions AE2. The high heat region AE1 is a region to which the heat from the driver 81 is relatively easily applied. The high heat region AE1 is a region located at a position overlapped with the switch module 83 in the radial direction RD. For a pair of the high heat region AE1 and the switch module 83 that are aligned in the radial direction RD, the heat from the switch module 83 is likely to be transferred to the high heat region AE1 via the housing main body 71. Multiple high heat regions AE1 are arranged in the circumferential direction CD to match the positions of the switch modules 83. The high heat region AE1 is a region spanning the outer peripheral upstream end 90a1 and the outer peripheral downstream end 90a2 in the axial direction AD.

Each of the low heat regions AE2 is a region to which the heat from the driver 81 is less likely to be applied as compared with the high heat region AE1. The low heat region AE2 is a region located at a position not overlapped with the switch module 83 in the radial direction RD. The low heat region AE2 is located farther from the switch module 83 than the high heat region AE1. A separation distance between the low heat region AE2 and the switch module 83 is smaller than a separation distance between the high heat region AE1 and the switch module 83. The low heat region AE2 is located at a position, in the radial direction RD, overlapped with a separation region located between two switch modules 83 adjacent to each other in the circumferential direction CD. The heat from the switch module 83 is less likely to be transferred to the low heat region AE2 than to the high heat region AE1. The low heat region AE2 is a region that is between two of the high heat regions AE1 adjacent to each other in the circumferential direction CD and that spans these high heat regions AE1. Multiple low heat regions AE2 are arranged in the circumferential direction CD. The low heat region AE2 is a region spanning the outer peripheral upstream end 90a1 and the outer peripheral downstream end 90a2 in the axial direction AD.

In the motor housing 70 and the inverter housing 90, the low heat region AE2 is located between two hidden regions AL2 adjacent to each other in the circumferential direction CD. The low heat region AE2 is located at a position separated from both of the hidden regions AL2 in the circumferential direction CD. The low heat region AE2 is located at a position aligned with the exposed region AL1 in the axial direction AD, and extends from the exposed region AL1 in the axial direction AD. The high heat region AE1 spans two of the exposed regions AL1 adjacent to each other in the circumferential direction CD with the hidden region AL2 interposed between. The high heat region AE1 extends in the axial direction AD from both the exposed region AL1 and the hidden region AL2. The high heat region AE1 corresponds to a first heat region, and the low heat region AE2 corresponds to a second heat region.

In the inverter housing 90, as shown in FIG. 6, multiple large switch modules 83 are arranged along the inner peripheral surface 90b in the circumferential direction CD. In the inverter housing 90, multiple switch module groups may be arranged along the inner peripheral surface 90b in the circumferential direction CD. In the switch module group, multiple small-sized switch modules 83 are arranged. In the configuration, the high heat region AE1 is a region located at a position overlapped with one switch module group in the radial direction RD.

As shown in FIG. 5, in the inverter housing 90, the flange 95 is provided in the low heat region AE2. The flange 95 is located at a position separated in the circumferential direction CD from both of the two high heat regions AE1 adjacent to each other in the circumferential direction CD.

The high heat region AE1 is a region to which the heat is more easily released as compared with the low heat region AE2. The inverter fin 92 is provided in the high heat region AE1, and the inverter fin 92 is not provided in the low heat region AE2. In the high heat region AE1, the heat from the switch module 83 is easily released by the inverter fin 92. The high heat region AE1 corresponds to a fin region, and the low heat region AE2 corresponds to a finless region.

Multiple inverter fins 92 are provided in each of the multiple high heat regions AE1. When the multiple inverter fins 92 provided in one high heat region AE1 are referred to as an inverter fin group 93, one inverter fin group 93 is provided in one high heat region AE1. Multiple inverter fin groups 93 are arranged together with the high heat regions AE1 in the circumferential direction CD. In the circumferential direction CD, the low heat region AE2 exists between two of the inverter fin groups 93 adjacent to each other. The inverter fin 92 is located at, in the circumferential direction CD, a position overlapped with the switch module 83 in the radial direction RD.

In the present embodiment, parallel fins 923 are provided on the outer peripheral surface 90a as the inverter fins 92. The parallel fins 923 extend parallel to the motor axis Cm. The parallel fin 923 is not inclined with respect to the motor axis Cm in the circumferential direction CD, and extends straight in the axial direction AD. In each of the parallel fins 923, a pair of plate surfaces are both flat surfaces. The parallel fin 923 corresponds to the radiation fin.

Multiple parallel fins 923 are arranged in the circumferential direction CD in each of the multiple high heat regions AE1. In one high heat region AE1, the multiple parallel fins 923 have the same size and shape. The multiple parallel fins 923 are the same in, for example, a length dimension in the axial direction AD, a plate thickness dimension, and a protrusion dimension from the outer peripheral surface 90a. The multiple parallel fins 923 extend parallel to each other. The multiple parallel fins 923 are arranged at equal intervals in the circumferential direction CD.

In the multiple high heat regions AE1, the parallel fins 923 have the same size and shape. The intervals between the multiple parallel fins 923 are also the same in the multiple high heat regions AE1.

As shown in FIG. 7, the inverter fin 92 is located at a position aligned with the switch module 83 in the radial direction RD. At least a part of the inverter fin 92 is located at, in the axial direction AD, a position overlapped with the switch module 83 in the radial direction RD. The inverter fin 92 is located at a position through which a module center line Cp passes. The module center line Cp is a virtual straight line extending in the radial direction RD passing through a center of the switch module 83. For example, the inverter fin 92 is disposed such that the module center line Cp passes through a center of the inverter fin 92.

Although not shown, the inverter housing 90 also has exposed regions AL1 and hidden regions AL2 on the outer peripheral surface 90a. Each of the hidden regions AL2 is, for example, a region hidden behind the upstream flange 951 with respect to the blower fan 111. Each of the exposed regions AL1 is, for example, a region exposed without being hidden behind the upstream flange 951 with respect to the blower fan 111.

As shown in FIGS. 6 and 7, the fin cover 100 has an outer peripheral surface 100a, an inner peripheral surface 100b, and cover opening portions 100c. Each of the outer peripheral surface 100a and the inner peripheral surface 100b extends along the motor axis Cm in the axial direction AD and extends in an annular shape in the circumferential direction CD. The cover opening portions 100c are provided at both ends of the fin cover 100 arranged in the axial direction AD. The inner peripheral surface 100b corresponds to a cover inner peripheral surface.

The inner peripheral surface 100b of the fin cover 100 extends along the outer peripheral surfaces 70a and 90a in a state of facing the outer peripheral surfaces 70a and 90a. A part or all of the motor fins 72 and the inverter fins 92 are in contact with the inner peripheral surface 100b. For example, tip end surfaces of the motor fins 72 and the inverter fins 92 are overlapped with the inner peripheral surface 100b. In the fin cover 100, the inner peripheral surface 100b is in a state of being pressed against the motor fins 72 and the inverter fins 92 by a restoring force generated due to elastic deformation. In this way, a relative position of the fin cover 100 with respect to the motor housing 70 and the inverter housing 90 is maintained by the restoring force of the fin cover 100. In FIG. 7, for convenience of illustration, a gap is illustrated between the inner peripheral surface 100b and the fins 72 and 92, but actually, the gap is less likely to occur.

As shown in FIG. 7, the shroud 120 has an outer peripheral surface 120a, an inner peripheral surface 120b, and shroud opening portions 120c. The outer peripheral surface 120a and the inner peripheral surface 120b extend along the motor axis Cm in the axial direction AD and extend in an annular shape in the circumferential direction CD. The shroud opening portions 120c are provided at both ends of the shroud 120 arranged in the axial direction AD. An internal space 124 of the shroud 120 is opened by the shroud opening portions 120c in the axial direction AD. In the shroud 120, the blower fan 111 is accommodated in the internal space 124.

The shroud 120 and the fin cover 100 are arranged in the axial direction AD. In the shroud 120 and the fin cover 100, the outer peripheral surfaces 100a and 120a are arranged in the axial direction AD, and the inner peripheral surfaces 100b and 120b are arranged in the axial direction AD. For example, the inner peripheral surfaces 100b and 120b form a continuous surface continuously extending in the axial direction AD.

The EDS 50 includes a cover passage 104. The cover passage 104 is formed between the fin cover 100 and the motor housing 70 and between the fin cover 100 and the inverter housing 90. In the fin cover 100, the motor housing 70, and the inverter housing 90, the inner peripheral surface 100b and the outer peripheral surface 70a, 90a are separated from each other with the motor fins 72 and the inverter fins 92 interposed therebetween. The separation portion serves as the cover passage 104. The cover passage 104 is opened by the cover opening portions 100c in the axial direction AD. In the shroud 120, the internal space 124 is in communication with the cover passage 104.

As shown in FIGS. 5 and 7, when the air from the blower fan 111 is sent toward the EDS 50 as the swirling flow, the swirling flow flows from the internal space 124 into the cover passage 104, flows along the outer peripheral surface 70a, 90a, and flows out from the cover passage 104. The swirling flow that has reached the exposed region AL1 in the cover passage 104 travels along the plate surface of the forward inclined fin 721.

In FIG. 5, in the motor housing 70, in two of the hidden regions AL2 adjacent to each other in the circumferential direction CD, the hidden region AL2 closer to the fin downstream end 72b than to the fin upstream end 72a in the circumferential direction CD is referred to as a "forward hidden region AL2". The swirling flow flowing along the forward inclined fins 721 easily flows into the "forward hidden region AL2". For example, the forward inclined fin 721 located closest to the "forward hidden region AL2" in the exposed region AL1 guides the swirling flow to flow into the "forward hidden region AL2". In FIG. 5, when the hidden region AL2 in the center is defined as the "forward hidden region AL2", the forward inclined fin 721 in the exposed region AL1 on a right side guides the swirling flow to flow into the "forward hidden region AL2".

In the inverter housing 90, in two of the high heat regions AE1 adjacent to each other in the circumferential direction CD, the high heat region AE1 closer to the fin downstream end 72b than to the fin upstream end 72a in the circumferential direction CD is referred to as a "forward high heat region AE1". The swirling flow flowing along the forward inclined fins 721 easily flows into the "forward high heat region AE1". For example, the forward inclined fin 721 in the exposed region AL1 is inclined with respect to the motor axis Cm in the circumferential direction CD in a manner of extending toward the "forward high heat region AE1", and guides the swirling flow to flow into the "forward high heat region AE1". In FIG. 5, when the high heat region AE1 in a center is referred to as the "forward high heat region AE1", the forward inclined fin 721 in the exposed region AL1 on the right side guides the swirling flow to flow into the "forward high heat region AE1".

The swirling flow sent from the blower fan 111 is likely to continue swirling in the circumferential direction after passing through the forward inclined fins 721 because the forward inclined fin 721 is inclined with respect to the motor axis Cm in the circumferential direction CD. On the other hand, since the parallel fin 923 extends parallel to the motor axis Cm, the swirling flow is likely to become a parallel flow that travels parallel to the motor axis Cm after passing through the parallel fin 923. The parallel fin 923 has a flow regulation function of regulating the air flowing as the swirling flow to travel along the motor axis Cm. The swirling flow is likely to become the parallel flow due to the flow regulation function of the parallel fin 923. The parallel flow regulated by the parallel fin 923 is released to an outside from the cover passage 104 toward the downstream side while being maintained as the parallel flow.

According to the present embodiment described above, in the motor housing 70, the forward inclined fin 721 that is inclined with respect to the motor axis Cm in the circumferential direction CD is provided on the outer peripheral surface 70a. In the configuration, the air flowing along the outer peripheral surface 70*a* can be guided by the forward inclined fin 721 to enhance an effect of cooling the EDS 50. Therefore, for example, even if the number and a size of each of the motor fin 72 and the inverter fin 92 are limited in order to avoid the EDS 50 from becoming too heavy for the eVTOL 10, a decrease in the effect of cooling the EDS 50 can be reduced by the forward inclined fins 721. Therefore, both the cooling effect enhancement and weight reduction of the EDS 50 can be achieved by the forward inclined fins 721. In this way, the EDS 50 and the EDS unit 130 suitable for mounting on the eVTOL 10 can be implemented by the forward inclined fins 721.

For example, in a configuration which is different from that of the present embodiment and in which the forward inclined fins 721 are not included in the motor fins 72, there is no motor fin 72 that is inclined in a manner of extending along the swirling flow generated by the blower fan 111. In the configuration, it is conceivable that a pressure loss of the swirling flow that flows between the multiple motor fins 72 is increased because the flow of the swirling flow that has reached the motor fins 72 is disturbed. There is a concern that a volume of air of the swirling flow flowing between the multiple motor fins 72 is insufficient and a heat radiation effect based on the motor fins 72 is decreased when the pressure loss is increased in this way. There is a concern that a volume of air flowing between the inverter fins 92 disposed downstream of the motor fins 72 is also decreased and a heat radiation effect based on the inverter fins 92 is also decreased.

Meanwhile, according to the present embodiment, the forward inclined fin 721 is inclined in the manner of extending along the swirling flow generated by the blower fan 111. In the configuration, the forward inclined fin 721 can guide the flow of the swirling flow to avoid disturbance of the flow of the swirling flow. Therefore, the flow of the swirling flow that has reached the forward inclined fin 721 is less likely to be disturbed. Thus, the pressure loss of the swirling flow flowing between the multiple forward inclined fins 721 is less likely to be increased, and a volume of air of the swirling flow flowing between the multiple forward inclined fins 721 is less likely to be insufficient. Therefore, the volume of air of the swirling flow flowing between the multiple forward inclined fins 721 can be sufficiently secured for cooling of the motor device 60. In this way, the heat radiation effect based on the forward inclined fins 721 can be enhanced.

According to the present embodiment, the fin cover 100 is attached to the motor housing 70 and the inverter housing 90 in a manner of covering the motor fins 72 and the inverter fins 92 from the outer peripheral side. In the configuration, the swirling flow generated by the blower fan 111 flows through the cover passage 104 formed between the motor housing 70 and the fin cover 100 and between the inverter housing 90 and the fin cover 100. Therefore, the fin cover 100 can restrict the swirling flow from flowing radially outward with respect to the motor fins 72 and the inverter fins 92. Therefore, the fin cover 100 can reduce a decrease in the cooling effect caused by a decrease in the volume of air passing through the motor fins 72 and the inverter fins 92.

However, when the swirling flow flows through the cover passage 104, there is a concern that a pressure loss in the cover passage 104 is increased. Meanwhile, according to the present embodiment, an increase in the pressure loss of the swirling flow can be reduced by the forward inclined fins 721. Therefore, even if the pressure loss in the cover passage 104 is increased, the increase in the pressure loss is reduced by the forward inclined fins 721, and thus the pressure loss is less likely to be excessively increased.

For example, in a configuration which is different from that of the present embodiment and in which all the motor fins 72 extend parallel to the motor axis Cm, the swirling flow generated by the blower fan 111 is not guided in the circumferential direction CD, and is less likely to flow into the hidden region AL2. In the configuration, the swirling flow is likely to flow into the exposed region AL1, and is less likely to flow into the hidden region AL2, and thus in the motor housing 70, heat distribution in the circumferential direction CD tends to be non-uniform. For example, in the motor housing 70, a volume of air in the hidden region AL2 is likely to be smaller than a volume of air in the exposed region AL1. On the other hand, in the motor device 60, a heat generation mode is likely to be uniform in the circumferential direction CD since the coil 63 serving as the heat generation member extends in an annular shape in the circumferential direction CD. In this way, the heat generation mode is likely to be uniform in the circumferential direction CD, but the heat radiation effect is likely to be lower in the hidden region AL2 than in the exposed region AL1, so that in the motor housing 70, the heat distribution in the circumferential direction CD is likely to be non-uniform.

Meanwhile, according to the present embodiment, the forward inclined fins 721 are inclined to guide the swirling flow from the exposed region AL1 to the hidden region AL2. In the configuration, the swirling flow that has flowed into the exposed region AL1 flows along the forward inclined fins 721 and thus is likely to flow into the hidden region AL2. Therefore, the volume of air in the hidden region AL2 is less likely to be smaller than the volume of air in the exposed region AL1. Therefore, it is possible to restrict heat distribution in the circumferential direction CD from being non-uniform in the motor housing 70. The cooling effect can be imparted to the motor housing 70 in the entire circumferential direction CD.

According to the present embodiment, the forward inclined fins 721 are inclined to guide the swirling flow to the high heat region AE1. In the configuration, since the swirling flow flows along the forward inclined fins 721, the swirling flow easily flows into the high heat region AE1, and thus the high heat region AE1 tends to be increased. Therefore, regarding the high heat region AE1 which is a region closer to the switch module 83 in the high heat region AE1 and the low heat region AE2, a decrease in the cooling effect due to a shortage of the volume of air can be reduced by the forward inclined fins 721. Therefore, in the inverter housing 90, an excessive increase in the temperature of a part of the high heat region AE1 or the like can be reduced by the forward inclined fins 721.

According to the present embodiment, the forward inclined fin 721 is provided at a position separated from the high heat region AE1 toward an upstream side of the swirling flow, and is inclined in a manner of extending to the high heat region AE1. Therefore, both a configuration in which the swirling flow is likely to flow along the forward inclined fin 721 and a configuration in which the swirling flow flowing along the forward inclined fin 721 easily reaches the high heat region AE1 can be implemented.

According to the present embodiment, the high heat region AE1 is a region overlapped with the switch module 83 in the circumferential direction CD, and the low heat region AE2 is a region not overlapped with the switch module 83 in the circumferential direction CD. In the configuration, the heat applied to the low heat region AE2 tends to be smaller than the heat applied to the high heat region AE1. Therefore, since the forward inclined fin 721 guides the swirling flow to the high heat region AE1, even if the volume of air in the low heat region AE2 is decreased, a temperature of the low heat region AE2 is less likely to excessively increase. Therefore, even if the volume of air in the low heat region AE2 is smaller than the volume of air in the high heat region AE1, a cooling effect for the inverter housing 90 can be enhanced in the entire circumferential direction CD.

According to the present embodiment, the inverter fin 92 is provided in the high heat region AE1, and the inverter fin 92 is not provided in the low heat region AE2. In the configuration, by using the fact that the temperature of the low heat region AE2 is less likely to excessively increase, a weight of the EDS 50 can be reduced by not providing the inverter fin 92 in the low heat region AE2.

According to the present embodiment, in the forward inclined fin 721, the upstream portion extending from the fin upstream end 72a toward the downstream side is inclined with respect to the motor axis Cm. In the configuration, the swirling flow that has reached the forward inclined fin 721 is likely to flow along the upstream portion of the forward inclined fin 721. Therefore, disturbance of the flow of the swirling flow that has reached the forward inclined fin 721 can be restricted by the upstream portion of the forward inclined fin 721. Therefore, an increase in the pressure loss of the swirling flow flowing between the multiple forward inclined fins 721 can be reduced by the upstream portions of the forward inclined fins 721.

According to the present embodiment, in the inverter housing 90, the parallel fins 923 are provided on the downstream side with respect to the forward inclined fins 721. In the configuration, even if the air sent from the blower fan 111 passes through the forward inclined fins 721 as the swirling flow, the swirling flow is likely to be regulated by the parallel fins 923 into the parallel flow. Since the air discharged from the EDS 50 to the downstream side is the parallel flow, the thrust force or the lift force on the eVTOL 10 is less likely to be decreased. For example, when the flow of the air discharged from the cover passage 104 to the downstream side is the parallel flow, a component flowing in the circumferential direction CD tends to be smaller as compared with a case of the swirling flow. In this way, when the flow of the air discharged from the cover passage 104 to the downstream side is the parallel flow, a component flowing in the axial direction AD is likely to be larger as compared with the case of the swirling flow, and as a result, the thrust force or the lift force on the eVTOL 10 tends to increase. Therefore, from a viewpoint of appropriately managing a flight state of the eVTOL 10, the EDS 50 suitable for mounting on the eVTOL 10 can also be implemented.

In the present embodiment, in the fin cover 100, the tip end surfaces of the motor fins 72 and the inverter fins 92 are in a state of being overlapped with the inner peripheral surface 100b. Therefore, the air generated by the blower fan 111 is likely to flow along the plate surfaces of the motor fins 72 and the inverter fins 92. Therefore, the cooling effect exerted by the motor fins 72 and the inverter fins 92 can be further enhanced.

<Modification 1-1>

A radiation fin such as the motor fin 72 may be provided in the hidden region AL2. In Modification 1-1, for example, the forward inclined fins 721 in the first embodiment described above are provided in the hidden region AL2.

Figure 8:
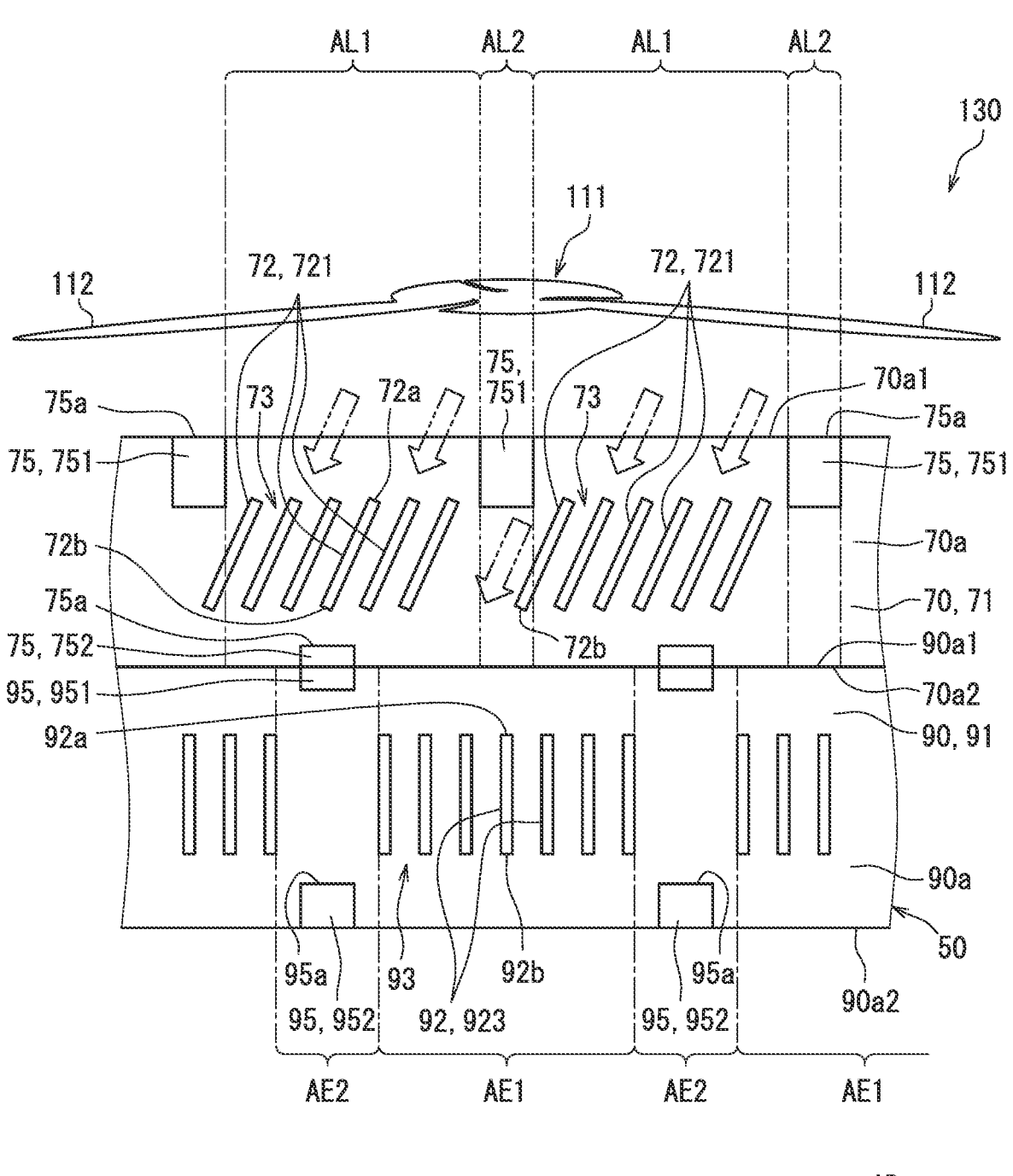
FIG. 8 is a partially developed view of outer peripheral surfaces of a motor and an inverter in Modification 1-1.

As shown in FIG. 8, the forward inclined fin 721 is provided in each of the exposed region AL1 and the hidden region AL2. One forward inclined fin 721 among the multiple forward inclined fins 721 is in a state of spanning the exposed region AL1 and the hidden region AL2. The forward inclined fin 721 is disposed at a position straddling a boundary between the exposed region AL1 and the hidden region AL2 in the circumferential direction CD. In the forward inclined fin 721, the fin upstream end 72a is in the exposed region AL1, and the fin downstream end 72b is in the hidden region AL2. The fin downstream end 72b is located on a side opposite to the blower fan 111 with the upstream flange 751 interposed therebetween in the axial direction AD.

According to the present modification, in one forward inclined fin 721, the fin upstream end 72a is in the exposed region AL1, and the fin downstream end 72b is in the hidden region AL2. In the configuration, the swirling flow traveling along the forward inclined fin 721 in the exposed region AL1 reaches the fin downstream end 72b, thus flowing into the hidden region AL2. Therefore, an effect of cooling the hidden region AL2 can be enhanced by disposing the one forward inclined fin 721 at the position straddling the boundary between the exposed region AL1 and the hidden region AL2.

<Modification 1-2>

Inclination angles of multiple inclined fins such as the forward inclined fins 721 with respect to the motor axis Cm may not be uniform among the inclined fins. In Modification 1-2, for example, the multiple motor fins 72 in the first embodiment described above include reverse inclined fins 722.

Figure 9:
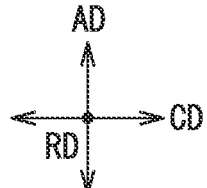
FIG. 9 is a partially developed view of outer peripheral surfaces of a motor and an inverter in Modification 1-2.

As shown in FIG. 9, the multiple motor fins 72 include both the forward inclined fins 721 and the reverse inclined fins 722. Each of the reverse inclined fins 722 is a fin whose orientation inclined in the circumferential direction CD with respect to the motor axis Cm is opposite to that of the forward inclined fin 721. In the reverse inclined fin 722, one of a pair of plate surfaces faces the blower fan 111 and the other faces the inverter device 80. The plate surface of the reverse inclined fin 722 facing the blower fan 111 and the plate surface of the forward inclined fin 721 facing the blower fan 111 are opposite to each other in the circumferential direction CD. The reverse inclined fin 722 corresponds to the radiation fin and the inclined fin.

In the present modification, the reverse inclined fin 722 extends straight in the direction inclined in the circumferential direction CD with respect to the motor axis Cm. The entire reverse inclined fin 722 is the inclined portion. Each of the plate surfaces of the reverse inclined fin 722 has a flat shape. In the reverse inclined fin 722, the plate surfaces are not parallel to the motor axis Cm. That is, in the reverse inclined fin 722, the plate surface is inclined with respect to the motor axis Cm.

For the reverse inclined fin 722, a direction guiding the swirling flow in the circumferential direction CD is opposite to that of the forward inclined fin 721. Therefore, in one exposed region AL1 of two of the exposed regions AL1 adjacent to each other with the hidden region AL2 interposed therebetween in the circumferential direction CD, the motor fin 72 closest to the hidden region AL2 is the forward inclined fin 721. In the other exposed region AL1, the motor fin 72 closest to the hidden region AL2 is the reverse inclined fin 722. In the configuration, the swirling flow is guided from the one exposed region AL1 to the hidden region AL2 by the forward inclined fin 721, and guided from the other exposed region AL1 to the hidden region AL2 by the reverse inclined fin 722. In this way, by guiding the swirling flow from both of the two exposed regions AL1 to one hidden region AL2, a volume of air in the hidden region AL2 is increased, and an effect of cooling the hidden region AL2 can be enhanced.

In the present modification, the multiple forward inclined fins 721 provided in one exposed region AL1 have different inclination angles with respect to the motor axis Cm. In the forward inclined fins 721, the inclination angles gradually increase from one side to the other side in the circumferential direction CD.

<Modification 1-3>

Figure 10:
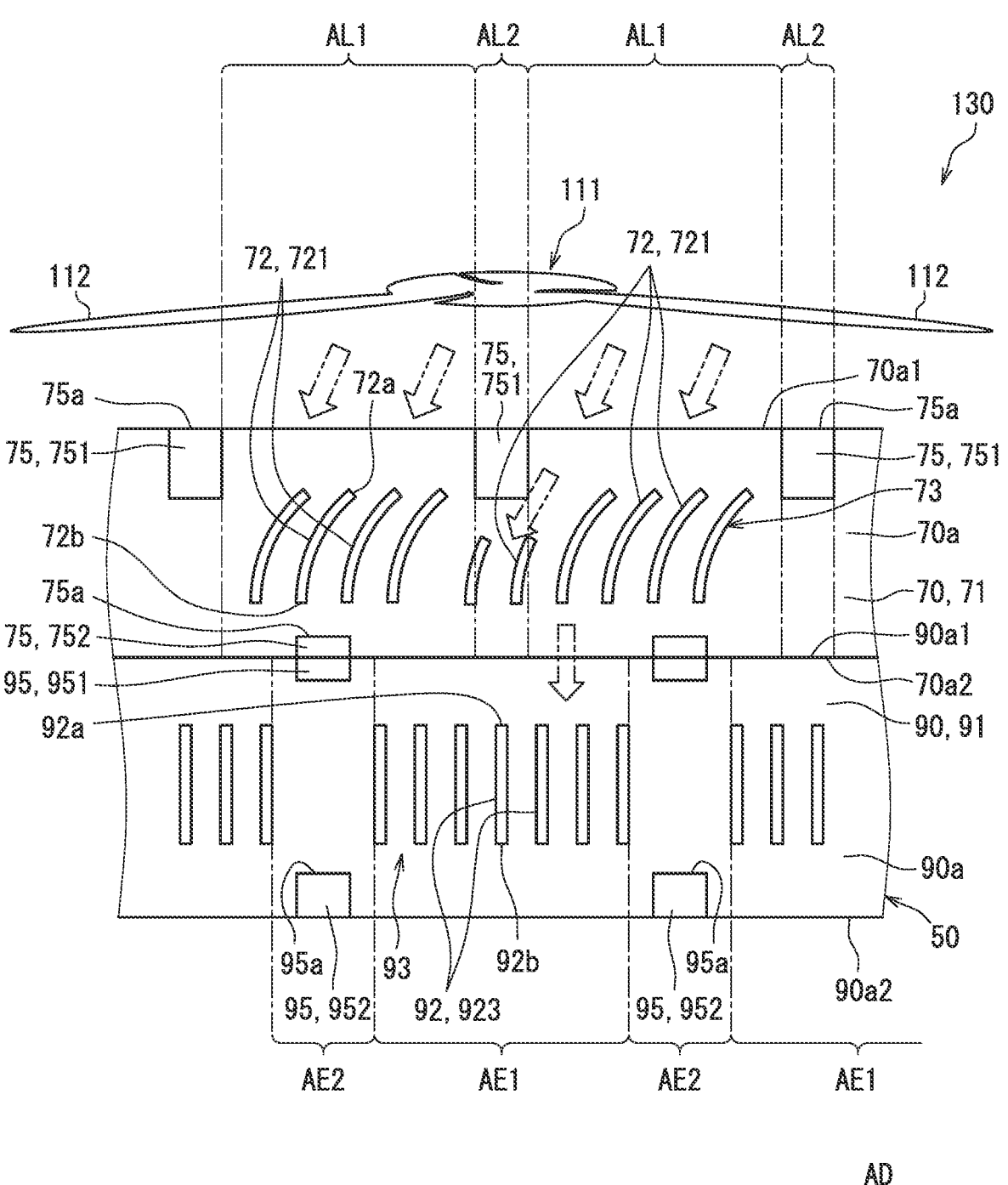
FIG. 10 is a partially developed view of outer peripheral surfaces of a motor and an inverter in Modification 1-3.

A radiation fin such as the motor fin 72 may be bent to bulge in a plate thickness direction of the radiation fin. In Modification 1-3, for example, the forward inclined fin 721 in the first embodiment described above is bent to bulge in the axial direction AD. As shown in FIG. 10, each of the multiple forward inclined fins 721 is curved to bulge toward an upstream side in the axial direction AD. The forward inclined fins 721 are curved to be inclined, as a whole, in a direction extending along the swirling flow. In the forward inclined fin 721, the inclination angle with respect to the motor axis Cm gradually decreases from the fin upstream end 72a toward the fin downstream end 72b.

In the present modification, since the forward inclined fin 721 is bent to bulge toward the upstream side in the axial direction AD, a direction of the swirling flow flowing along the forward inclined fin 721 gradually changes from the fin upstream end 72a toward the fin downstream end 72b. When an air flow passing through the forward inclined fins 721 changes from the swirling flow to the parallel flow, the forward inclined fins 721 have a flow regulation function. In the present modification, the entire forward inclined fin 721 is inclined with respect to the motor axis Cm, and the entire forward inclined fin 721 is the inclined portion.

Figure 11:
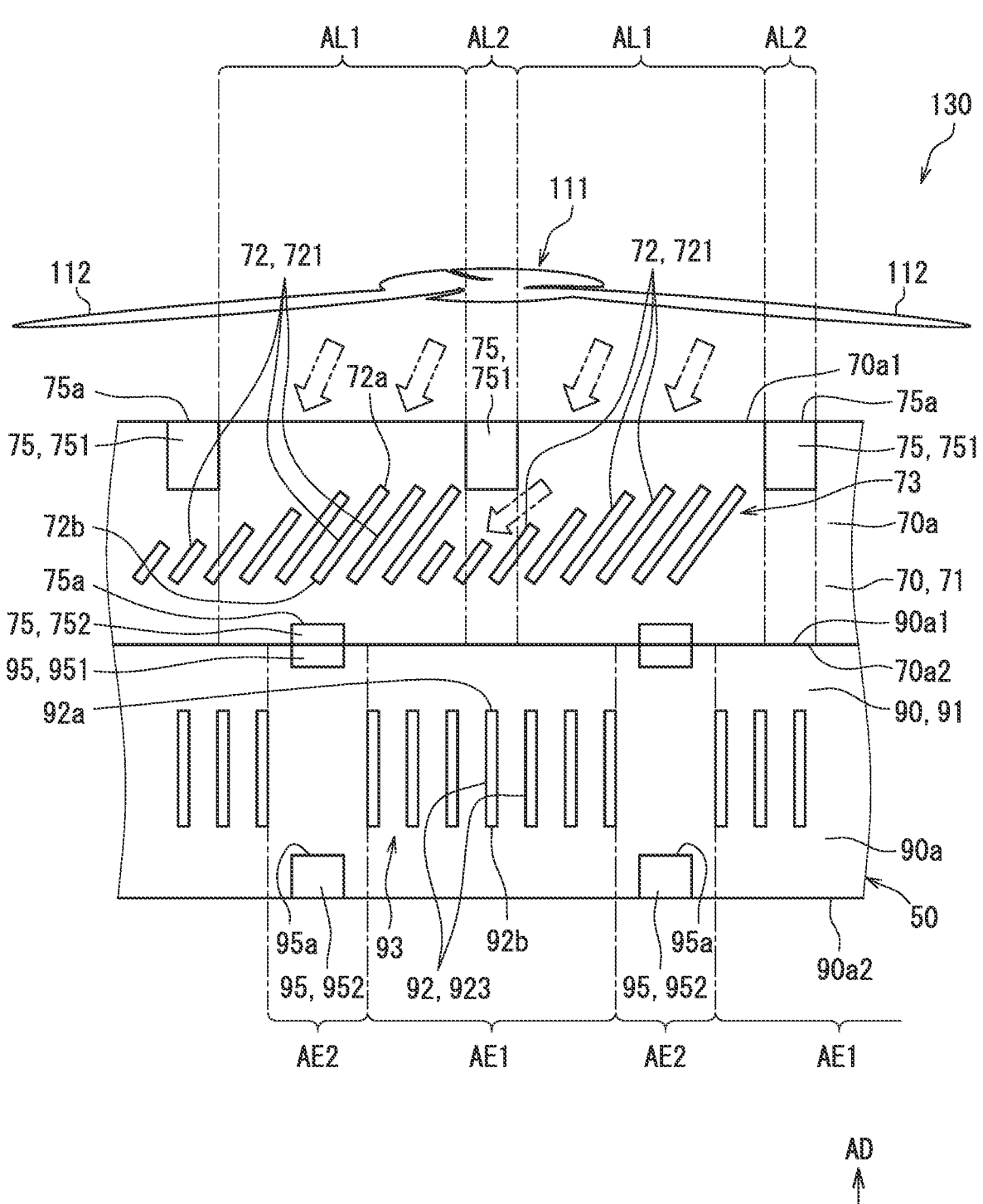
FIG. 11 is a partially developed view of outer peripheral surfaces of a motor and an inverter in Modification 1-4.

Multiple motor fin groups 73 may not be arranged in the circumferential direction CD. In the present modification, one motor fin group 73 extends in an annular shape in a manner of making one round of the outer peripheral surface 70a. For example, as shown in FIGS. 10 and 11, multiple forward inclined fins 721 are provided in both the exposed region AL1 and the hidden region AL2.

<Modification 1-4>

Lengths of the multiple radiation fins in the axial direction AD may not be uniform. In Modification 1-4, for example, lengths of the multiple forward inclined fins 721 in the first embodiment described above in the axial direction AD are different. For example, as shown in FIG. 11, the length dimensions of the multiple forward inclined fins 721 in the axial direction AD gradually decrease from one side to the other side in the circumferential direction CD. As shown in FIG. 10, among the multiple forward inclined fins 721, the forward inclined fin 721 in the hidden region AL2 may be shorter than the forward inclined fin 721 in the exposed region AL1 in the axial direction AD.

<Modification 1-5>

Figure 12:
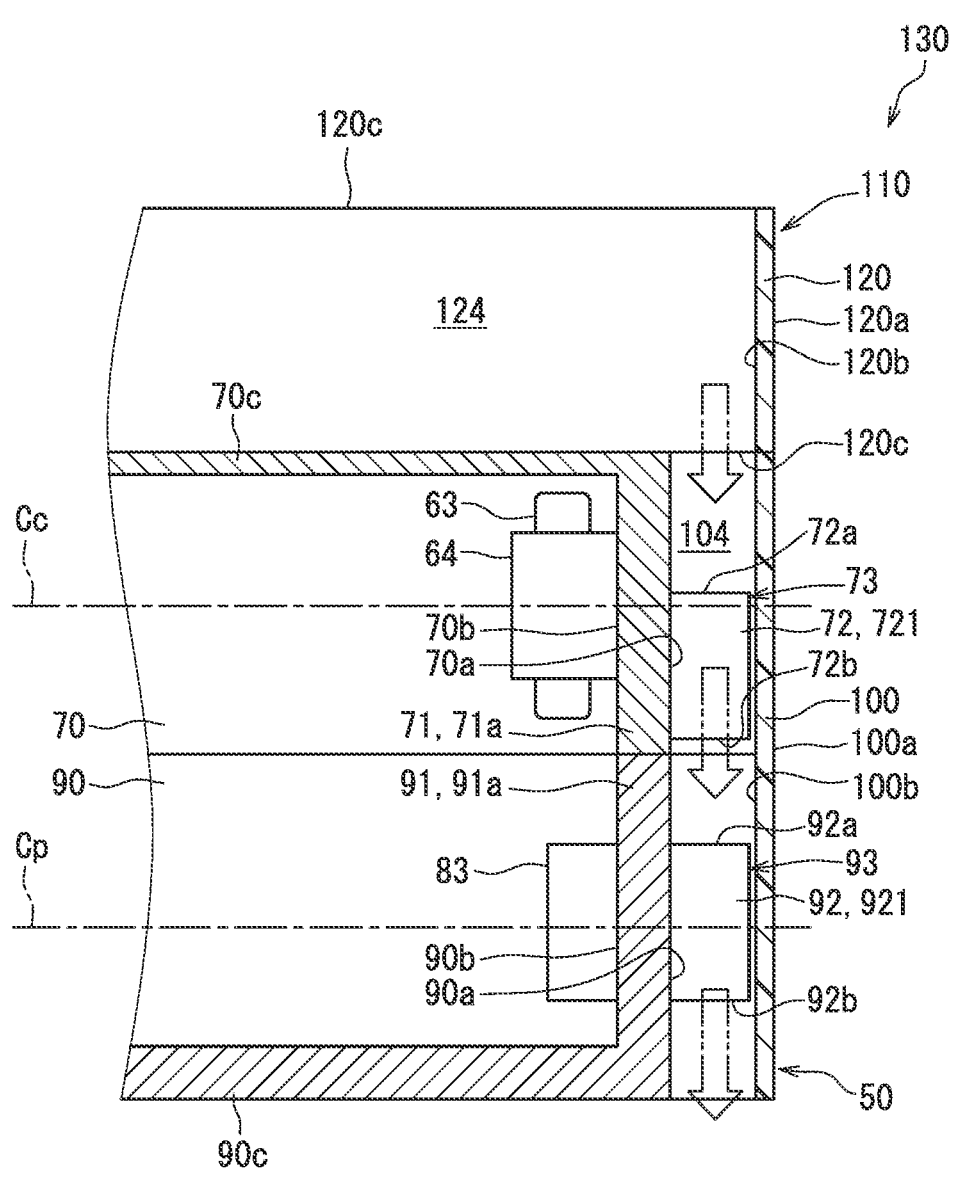
FIG. 12 is a partial vertical cross-sectional view of a motor and an inverter in Modification 1-5.
Figure 12:
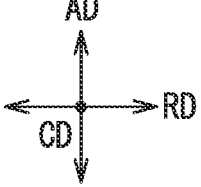

A radiation fin such as the motor fin 72 and a heat generation member such as the coil 63 may be provided at positions deviated in the axial direction AD. In Modification 1-5, for example, the motor fin 72 in the first embodiment described above is located at a position deviated in the axial direction AD with respect to the coil 63. For example, as shown in FIG. 12, the motor fin 72 is located at a position closer to the inverter device 80 with respect to the coil center line Cc. In the configuration in which the radiation fin and the heat generation member are deviated in the axial direction AD, the inverter fin 92 may be located at a position deviated in the axial direction AD with respect to the switch module 83.

Second Embodiment

In a second embodiment, the fin cover 100 includes a cover guide portion. Configurations, operations, and effects not particularly described in the second embodiment are the same as those in the first embodiment described above. In the second embodiment, differences from the first embodiment described above will be mainly described.

Figure 13:
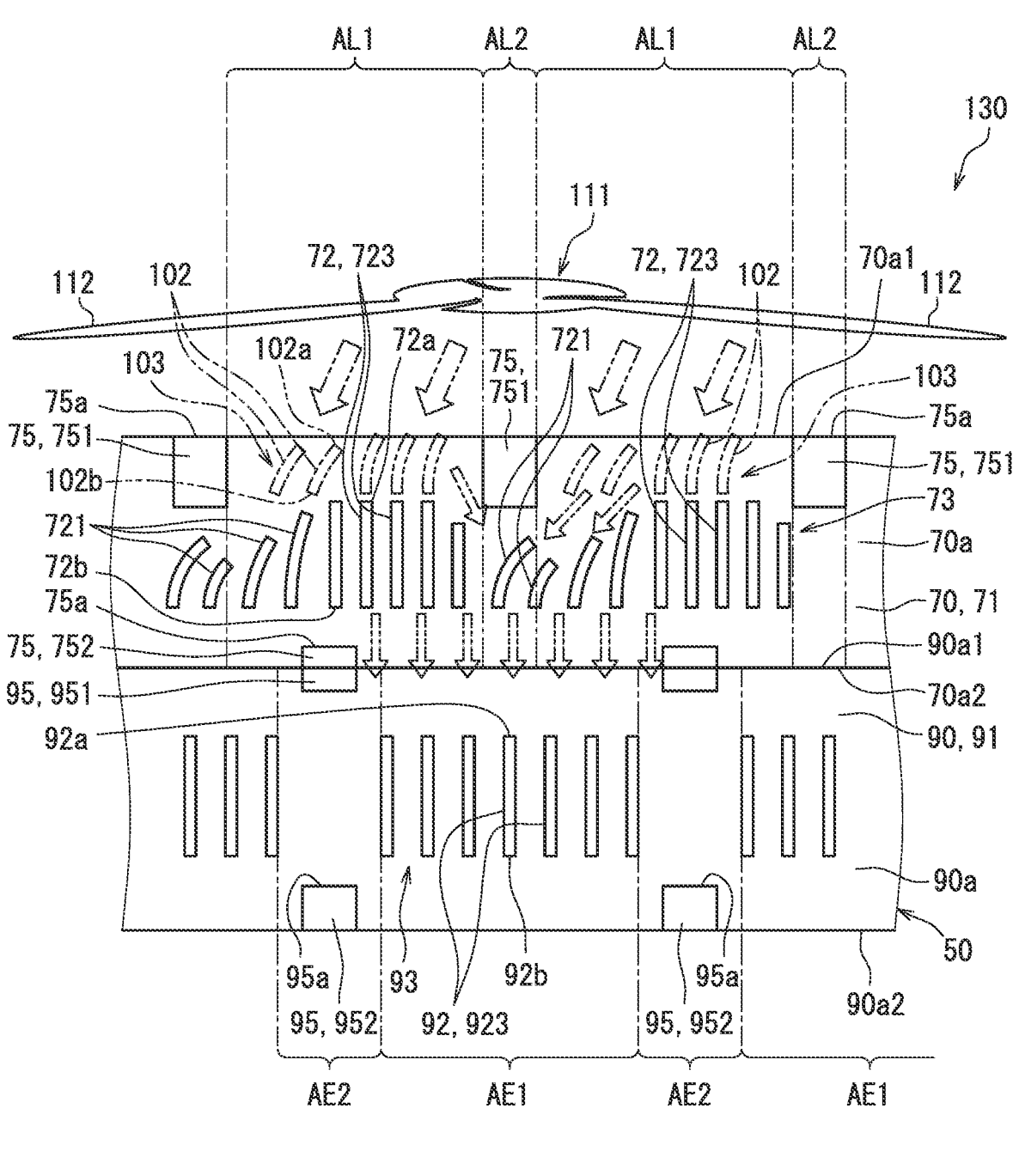
FIG. 13 is a partially developed view of outer peripheral surfaces of a motor and an inverter in a second embodiment.
Figure 14:
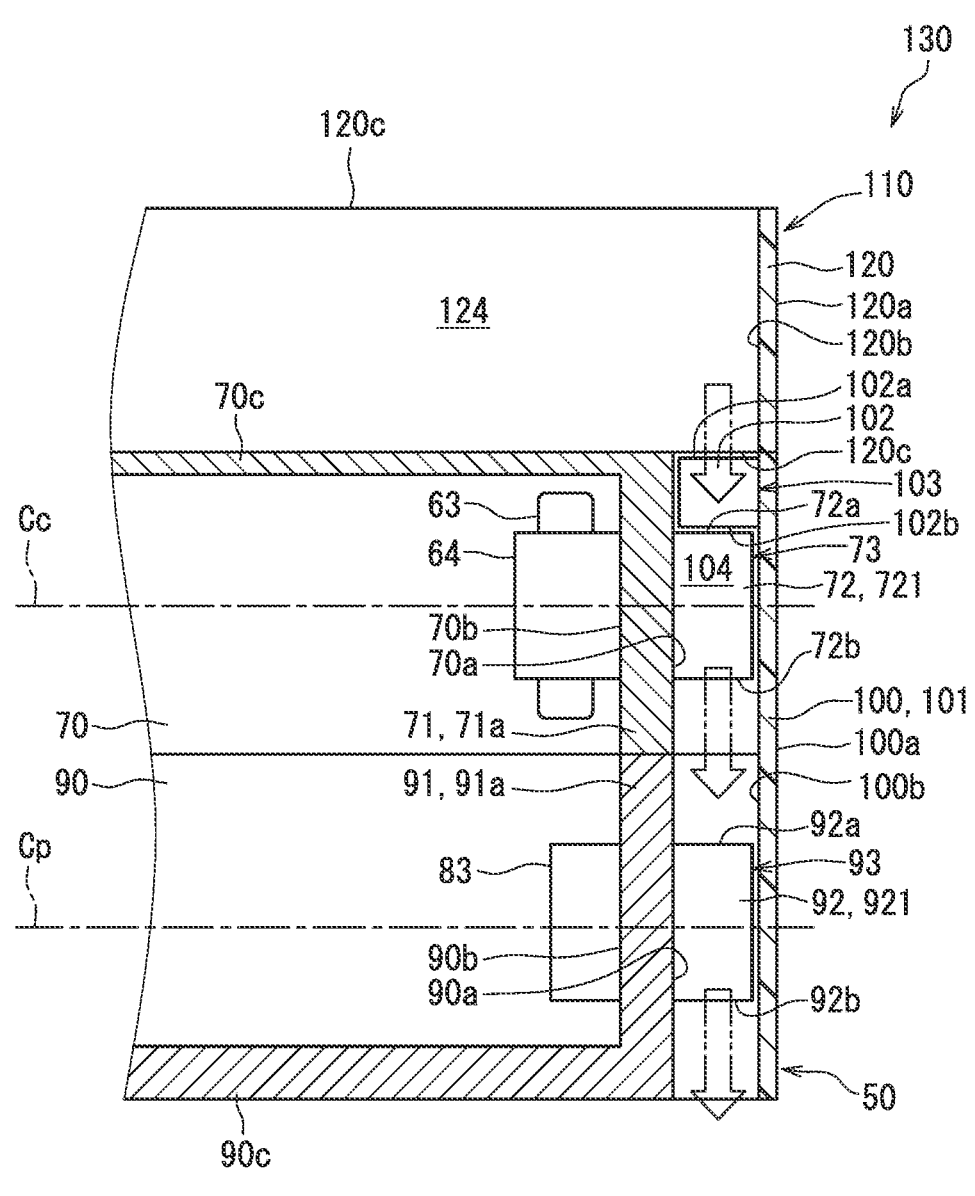
FIG. 14 is a partial vertical cross-sectional view of the motor and the inverter.
Figure 14:
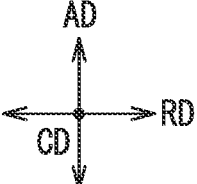

As shown in FIGS. 13 and 14, the fin cover 100 includes a cover main body 101 and cover fins 102. The cover main body 101 is formed in a tubular shape as a whole and extends along the motor axis Cm. The cover main body 101 has the outer peripheral surface 100a, the inner peripheral surface 100b, and the cover opening portions 100c.

Each of the cover fins 102 is a fin provided on the inner peripheral surface 100b. The cover fin 102 protrudes from the inner peripheral surface 100b. The cover fin 102 is provided integrally with the cover main body 101. The cover fin 102 is formed in a plate shape. The cover fin 102 extends from the cover main body 101 toward a radially inner side and extends in the axial direction AD. For example, the cover fin 102 extends in the radial direction RD in a manner of being overlapped with the radial line. Multiple cover fins 102 are arranged along the inner peripheral surface 100b in the circumferential direction CD. In two of the cover fins 102 adjacent to each other in the circumferential direction CD, respective plate surfaces face each other.

The cover fin 102 has a fin upstream end 102a and a fin downstream end 102b. In both ends of the cover fin 102 arranged in the axial direction AD, an end portion on a side facing the blower fan 111 is the fin upstream end 102a, and an end portion on an opposite side is the fin downstream end 102b.

The cover fin 102 is provided on an upstream side of the motor fin 72 in the axial direction AD. The cover fin 102 is located between the outer peripheral upstream end 70a1 and the motor fin 72 in the axial direction AD. The multiple cover fins 102 include a cover fin 102 that is in contact with the motor fin 72 and a cover fin 102 that is separated from the motor fin 72 in the axial direction AD. The multiple cover fins 102 include a cover fin 102 that extends from the outer peripheral upstream end 70a1 toward a downstream side and a cover fin 102 that is located at a position separated from the outer peripheral upstream end 70a1 toward the downstream side.

The cover fin 102 is inclined with respect to the motor axis Cm in the circumferential direction CD. The cover fin 102 is bent to bulge in the axial direction AD. Each of the multiple cover fins 102 is curved to bulge toward the upstream side in the axial direction AD. The cover fins 102 are curved to be inclined, as a whole, in a direction extending along the swirling flow. In the cover fin 102, an inclination angle with respect to the motor axis Cm gradually decreases from the fin upstream end 102a toward the fin downstream end 102b. The direction of the swirling flow flowing along the cover fin 102 gradually changes from the fin upstream end 102a toward the fin downstream end 92b.

The cover fin 102 is inclined with respect to the motor axis Cm in a manner of extending toward the motor fin 72. The cover fin 102 extends downstream toward the motor fin 72. The cover fin 102 guides the swirling flow flowing along the cover fin 102 toward the motor fin 72. The cover fin 102 corresponds to the cover guide portion.

The cover fin 102 is provided at a position overlapped with the exposed region AL1 in the radial direction RD. Multiple cover fins 102 are provided for each of the multiple exposed regions AL1. When the multiple cover fins 102 provided for one exposed region AL1 are referred to as a cover fin group 103, one cover fin group 103 is provided for one exposed region AL1. Multiple cover fin groups 103 are arranged together with the exposed regions AL1 in the circumferential direction CD.

The cover fin 102 is in contact with the outer peripheral surface 70a of the motor housing 70. For example, a tip end surface of the cover fin 102 is overlapped with the outer peripheral surface 70a. For example, in the fin cover 100, the tip end surface of the cover fin 102 is in a state pf being pressed against the outer peripheral surface 70a by a restoring force generated due to elastic deformation. In FIG. 14, for convenience of illustration, a gap is illustrated between the outer peripheral surface 70a and the cover fin 102, but actually, the gap is less likely to occur.

In the present embodiment, at least one cover fin 102 is in contact with the motor fin 72. In the motor fin 72 and the cover fin 102 that are in contact with each other, the fin upstream end 72a and the fin downstream end 102b are in contact with each other in a manner of being overlap with each other in the axial direction AD. For the motor fin 72 and the cover fin 102, the cover fin 102 is in a state of extending from the motor fin 72 toward the upstream side. For example, the plate surface of the cover fin 102 and the plate surface of the motor fin 72 extend continuously in the axial direction AD.

In a manufacturing process of manufacturing the EDS 50, after the motor housing 70 and the inverter housing 90 are fixed, a process of attaching the fin cover 100 to the motor housing 70 and the inverter housing 90 is performed. In the process, an operator allows the fin cover 100 to accommodate the motor housing 70 and the inverter housing 90 such that the upstream end surface 70c enters the cover opening portion 100c. Then, the fin cover 100 is moved relative to the motor housing 70 in the axial direction AD until the fin upstream end 72a is in contact with the fin downstream end 102b. In this way, by bringing the fin upstream end 72a into contact with the fin downstream end 102b, a relative position of the fin cover 100 with respect to the motor housing 70 in the axial direction AD can be determined. The manufacturing process is included in the process of manufacturing the EDS 50.

In the present embodiment, the multiple motor fins 72 include parallel fins 723. Each of the parallel fins 723 extends parallel to the motor axis Cm. The parallel fin 723 is not inclined with respect to the motor axis Cm in the circumferential direction CD, and extends linearly in the axial direction AD. In the parallel fin 723, a pair of plate surfaces are both flat surfaces. The parallel fin 723 corresponds to the radiation fin.

In the present embodiment, an inclination angle with respect to the motor axis Cm, a length dimension in the circumferential direction CD, and a degree of bending in the circumferential direction CD are individually set for each of the multiple motor fins 72 in order to enhance an effect of cooling the motor device 60. For example, the inclination angle of the motor fin 72 with respect to the motor axis Cm increases or decreases from the fin upstream end 72a toward the fin downstream end 72b in one motor fin 72. The inclination angles of the multiple motor fins 72 with respect to the motor axis Cm are different among the motor fins 72. The length dimensions of the multiple motor fins 72 in the axial direction AD are different among the motor fins 72. In addition, the degrees of bending of the multiple motor fins 72 in the circumferential direction CD are different among the motor fins 72. An interval between two of the motor fins 72 adjacent to each other in the circumferential direction CD may not be uniform among the multiple motor fins 72. As long as the effect of cooling the motor device 60 is enhanced, the intervals between the motor fins 72 are preferably not uniform.

In the present embodiment, a shape, a size, and a position for each of the multiple motor fins 72 and the multiple cover fins 102 are set such that the swirling flow becomes a parallel flow by passing through the motor fins 72. In this way, since the motor fins 72 and the cover fins 102 exert a flow regulation function as a whole, air that flows downstream from the motor fins 72 toward the parallel fins 923 easily becomes the parallel flow. In this case, since the parallel flow flows easily along the parallel fin 923, an air flow passing through the inverter fins 92 is less likely to be disturbed. Therefore, an air amount passing through the inverter fins 92 is easily increased, and a heat radiation effect based on the inverter fins 92 can be enhanced easily.

According to the present embodiment, the air from the blower fan 111 is guided to the forward inclined fins 721 by the cover fins 102. In the configuration, the air amount passing through the forward inclined fins 721 can be increased by the cover fins 102. Therefore, the cooling effect exerted by the forward inclined fins 721 can be further enhanced by the cover fins 102. A weight of the EDS 50 can be reduced by replacing a part of the forward inclined fins 721 having an inclined portion shape with the cover fins 102.

<Modification 2-1>

Figure 15:
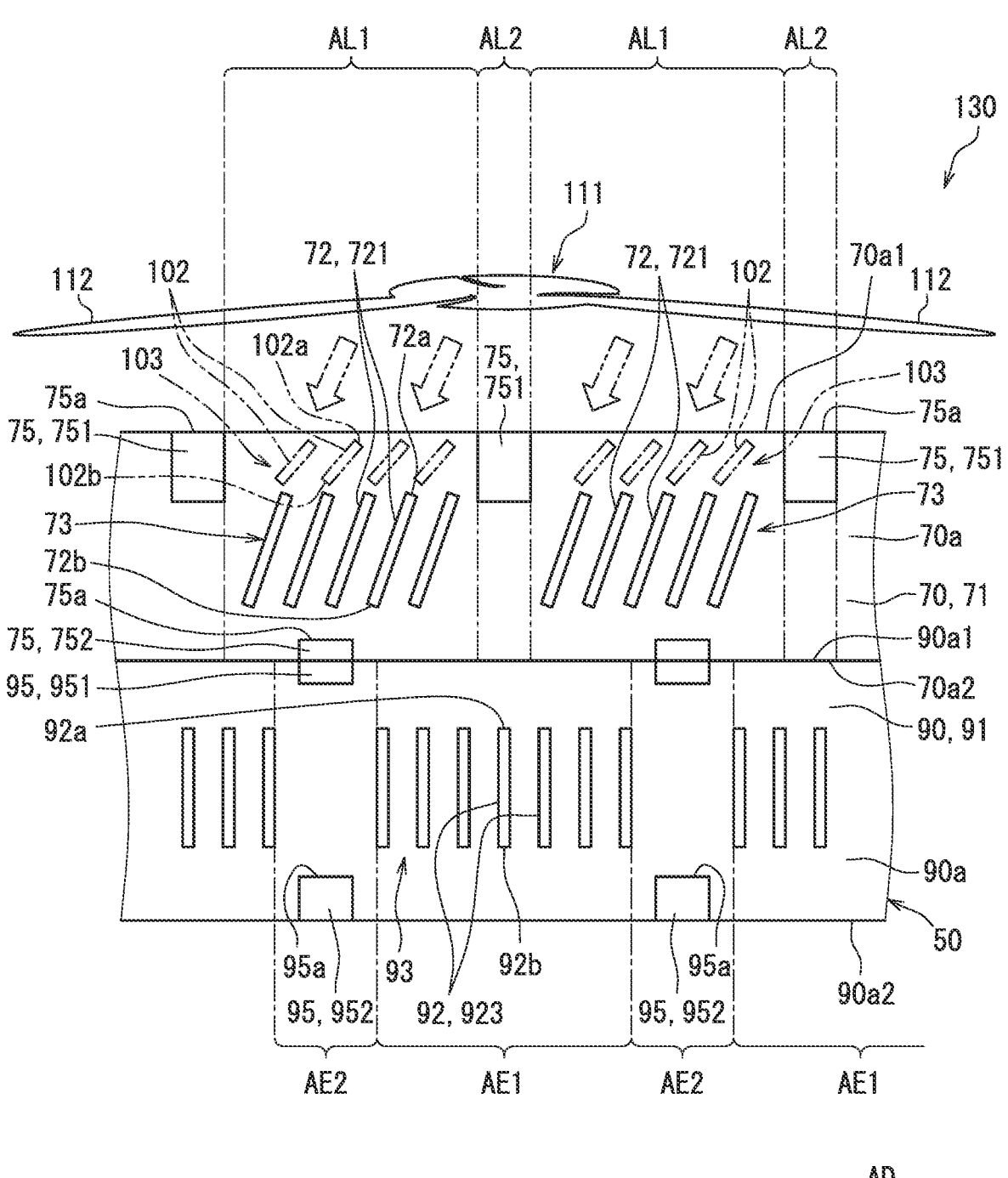
FIG. 15 is a partially developed view of outer peripheral surfaces of a motor and an inverter in Modification 2-1.

The cover fin 102 may not be bent in the circumferential direction CD. In Modification 2-1, for example, the cover fin 102 in the second embodiment described above extends straight. As shown in FIG. 15, the cover fin 102 extends straight in a direction inclined with respect to the motor axis Cm in the circumferential direction CD. In the cover fin 102, the entire portion including an upstream portion extending from the fin upstream end 102a toward the downstream side are inclined with respect to the motor axis Cm in the circumferential direction CD. An inclination angle of the cover fin 102 with respect to the motor axis Cm is larger than an inclination angle of the forward inclined fin 721 with respect to the motor axis Cm.

The inclination angle of the cover fin 102 may not be larger than the inclination angle of the forward inclined fin 721. The cover fin 102 may extend parallel to the motor axis Cm. The multiple cover fins 102 may have the same size and shape or may have different sizes and shapes. Intervals of the multiple cover fins 102 in the axial direction AD may be uniform or non-uniform. The cover fin 102 may be bent to bulge toward an upstream side in the axial direction AD.

Third Embodiment

In a third embodiment, the shroud 120 includes a shroud guide portion. Configurations, operations, and effects not particularly described in the third embodiment are the same as those in the first embodiment described above. In the third embodiment, differences from the first embodiment described above will be mainly described.

Figure 16:
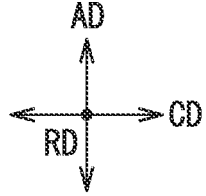
FIG. 16 is a partially developed view of outer peripheral surfaces of a motor and an inverter in a third embodiment.
Figure 17:
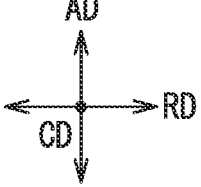
FIG. 17 is a partial vertical cross-sectional view of the motor and the inverter.

As shown in FIGS. 16 and 17, the shroud 120 includes a shroud main body 121 and shroud fins 122. The shroud main body 121 is formed in a tubular shape as a whole and extends along the motor axis Cm. The shroud main body 121 has the outer peripheral surface 120a, the inner peripheral surface 120b, and the shroud opening portions 120c.

Each of the shroud fins 122 is a fin provided on the inner peripheral surface 120b. The shroud fin 122 protrudes from the inner peripheral surface 120b. The shroud fin 122 is provided integrally with the shroud main body 121. The shroud fin 122 is formed in a plate shape. The shroud fin 122 extends from the shroud main body 121 toward a radially inner side and extends in the axial direction AD. For example, the shroud fin 122 extends in the radial direction RD in a manner of being overlapped with a radial line. In the radial direction RD, a protrusion dimension of the shroud fin 122 from the inner peripheral surface 120*b* is substantially the same as the protrusion dimension of the motor fin 72 from the outer peripheral surface 70*a*. Multiple shroud fins 122 are arranged along the inner peripheral surface 120*b* in the circumferential direction CD. In two of the shroud fins 122 adjacent to each other in the circumferential direction CD, respective plate surfaces face each other.

The shroud fin 122 includes a fin upstream end 122*a* and a fin downstream end 122*b*. In both ends of the shroud fin 122 arranged in the axial direction AD, an end portion on a side facing the blower fan 111 is the fin upstream end 122*a*, and an end portion on an opposite side is the fin downstream end 122*b*. The shroud fin 122 is provided on an upstream side of the motor fin 72 in the axial direction AD. The shroud fin 122 extends toward the upstream side from the shroud opening portion 120*c* on a downstream side.

The shroud fin 122 is inclined in the circumferential direction CD with respect to the motor axis Cm. The shroud fin 122 is bent to bulge in the axial direction AD. Each of the multiple shroud fins 122 is curved to bulge toward the upstream side in the axial direction AD. The shroud fins 122 are curved to be inclined, as a whole, in a direction extending along the swirling flow. In the shroud fin 122, the inclination angle with respect to the motor axis Cm gradually decreases from the fin upstream end 122*a* toward the fin downstream end 122*b*. Since the shroud fin 122 is bent to bulge toward the upstream side in the axial direction AD, a direction of the swirling flow is easily changed.

The shroud fin 122 is inclined with respect to the motor axis Cm in a manner of extending toward the motor fin 72. The shroud fin 122 extends downstream toward the motor fin 72. The shroud fin 122 guides the swirling flow flowing along the shroud fin 122 toward the motor fin 72. The shroud fin 122 corresponds to the shroud guide portion.

The shroud fin 122 is provided at a position aligned with the exposed region AL1 in the axial direction AD. The multiple shroud fins 122 are provided for each of the multiple exposed regions AL1. When the multiple shroud fins 122 provided for one exposed region AL1 are referred to as a shroud fin group 123, one shroud fin group 123 is provided for one exposed region AL1. Multiple shroud fin groups 123 are arranged together with the exposed regions AL1 in the circumferential direction CD.

According to the present embodiment, air from the blower fan 111 is guided to the forward inclined fins 721 by the shroud fins 122. In the configuration, an air amount passing through the forward inclined fins 721 can be increased by the shroud fins 122. Therefore, a cooling effect exerted by the forward inclined fins 721 can be further enhanced by the shroud fins 122.

Fourth Embodiment

In the first embodiment described above, the blower fan 111 is provided on the upstream side of the EDS 50. Meanwhile, in a fourth embodiment, the blower fan 111 is provided on a downstream side of the EDS 50. Configurations, operations, and effects not particularly described in the fourth embodiment are the same as those in the first embodiment described above. In the fourth embodiment, differences from the first embodiment described above will be mainly described.

Figure 18:
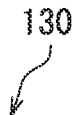
FIG. 18 is a partially developed view of outer peripheral surfaces of a motor and an inverter in a fourth embodiment.
Figure 19:
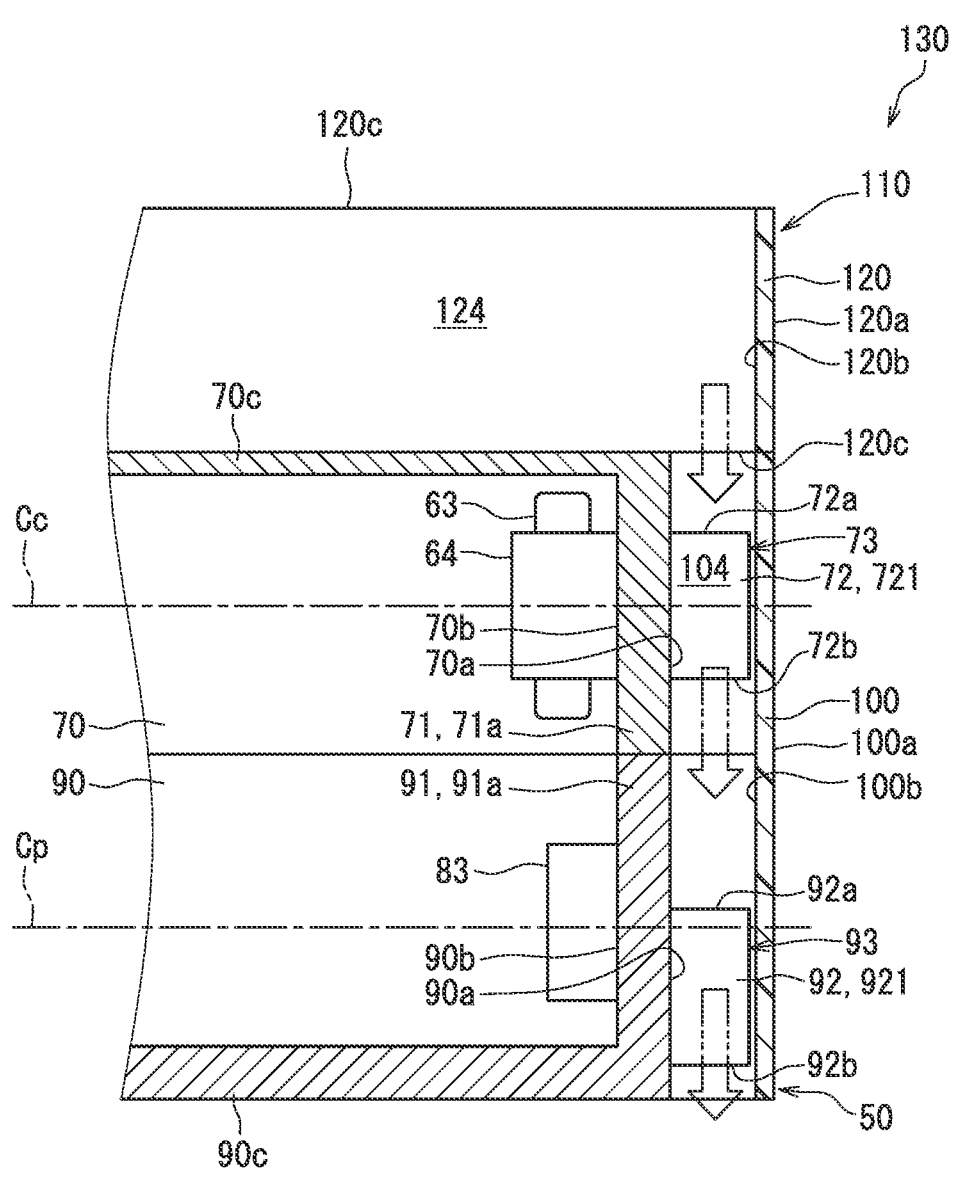
FIG. 19 is a partial vertical cross-sectional view of the motor and the inverter.
Figure 19:
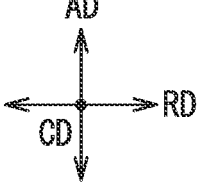

As shown in FIGS. 18 and 19, the blower fan 111 is provided on a side facing the downstream end surface 90*c*. The blower fan 111 sends air in the axial direction AD toward a side opposite to the EDS 50. When the blower fan 111 rotates, a swirling flow is generated not only on a downstream side of the blower fan 111 but also on an upstream side of the blower fan 111. The swirling flow generated on the upstream side of the blower fan 111 travels toward the blower fan 111 in the axial direction AD. The swirling flow is generated by the air suctioned into the blower fan 111. The blower fan 111 suctions cooling air for cooling the EDS 50 under a negative pressure. In the present embodiment, a side of the EDS 50 facing the blower fan 111 is a downstream side.

In the inverter housing 90, forward inclined fins 921 are provided on the outer peripheral surface 90*a* as the inverter fins 92. Each of the forward inclined fins 921 is inclined with respect to the motor axis Cm in the circumferential direction CD. The forward inclined fin 921 extends straight in a direction inclined in the circumferential direction CD with respect to the motor axis Cm. In the forward inclined fin 921, the entire portion including an upstream portion extending from the fin upstream end 92*a* toward the downstream side is inclined in the circumferential direction CD with respect to the motor axis Cm. The multiple inverter fins 92 may include a reverse inclined fin. The reverse inclined fin is a fin whose inclination direction with respect to the motor axis Cm is opposite to that of the forward inclined fin 921.

An inclination angle of the forward inclined fin 921 is such an angle that the forward inclined fin 921 extends along the swirling flow that travels toward the blower fan 111. In the forward inclined fin 921, one of a pair of plate surfaces faces an upstream side and the other plate surface faces a downstream side. In the forward inclined fin 921, the pair of plate surfaces are both flat surfaces. In the forward inclined fin 921, the fin upstream end 92*a* and the fin downstream end 92*b* are located at positions deviated in the circumferential direction CD. The forward inclined fin 921 is inclined in a manner of extending along the swirling flow generated by the blower fan 111. In the forward inclined fin 921, the plate surfaces extend along the swirling flow. The forward inclined fin 921 corresponds to the radiation fin and the inclined fin.

As shown in FIG. 18, in the inverter housing 90, the exposed regions AL1 and the hidden regions AL2 are set on the outer peripheral surface 90*a*. Each of the hidden regions AL2 is a region hidden behind the flange 95 with respect to the blower fan 111. For example, a region hidden on an upstream side of the downstream flange 952 with respect to the blower fan 111 is the hidden region AL2. The hidden region AL2 extends from the downstream flange 952 toward the upstream side in the axial direction AD. Multiple hidden regions AL2 are arranged together with the downstream flanges 952 in the circumferential direction CD.

Each of the exposed regions AL1 is a region exposed without being hidden behind the flange 95 with respect to the blower fan 111. For example, a region exposed without being hidden on the upstream side of the downstream flange 952 with respect to the blower fan is the exposed region AL1. In the present embodiment, the exposed region AL1 corresponds to the axial arrangement region, the hidden region AL2 corresponds to the circumferential arrangement region, and the downstream flange 952 corresponds to the obstacle.

Multiple forward inclined fins 921 are arranged in the circumferential direction CD in each of the multiple exposed regions AL1. In one of the exposed regions AL1, the multiple forward inclined fins 921 have the same size and shape. The multiple forward inclined fins 921 are the same, for example, in a length dimension in the axial direction AD, a plate thickness dimension, and a protrusion dimension from the outer peripheral surface 90*a*. The inclination angles with respect to the motor axis Cm are the same for the multiple forward inclined fins 921. The inclination angle of the forward inclined fin 921 is, for example, 5 degrees to 20 degrees. The multiple forward inclined fins 921 extend parallel to each other. The multiple forward inclined fins 921 are arranged at equal intervals in the circumferential direction CD.

In the multiple exposed regions AL1, the forward inclined fins 921 have the same size and shape. The inclination angles of the forward inclined fins 921 with respect to the motor axis Cm are also the same in the multiple exposed regions AL1. The intervals between the multiple forward inclined fins 921 are also the same in the multiple exposed regions AL1.

In FIGS. 18 and 19, when the blower fan 111 rotates, the air flowing from the internal space 124 into the cover passage 104 flows along the outer peripheral surfaces 70*a*, 90*a* and is suctioned into the blower fan 111 as the swirling flow. The swirling flow suctioned into the blower fan 111 travels along the plate surfaces of the forward inclined fin 921 on the outer peripheral surface 90*a*.

In FIG. 18, in the inverter housing 90, in two of the hidden regions AL2 adjacent to each other in the circumferential direction CD, the hidden region AL2 closer to the fin upstream end 92*a* than to the fin downstream end 92*b* in the circumferential direction CD is referred to as the "forward hidden region AL2". Since the air flows along the forward inclined fin 921, the air to be suctioned into the blower fan 111 easily passes through the "forward hidden region AL2". For example, the forward inclined fin 721 located closest to the "forward hidden region AL2" in the exposed region AL1 guides the air from the "forward hidden region AL2" to the blower fan 111. In FIG. 18, when the hidden region AL2 on a right side is the "forward hidden region AL2", the forward inclined fin 921 in the exposed region AL1 in the center guides the air from the "forward hidden region AL2" to the blower fan 111.

According to the present embodiment, in the inverter housing 90, the forward inclined fin 921 that is inclined with respect to the motor axis Cm in the circumferential direction CD is provided on the outer peripheral surface 90*a*. In the configuration, the air flowing along the outer peripheral surface 90*a* can be guided by the forward inclined fins 921 to enhance the cooling effect for the EDS 50. Therefore, for example, even if the number and the size of the motor fins 72 and the inverter fins 92 are limited in order to avoid the EDS 50 from becoming too heavy for the eVTOL 10, a decrease in the effect of cooling the EDS 50 can be reduced by the forward inclined fins 921. Therefore, both the cooling effect enhancement and weight reduction of the EDS 50 can be achieved by the forward inclined fins 921. In this way, the EDS 50 and the EDS unit 130 suitable for mounting on the eVTOL 10 can be implemented by the forward inclined fins 921.

Fifth Embodiment

In a fifth embodiment, the motor housing 70 includes a guide portion. Configurations, operations, and effects not particularly described in the fifth embodiment are the same as those in the first embodiment described above. In the fifth embodiment, differences from the first embodiment described above will be mainly described.

Figure 20:
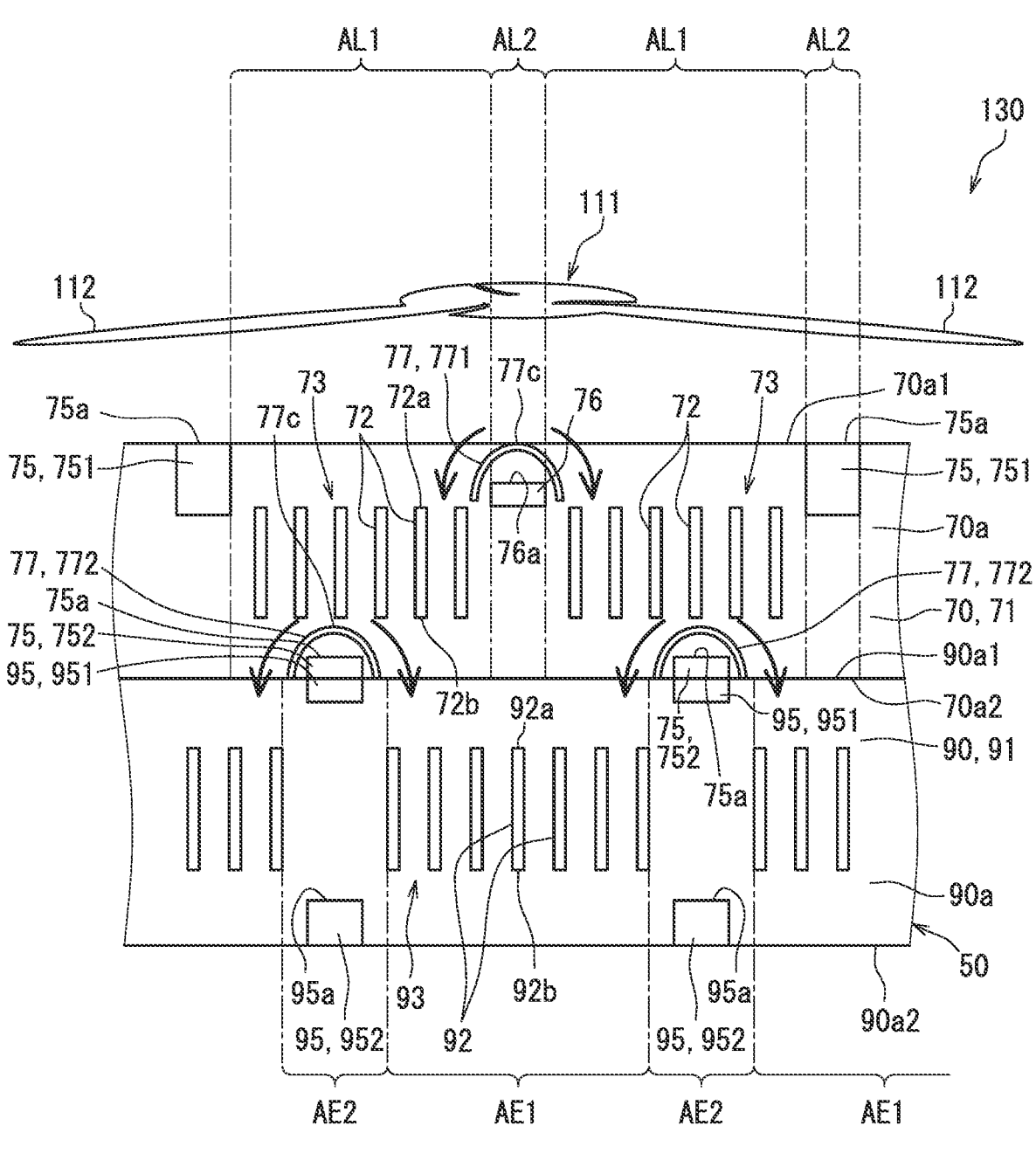
FIG. 20 is a partially developed view of outer peripheral surfaces of a motor and an inverter in a fifth embodiment.

As shown in FIG. 20, the motor housing 70 includes housing protrusion portions 76 and motor guide plates 77. Each of the housing protrusion portions 76 is a protrusion provided on the outer peripheral surface 70*a*. The housing protrusion portion 76 protrudes from the outer peripheral surface 70*a*. The housing protrusion portion 76 extends from the housing main body 71 toward a radially outer side. As the housing protrusion portion 76, there is a portion protruding toward the radially outer side to match an internal structure of the motor housing 70, a connector portion for electrically connecting the motor device 60 to an external device, and the like. For example, the housing protrusion portion 76 shown in FIG. 20 is a small-sized protrusion.

A width dimension of the housing protrusion portion 76 in the circumferential direction CD is larger than a plate thickness dimension of the motor fin 72. The housing protrusion portion 76 has an upstream surface 76*a*. The upstream surface 76*a* is a surface facing the upstream side among outer surfaces of the housing protrusion portion 76. The upstream surface 76*a* extends in a direction orthogonal to the axial direction AD. Since the housing protrusion portion 76 has the large width dimension and the upstream surface 76*a* thereof is orthogonal to the axial direction AD, the housing protrusion portion 76 tends to be an obstacle for the air flowing in the axial direction AD. The housing protrusion portion 76 is likely to restrict the air from flowing in the axial direction AD, and corresponds to the obstacle.

The housing protrusion portion 76 is aligned with the flange 75 in the circumferential direction CD. The housing protrusion portion 76 is located between two of the upstream flanges 751 adjacent to each other in the circumferential direction CD. The housing protrusion portion 76 is located at a position closer to the outer peripheral upstream end 70*a*1 than to the outer peripheral downstream end 70*a*2 in the axial direction AD. The housing protrusion portion 76 is located at a position separated from the outer peripheral upstream end 70*a*1 toward the outer peripheral downstream end 70*a*2.

The multiple hidden regions AL2 include a hidden region AL2 hidden behind the housing protrusion portion 76 with respect to the blower fan 111. The hidden region AL2 extends from the housing protrusion portion 76 toward a downstream side in the axial direction AD.

Each of the motor guide plates 77 is provided on the outer peripheral surface 70*a*. The motor guide plate 77 protrudes from the outer peripheral surface 70*a*. The motor guide plate 77 is provided integrally with the housing main body 71. The motor guide plate 77 is formed in a plate shape as a whole. The motor guide plate 77 is bent to bulge toward the upstream side in the axial direction AD. For example, the motor guide plate 77 is curved such that a central portion thereof bulges toward the upstream side. Multiple motor guide plates 77 are arranged in the circumferential direction CD. The motor guide plate 77 guides the air from the blower fan 111 in the circumferential direction CD to flow toward the motor fins 72. The motor guide plate 77 corresponds to the guide portion and a housing guide portion.

Figure 22:
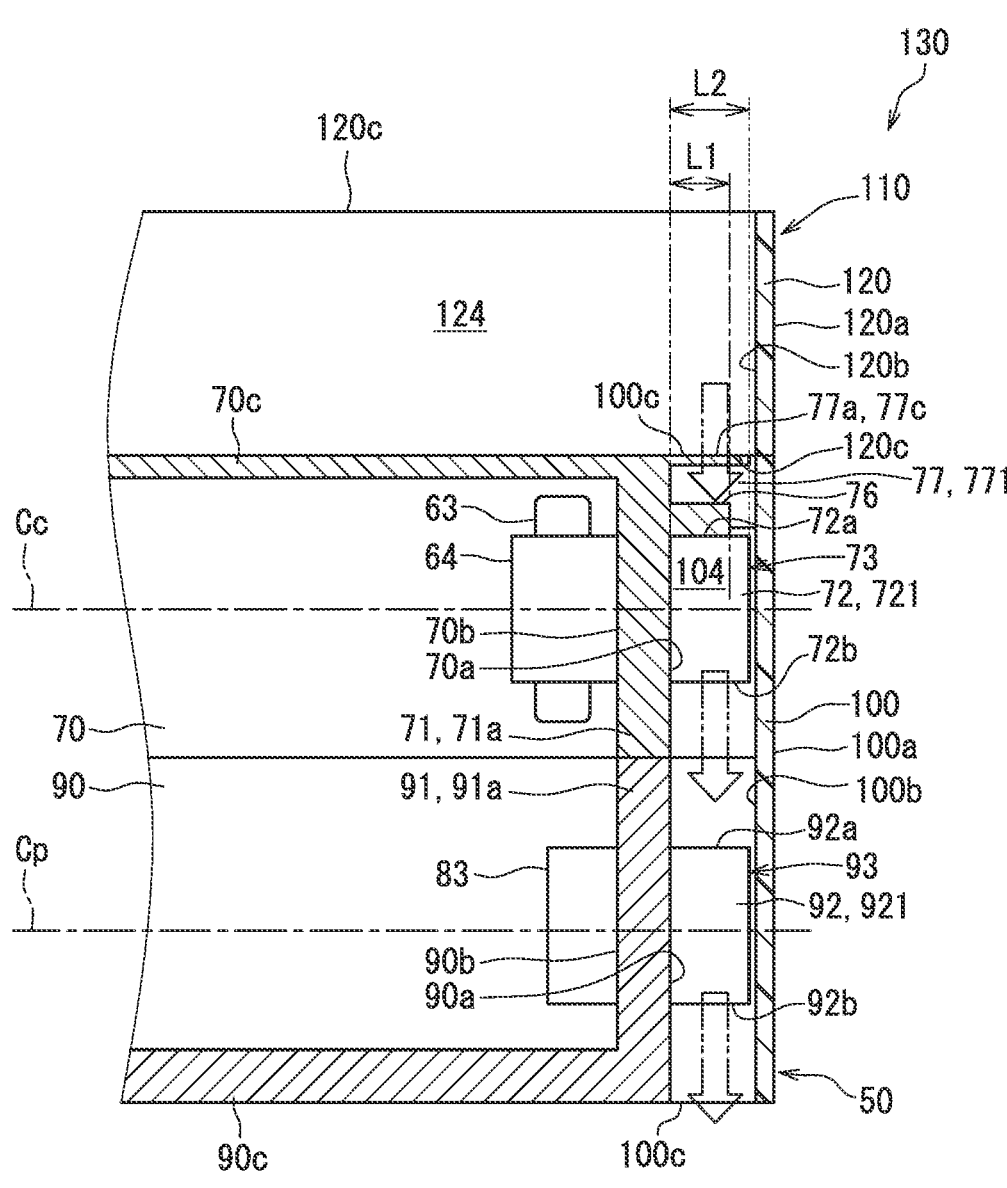
FIG. 22 is a partial vertical cross-sectional view of the motor and the inverter.
Figure 22:
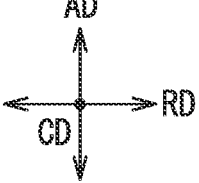

As shown in FIG. 22, in the radial direction RD, a protrusion dimension of the motor guide plate 77 from the outer peripheral surface 70*a* is larger than a protrusion dimension of the flange 75 from the outer peripheral surface 70*a*. The motor guide plate 77 and the motor fin 72 have substantially the same protrusion dimension from the outer peripheral surface 70a. The motor guide plate 77 is in contact with the inner peripheral surface 100b of the fin cover 100. For example, a tip end surface of the motor guide plate 77 is overlapped with the inner peripheral surface 100b. In the fin cover 100, the inner peripheral surface 100b is in a state of being pressed against the motor guide plate 77 by a restoring force generated due to elastic deformation. In FIG. 22, for convenience of illustration, a gap is illustrated between the inner peripheral surface 100b and the motor guide plate 77, but actually, the gap is less likely to occur.

Figure 21:
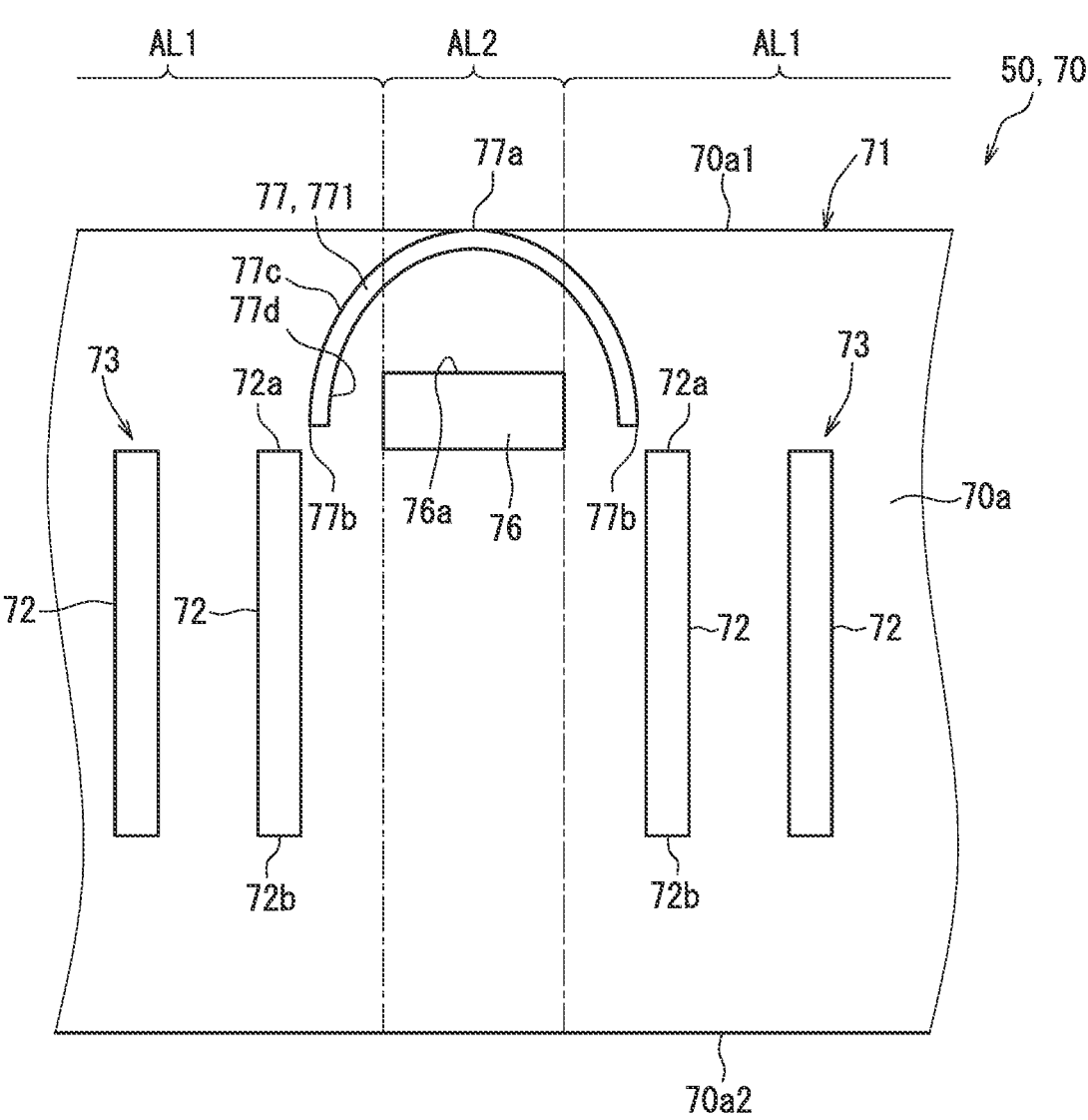
FIG. 21 is an enlarged view of a periphery of an exposed region guide plate in FIG. 20.
Figure 23:
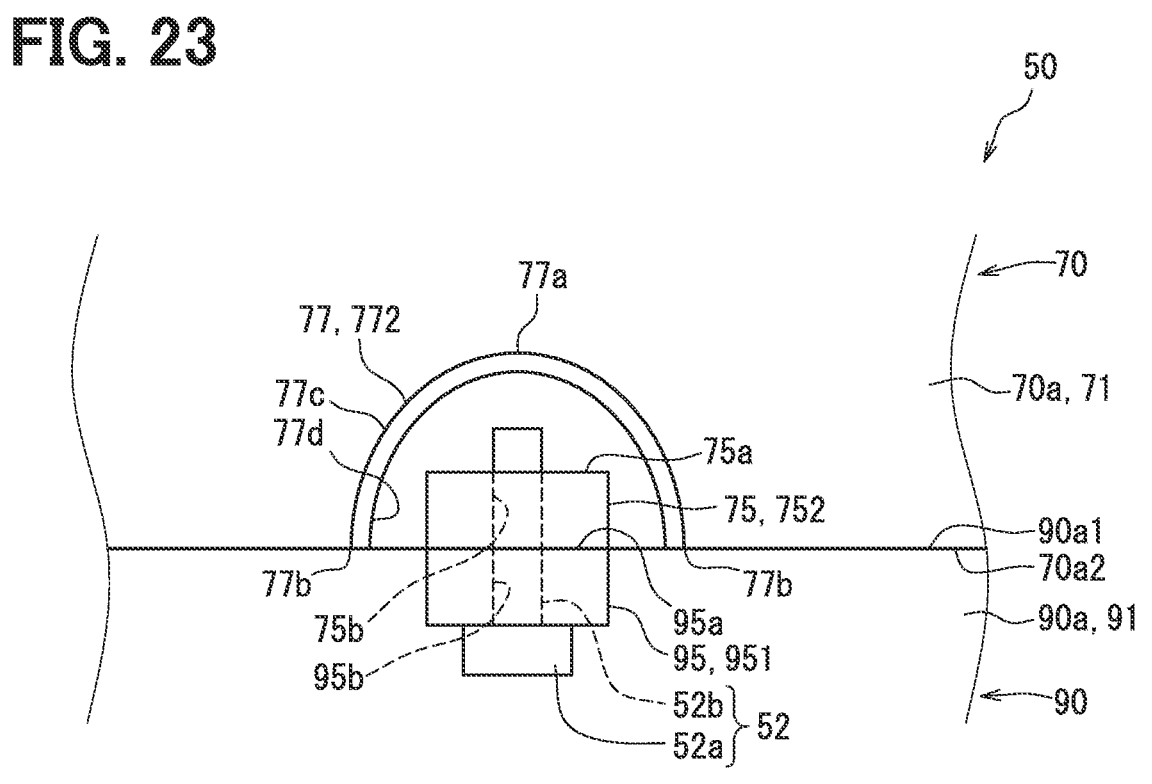

As shown in FIGS. 20, 21, and 23, the motor guide plate 77 includes a guide plate top portion 77a, guide plate end portions 77b, a guide plate outer surface 77c, and a guide plate inner surface 77d. The motor guide plate 77 has a pair of plate surfaces, and both of the plate surfaces are bent in a convex shape to bulge toward the upstream side in the axial direction AD. In the pair of plate surfaces of the motor guide plate 77, an outer plate surface is the guide plate outer surface 77c, and an inner plate surface is the guide plate inner surface 77d. The guide plate outer surface 77c faces the upstream side in the axial direction AD. The guide plate outer surface 77c is inclined with respect to the motor axis Cm in the circumferential direction CD. The guide plate inner surface 77d faces the downstream side in the axial direction AD. The guide plate outer surface 77c corresponds to a guide surface.

The guide plate top portion 77a is a most upstream portion of the guide plate outer surface 77c. The guide plate end portions 77b are downstream end portions of the guide plate outer surface 77c and are provided in pair on the guide plate outer surface 77c. The pair of guide plate end portions 77b are aligned with each other in the circumferential direction CD with the guide plate top portion 77a interposed therebetween. Each of the guide plate end portions 77b is located at a position separated from the guide plate top portion 77a toward the downstream side in the axial direction AD. The guide plate end portion 77b is provided on the downstream end portion of the motor guide plate 77. An inclination angle of the guide plate outer surface 77c with respect to the motor axis Cm gradually decreases from the guide plate top portion 77a toward the guide plate end portion 77b.

As the motor guide plates 77, exposed region guide plates 771 and high heat region guide plates 772 are provided on the outer peripheral surface 70a. Each of the exposed region guide plates 771 shown in FIGS. 20 and 21 guides the air, that flows toward the hidden region AL2 in the axial direction AD, to flow toward the exposed region AL1 in the circumferential direction CD. The exposed region guide plate 771 is provided on the upstream side of the hidden region AL2 and extends along the outer peripheral surface 70a toward the exposed region AL1. The exposed region guide plate 771 is in a state of protruding from the hidden region AL2 in the circumferential direction CD. The exposed region guide plate 771 is in a state of spanning two of the exposed regions AL1 adjacent to each other with the hidden region AL2 interposed therebetween in the circumferential direction CD.

The exposed region guide plate 771 is located at a position overlapped with the hidden region AL2 in the axial direction AD. The exposed region guide plate 771 is provided in the hidden region AL2, and thus is in a state of being arranged in the hidden region AL2 in the axial direction AD. In the exposed region guide plate 771, the guide plate top portion 77a is located at a position overlapped with the hidden region AL2 in the axial direction AD. Meanwhile, the guide plate end portion 77b is not located at the position overlapped with the hidden region AL2 in the axial direction AD, and is located at a position separated from the hidden region AL2 in the circumferential direction CD.

The exposed region guide plate 771 is in a state of spanning respective motor fins 72 in the two exposed regions AL1. The two motor fins 72 spanned by the exposed region guide plate 771 are adjacent to each other in the circumferential direction CD with the hidden region AL2 interposed therebetween. In the exposed region guide plate 771, the guide plate outer surface 77c is in a state of spanning the two motor fins 72. The pair of end portions of the exposed region guide plate 771 are located at positions close to the two motor fins 72, respectively, and are not connected to the motor fins 72.

The exposed region guide plate 771 is separated, in both the axial direction AD and the circumferential direction CD, from the two motor fins 72 adjacent to each other in the circumferential direction CD with the hidden region AL2 interposed therebetween. In the axial direction AD, the guide plate end portion 77b is located at a position separated from the fin upstream end 72a toward the upstream side. In the circumferential direction CD, the guide plate end portion 77b is located at a position separated from the fin upstream end 72a toward the housing protrusion portion 76.

The exposed region guide plate 771 is provided on the upstream side of the housing protrusion portion 76. The exposed region guide plate 771 is located at a position aligned with the housing protrusion portion 76 in the axial direction AD. The exposed region guide plate 771 is in a state of covering the housing protrusion portion 76 from the upstream side. In the exposed region guide plate 771, the guide plate inner surface 77d faces the housing protrusion portion 76. The guide plate inner surface 77d is separated from the housing protrusion portion 76 toward the upstream side. At least a part of the housing protrusion portion 76 is in a state of entering an inner side of the exposed region guide plate 771. In the circumferential direction CD, a width dimension of the exposed region guide plate 771 is larger than the width dimension of the housing protrusion portion 76.

The exposed region guide plate 771 extends from the outer peripheral upstream end 70a1 toward the downstream side. The exposed region guide plate 771 may be provided at a position separated from the outer peripheral upstream end 70a1 toward the downstream side. The exposed region guide plate 771 may be provided at a position protruding from the outer peripheral upstream end 70a1 to the upstream side. The exposed region AL1 corresponds to a first region, and the hidden region AL2 corresponds to a second region.

The high heat region guide plate 772 shown in FIGS. 20 and 23 guides the air, that flows toward the low heat region AE2 in the axial direction AD, to flow toward the high heat region AE1 in the circumferential direction CD. The high heat region guide plate 772 is provided on the upstream side of the low heat region AE2 and extends along the outer peripheral surface 70a toward the exposed region AL1. The high heat region guide plate 772 is located at a position separated toward the low heat region AE2 from two of the high heat regions AE1 adjacent to each other with the low heat region AE2 interposed therebetween in the circumferential direction CD.

The high heat region guide plate 772 is located at a position overlapped with the high heat region AE1 in the axial direction AD. The high heat region guide plate 772 is located at a position that is on an upstream side with respect to the high heat region AE1 and that is aligned with the high heat region AE1 in the axial direction AD. In the high heat region guide plate 772, both the guide plate top portion 77a and the guide plate end portions 77b are located at positions aligned with the high heat region AE1 in the axial direction AD. The high heat region guide plate 772 may extend to protrude from the low heat region AE2 toward the high heat region AE1 in the circumferential direction CD.

The high heat region guide plate 772 is provided on an upstream side of the downstream flange 752. The high heat region guide plate 772 is located at a position aligned with the downstream flange 752 in the axial direction AD. The high heat region guide plate 772 is in a state of covering the downstream flange 752 from the upstream side. In the high heat region guide plate 772, the guide plate inner surface 77d faces the downstream flange 752. The guide plate inner surface 77d is separated from the downstream flange 752 toward the upstream side. At least a part of the downstream flange 752 is in a state of entering an inner side of the high heat region guide plate 772. In the circumferential direction CD, a width dimension of the high heat region guide plate 772 is larger than a width dimension of the downstream flange 752.

The high heat region guide plate 772 extends from the outer peripheral downstream end 70a2 toward the upstream side. The high heat region guide plate 772 may be provided at a position separated from the outer peripheral downstream end 70a2 toward the upstream side. The high heat region guide plate 772 may be provided at a position protruding from the outer peripheral downstream end 70a2 toward the downstream side. The high heat region AE1 corresponds to the first region, and the low heat region AE2 corresponds to the second region.

In the EDS 50, the motor housing 70 and the inverter housing 90 are fixed by coupling the downstream flange 752 and the upstream flange 951. The downstream flange 752 and the upstream flange 951 are aligned in the axial direction AD and are in a state of being overlapped with each other. The downstream flange 752 and the upstream flange 951 are coupled to each other by a bolt 52 as a coupling tool. The motor housing 70 corresponds to a first housing, and the inverter housing 90 corresponds to a second housing. The downstream flange 752 corresponds to a first coupling portion, and the upstream flange 951 corresponds to a second coupling portion. The downstream flange 752 and the upstream flange 951 correspond to the obstacle.

A coupling hole 75b is formed in the downstream flange 752, and a coupling hole 95b is formed in the upstream flange 951. The bolt 52 is inserted through the coupling holes 75b and 95b from the downstream side. In the bolt 52, a head portion 52a is located on the downstream side of the upstream flange 951, and a shaft portion 52b is inserted through the coupling holes 75b and 95b. In this way, in the configuration in which the head portion 52a is located on the downstream side of the upstream flange 951, a positional relationship between the high heat region guide plate 772 and the downstream flange 752 can be set regardless of a size and a shape of the head portion 52a.

As shown in FIG. 20, when the air is sent toward the EDS 50 by the blower fan 111, the air reaching the exposed region guide plate 771 flows along the guide plate outer surface 77c of the exposed region guide plate 771. In this case, the air flowing in the axial direction AD toward the housing protrusion portion 76 is guided in the circumferential direction CD to travel toward the exposed region AL1 by flowing along the guide plate outer surface 77c. The air guided by the exposed region guide plate 771 in this way easily passes through the multiple motor fins 72 in the exposed region AL1 in the axial direction AD.

For example, in a configuration which is different from that of the present embodiment and in which the exposed region guide plate 771 is not provided, when the air reaches the housing protrusion portion 76, the air flowing in the axial direction AD hits the upstream surface 76a, and thus the air flow is likely to be disturbed at a periphery of the housing protrusion portion 76. When the turbulence of the flow generated at the periphery of the housing protrusion portion 76 spreads toward the exposed region AL1, a pressure loss of the air passing through the multiple motor fins 72 in the exposed region AL1 tends to be increased. Thus, there is a concern that a volume of air passing through the motor fins 72 is decreased, and a heat radiation effect based on the motor fins 72 is decreased.

As shown in FIG. 20, the air passing through the motor fins 72 and reaching the high heat region guide plate 772 flows along the guide plate outer surface 77c of the high heat region guide plate 772. In this case, the air flowing in the axial direction AD toward the downstream flange 752 is guided in the circumferential direction CD to travel toward the high heat region AE1 by flowing along the guide plate outer surface 77c. In this way, the air guided by the high heat region guide plate 772 easily passes through the multiple inverter fins 92 in the high heat region AE1 in the axial direction AD.

For example, in a configuration which is different from that of the present embodiment and in which the high heat region guide plate 772 is not provided, when the air reaches the downstream flange 752, the air flowing in the axial direction AD hits the upstream surface 75a, and thus the air flow is likely to be disturbed at a periphery of the downstream flange 752. When the turbulence of the flow generated at the periphery of the downstream flange 752 spreads toward the high heat region AE1, a pressure loss of the air passing through the multiple inverter fins 92 in the high heat region AE1 tends to be increased. Thus, there is a concern that a volume of air passing through the inverter fins 92 is decreased, and a heat radiation effect based on the inverter fins 92 is decreased.

According to the present embodiment described above, the air is guided in the circumferential direction CD by the motor guide plate 77, that is provided on the motor housing 70, to flow toward the motor fins 72 and the inverter fins 92. In the configuration, since a volume of air passing through the motor fins 72 and the inverter fins 92 tends to be increased by the motor guide plate 77, the cooling effect based on the motor fins 72 and the inverter fins 92 can be enhanced. Therefore, for example, even if the number and the size of the motor fins 72 and the inverter fins 92 are limited in order to avoid the EDS 50 from becoming too heavy for the eVTOL 10, a decrease in the cooling effect of the EDS 50 can be reduced by the motor guide plate 77. Therefore, both the cooling effect enhancement and weight reduction of the EDS 50 can be achieved by the motor guide plate 77. In this way, the EDS 50 and the EDS unit 130 suitable for mounting on the eVTOL 10 can be implemented by the motor guide plate 77.

According to the present embodiment, the guide plate outer surface 77c of the motor guide plate 77 is bent to bulge toward the upstream side in the axial direction AD, and extends in the circumferential direction CD toward the motor fins 72 and the inverter fins 92. Therefore, a configuration can be implemented in which the air sent from the blower fan 111 and reaching the motor guide plate 77 is guided to the motor fins 72 and the inverter fins 92 by the guide plate outer surface 77c.

According to the present embodiment, the exposed region guide plate 771 is in a state of spanning two motor fins 72 adjacent to each other in the circumferential direction CD. In the configuration, the air flowing toward a separation portion between the two motor fins 72 is guided toward one of the two motor fins 72 by the exposed region guide plate 771. Therefore, both a decrease in a volume of air reaching the separation portion in which the motor fins 72 do not exist, and the increase in the volume of air passing through the motor fins 72 can be achieved. For example, both a decrease in a volume of air reaching the housing protrusion portion 76 in the motor housing 70 and the increase in the volume of air passing through the motor fins 72 in the exposed region AL1 can be achieved.

According to the present embodiment, the motor guide plate 77 is provided to cover the obstacle such as the flange 75 from the upstream side. In the configuration, the motor guide plate 77 restricts the air sent from the blower fan 111 from hitting the obstacle. Therefore, the air flow is less likely to be disturbed at the periphery of the obstacle.

For example, the exposed region guide plate 771 is provided to cover the housing protrusion portion 76 from the upstream side. In the configuration, the exposed region guide plate 771 can restrict the air sent from the blower fan 111 from hitting the housing protrusion portion 76 and restrict the air flow from being disturbed at the periphery of the housing protrusion portion 76. In this case, since the pressure loss of the air passing through the multiple motor fins 72 is less likely to be increased, the cooling effect based on the motor fins 72 can be enhanced.

The high heat region guide plate 772 is provided to cover the downstream flange 752 from the upstream side. In the configuration, the high heat region guide plate 772 can restrict the air sent from the blower fan 111 from hitting the downstream flange 752 and restrict the air flow from being disturbed at the periphery of the downstream flange 752. In this case, since the pressure loss of the air passing through the multiple inverter fins 92 is less likely to be increased, the cooling effect based on the inverter fins 92 can be enhanced.

According to the present embodiment, the high heat region guide plate 772 is provided to cover the downstream flange 752 and the upstream flange 951, which are coupling parts between the motor housing 70 and the inverter housing 90, from the upstream side. In the configuration, the high heat region guide plate 772 can restrict the air flow from being disturbed at a periphery of the coupling parts between the motor housing 70 and the inverter housing 90.

According to the present embodiment, the motor guide plate 77 is provided at a position overlapped with the second region such as the low heat region AE2 in the axial direction AD, and guides the air in the circumferential direction CD to flow toward the first region such as the high heat region AE1. In the configuration, since a volume of air in the first region tends to be increased by the motor guide plate 77, the cooling effect based on the radiation fins such as the motor fins 72 in the first region can be enhanced.

For example, the exposed region guide plate 771 is provided at a position overlapped with the hidden region AL2 in the axial direction AD, and guides the air in the circumferential direction CD to flow from the hidden region AL2 toward the exposed region AL1. In the configuration, since the air flowing toward the hidden region AL2 is guided to the exposed region AL1 by the exposed region guide plate 771, the volume of air in the exposed region AL1 tends to be increased. Therefore, the cooling effect based on the motor fins 72 in the exposed region AL1 can be enhanced.

According to the present embodiment, the high heat region guide plate 772 is provided at a position overlapped with the low heat region AE2 in the axial direction AD, and guides the air in the circumferential direction CD to flow from the low heat region AE2 toward the high heat region AE1. In the configuration, since the air flowing toward the low heat region AE2 is guided to the high heat region AE1 by the high heat region guide plate 772, the volume of air in the high heat region AE1 tends to be increased. Therefore, regarding the high heat region AE1 which is a region close to the switch module 83 in the high heat region AE1 and the low heat region AE2, a decrease in the cooling effect due to a shortage of the volume of air can be reduced by the high heat region guide plate 772. Therefore, in the inverter housing 90, an excessive increase in the temperature of a part of the high heat region AE1 or the like can be reduced by the high heat region guide plate 772.

According to the present embodiment, the inverter fin 92 is provided in the high heat region AE1 that is the first region, and the inverter fin 92 is not provided in the low heat region AE2 that is the second region. In the configuration, the high heat region guide plate 772 guides the air, that flows toward the low heat region AE2 in which the inverter fin 92 is not present, to the high heat region AE1 in which the inverter fin 92 is present. Therefore, the air sent from the blower fan 111 can be concentrated in the high heat region AE1 in which the cooling effect is relatively high due to the presence of the inverter fin 92. Therefore, a decrease in the cooling effect in the inverter housing 90 can be reduced by the high heat region guide plate 772 while realizing the weight reduction of the EDS 50 by not providing the inverter fins 92 in the low heat region AE2.

According to the present embodiment, the motor guide plate 77 is included in the motor housing 70 and is provided on the outer peripheral surface 70a. In the configuration, similarly to the motor fin 72, the motor guide plate 77 can exert the heat radiation effect. In this way, the motor guide plate 77 exerts the heat radiation effect in addition to the air guiding function, and thus the effect of cooling the EDS 50 can be further enhanced.

According to the present embodiment, the EDS 50 includes the fin cover 100. Therefore, as in the first embodiment described above, the fin cover 100 can reduce the decrease in the cooling effect caused by the decrease in the volume of air passing through the motor fins 72 and the inverter fins 92. Even if the pressure loss in the cover passage 104 increases, the increase in the pressure loss is reduced by the motor guide plate 77, and thus the pressure loss is less likely to be excessively increased.

<Modification 5-1>

Figure 24:
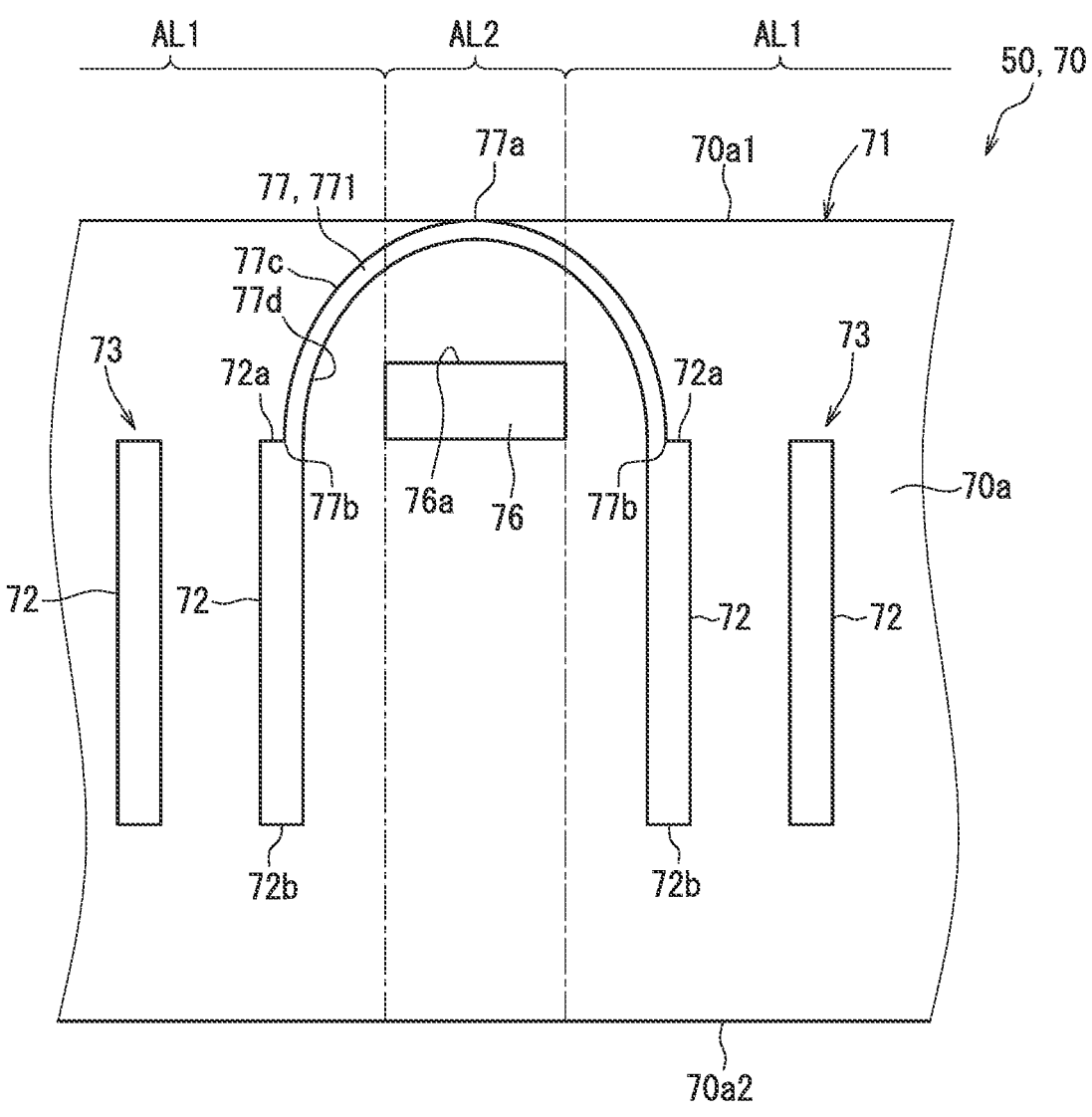
FIG. 24 is an enlarged view of a periphery of an exposed region guide plate in Modification 5-1.

A guide plate may be connected to the radiation fins. In Modification 5-1, for example, the motor guide plate 77 in the fifth embodiment described above is connected to the motor fins 72. As shown in FIG. 24, the exposed region guide plate 771 is connected to the motor fins 72. The exposed region guide plate 771 is connected to two of the motor fins 72 adjacent to each other with the hidden region AL2 interposed therebetween in the circumferential direction CD. The exposed region guide plate 771 connects the two motor fins 72 spanned by the guide plate outer surface 77c.

In the exposed region guide plate 771, the guide plate end portion 77b is connected to the fin upstream end 72a. In the exposed region guide plate 771, the guide plate outer surface 77c and the guide plate inner surface 77d extend from the fin upstream end 72a toward an upstream side. At least one of the guide plate outer surface 77c and the guide plate inner surface 77*d* is continuously connected to a plate surface of the motor fin 72. For example, in a configuration in which the guide plate outer surface 77*c* is continuously connected to the plate surface of the motor fin 72, the air flowing along the guide plate outer surface 77*c* continuously flows along the plate surface of the motor fin 72.

According to the present modification, the exposed region guide plate 771 connects two motor fins 72. In the configuration, the exposed region guide plate 771 is in a state of being supported by the two motor fins 72. Therefore, a strength of the exposed region guide plate 771 can be reinforced by the motor fins 72. Therefore, even if the exposed region guide plate 771 is made thinner in order to reduce a weight of the EDS 50, insufficiency in the strength of the exposed region guide plate 771 caused by the thinning can be restricted by the motor fins 72.

The guide plate end portion 77*b* may be connected to a portion of the motor fin 72 that is separated from the fin upstream end 72*a* toward the downstream side. In the exposed region guide plate 771, a portion separated from the guide plate end portion 77*b* toward the guide plate top portion 77*a* may be connected to the motor fin 72. Further, the exposed region guide plate 771 may be connected to only one of the two motor fins 72.

<Modification 5-2>

Figure 25:
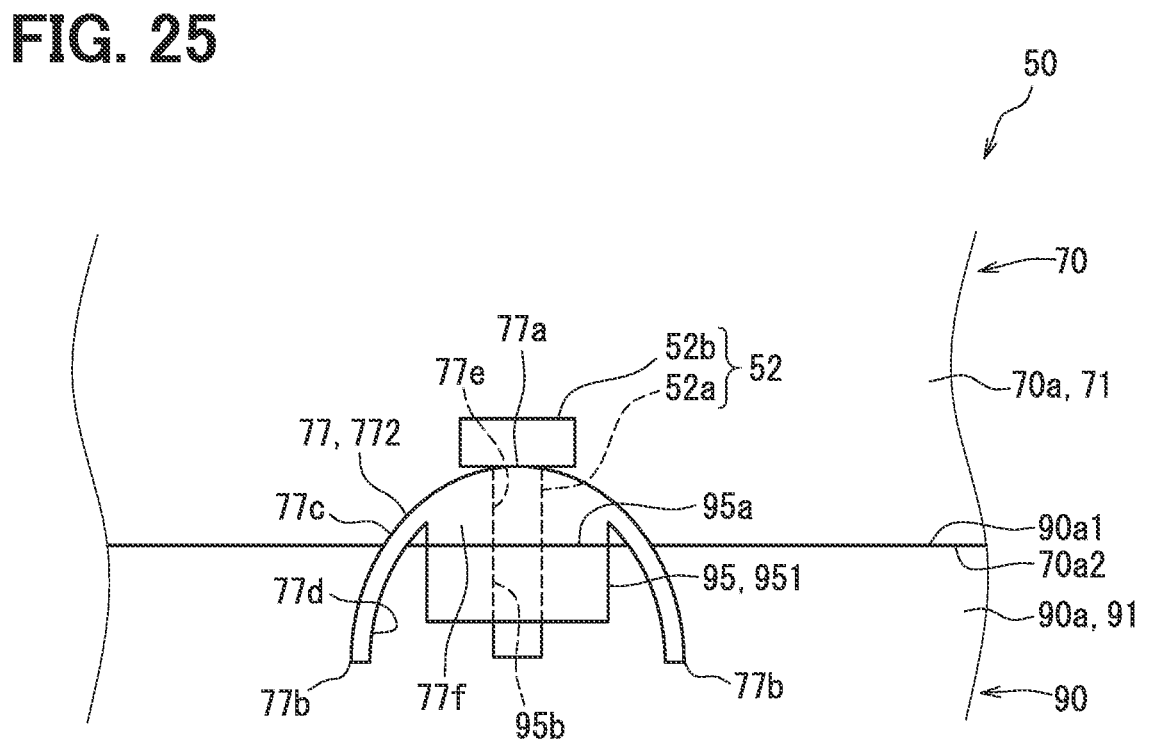

A guide plate may function as a coupling portion. In Modification 5-2, for example, the high heat region guide plate 772 in the fifth embodiment described above is connected to the upstream flange 951. As shown in FIG. 25, the high heat region guide plate 772 includes a coupling hole 77*e* and a thick portion 77*f*. The thick portion 77*f* is a portion of the high heat region guide plate 772 in which a central portion of the guide plate inner surface 77*d* bulges toward a downstream side, and is thicker than other portions. The coupling hole 77*e* penetrates the thick portion 77*f* in the axial direction AD. The high heat region guide plate 772 and the upstream flange 951 are connected by the bolt 52 inserted through the coupling holes 77*e* and 95*b*.

In the present modification, the bolt 52 is inserted through the coupling holes 77*e* and 95*b* from an upstream side. In the bolt 52, the head portion 52*a* is located on an upstream side of the high heat region guide plate 772. The guide plate outer surface 77*c* extends further from a downstream side of the head portion 52*a* toward the downstream side. In the circumferential direction CD, a width dimension of the guide plate outer surface 77*c* is larger than a width dimension of the head portion 52*a*. Therefore, even though the head portion 52*a* is located on the upstream side of the guide plate outer surface 77*c*, the air sent from the blower fan 111 easily reaches the guide plate outer surface 77*c*. Therefore, the guide plate outer surface 77*c* can exert a function of guiding the air. The head portion 52*a* may be located on the downstream side of the flange 95.

<Modification 5-3>

Figure 26:
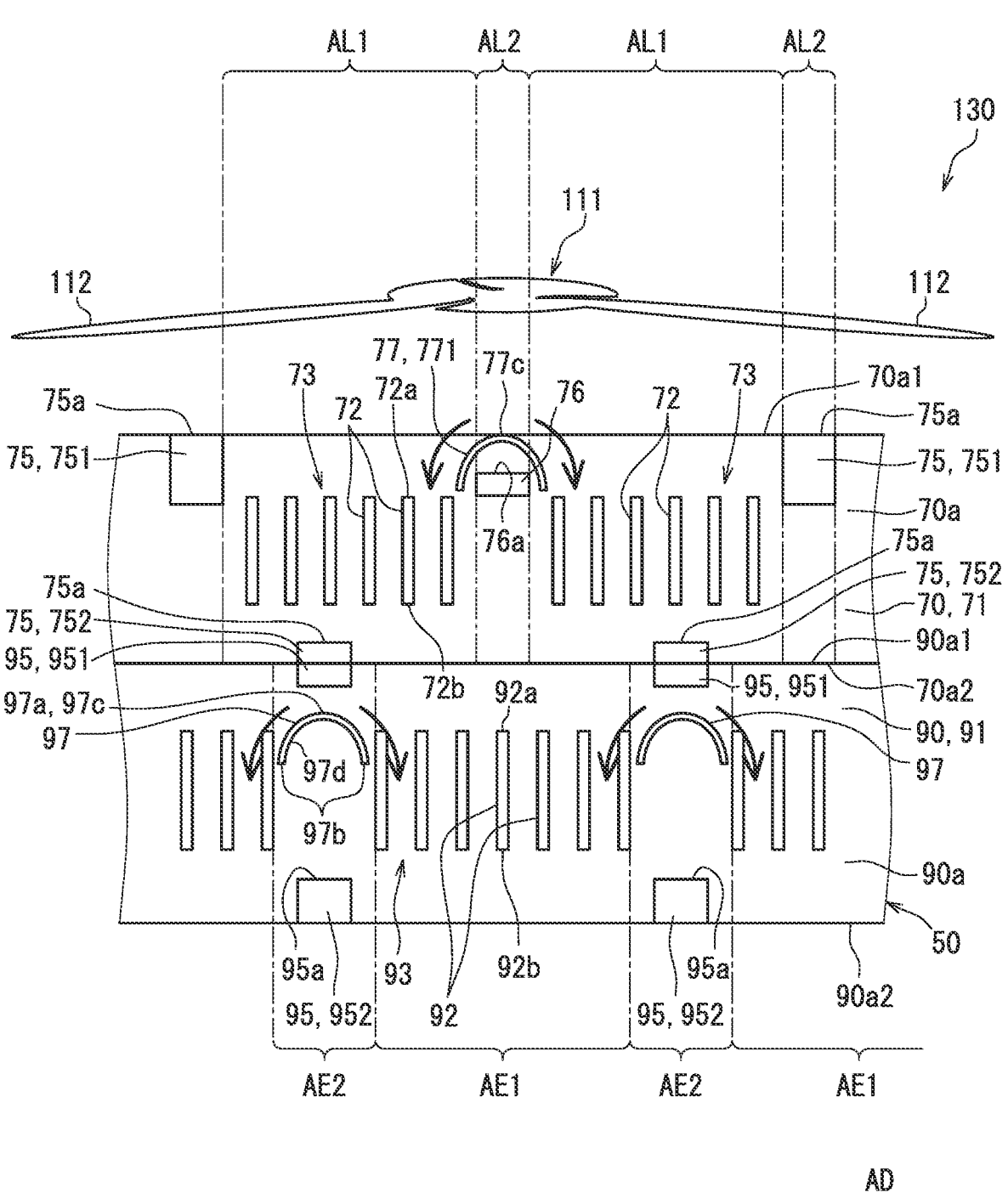
FIG. 26 is a partially developed view of outer peripheral surfaces of a motor and an inverter in Modification 5-3.

The inverter housing 90 may include a guide portion. In Modification 5-3, for example, the inverter housing 90 in the fifth embodiment described above includes the inverter guide plate 97. As shown in FIG. 26, the inverter guide plate 97 is provided on the outer peripheral surface 90*a*. The inverter guide plate 97 protrudes from the outer peripheral surface 90*a*. The inverter guide plate 97 is provided integrally with the housing main body 91. The inverter guide plate 97 is formed in a plate shape as a whole. The inverter guide plate 97 is bent to bulge toward the upstream side in the axial direction AD. For example, the inverter guide plate 97 is curved such that a central portion thereof bulges toward the upstream side. The inverter guide plate 97 corresponds to the guide portion and the housing guide portion.

In the radial direction RD, a protrusion dimension of the inverter guide plate 97 from the outer peripheral surface 90*a* is larger than a protrusion dimension of the flange 95 from the outer peripheral surface 90*a*. The inverter guide plate 97 and the inverter fin 92 have substantially the same protrusion dimension from the outer peripheral surface 90*a*. The inverter guide plate 97 is in contact with the inner peripheral surface 100*b* of the fin cover 100. For example, a tip end surface of the inverter guide plate 97 is overlapped with the inner peripheral surface 100*b*. In the fin cover 100, the inner peripheral surface 100*b* is in a state of being pressed against the inverter guide plate 97 by a restoring force generated due to elastic deformation.

The inverter guide plate 97 includes a guide plate top portion 97*a*, guide plate end portions 97*b*, a guide plate outer surface 97*c*, and a guide plate inner surface 97*d*. The inverter guide plate 97 has a pair of plate surfaces, and both of the plate surfaces are bent to bulge toward the upstream side in the axial direction AD. In the pair of plate surfaces of the inverter guide plate 97, an outer plate surface is the guide plate outer surface 97*c*, and an inner plate surface is the guide plate inner surface 97*d*. The guide plate outer surface 97*c* faces the upstream side in the axial direction AD. The guide plate outer surface 97*c* is inclined in the circumferential direction CD with respect to the motor axis Cm. The guide plate inner surface 97*d* faces the downstream side in the axial direction AD. The guide plate outer surface 97*c* corresponds to the guide surface.

The guide plate top portion 97*a* is a most upstream portion of the guide plate outer surface 97*c*. The guide plate end portions 97*b* are downstream end portions of the guide plate outer surface 97*c*, and are provided in pair on the guide plate outer surface 97*c*. The pair of guide plate end portions 97*b* are aligned with each other in the circumferential direction CD with the guide plate top portion 97*a* interposed therebetween. Each of the guide plate end portions 97*b* is located at a position separated from the guide plate top portion 97*a* toward the downstream side in the axial direction AD. The guide plate end portion 97*b* is provided on the downstream end portion of the inverter guide plate 97. The guide plate end portion 97*b* is a downstream end portion that is on a downstream side with respect to the guide plate top portion 97*a*. An inclination angle of the guide plate outer surface 97*c* with respect to the motor axis Cm gradually decreases from the guide plate top portion 97*a* toward the guide plate end portion 97*b*.

The inverter guide plate 97 guides the air flowing toward the low heat region AE2 in the axial direction AD to flow toward the high heat region AE1 in the circumferential direction CD. The inverter guide plate 97 is provided in the low heat region AE2 and extends along the outer peripheral surface 70*a* toward the high heat region AE1. The inverter guide plate 97 is located at a position separated from the upstream flange 951 toward the downstream side in the axial direction AD. In the circumferential direction CD, a width dimension of the guide plate outer surface 97*c* is larger than that of the upstream flange 951. The inverter guide plate 97 is located in the low heat region AE2 at a position separated in the circumferential direction CD from both of two of the inverter fins 92 adjacent to each other in the circumferential direction CD. The inverter guide plate 97 is located at a position near the fin upstream end 92*a* in the axial direction AD. The inverter guide plate 97 is located at a position straddling the fin upstream end 92*a* in the axial direction AD with respect to the inverter fin 92.

The inverter guide plate 97 may be connected to two inverter fins 92 as in a case in which the motor guide plate 77 is connected to two motor fins 72 in Modification 5-1.

The air that passes through the motor fins 72, flows into the low heat region AE2, and reaches the inverter guide plate 97 flows along the guide plate outer surface 97c of the inverter guide plate 97. In this case, the air flowing along the guide plate outer surface 97c is guided in the circumferential direction CD to travel from the low heat region AE2 toward the high heat region AE1. In this way, the air guided by the inverter guide plate 97 flows into the high heat region AE1 and easily passes through the inverter fin 92 in the axial direction AD. Therefore, a volume of air in the high heat region AE1 is increased, and the cooling effect based on the inverter fins 92 can be enhanced.

For example, in a configuration which is different from that of the present embodiment and in which the inverter guide plate 97 is not provided in the low heat region AE2, the air flowing into the low heat region AE2 is discharged to the downstream side of the inverter housing 90 without being guided to the high heat region AE1. Therefore, there is a concern that the volume of air in the high heat region AE1 is less likely to be increased and the cooling effect based on the inverter fin 92 is less likely to be exerted.

<Modification 5-4>

Figure 27:
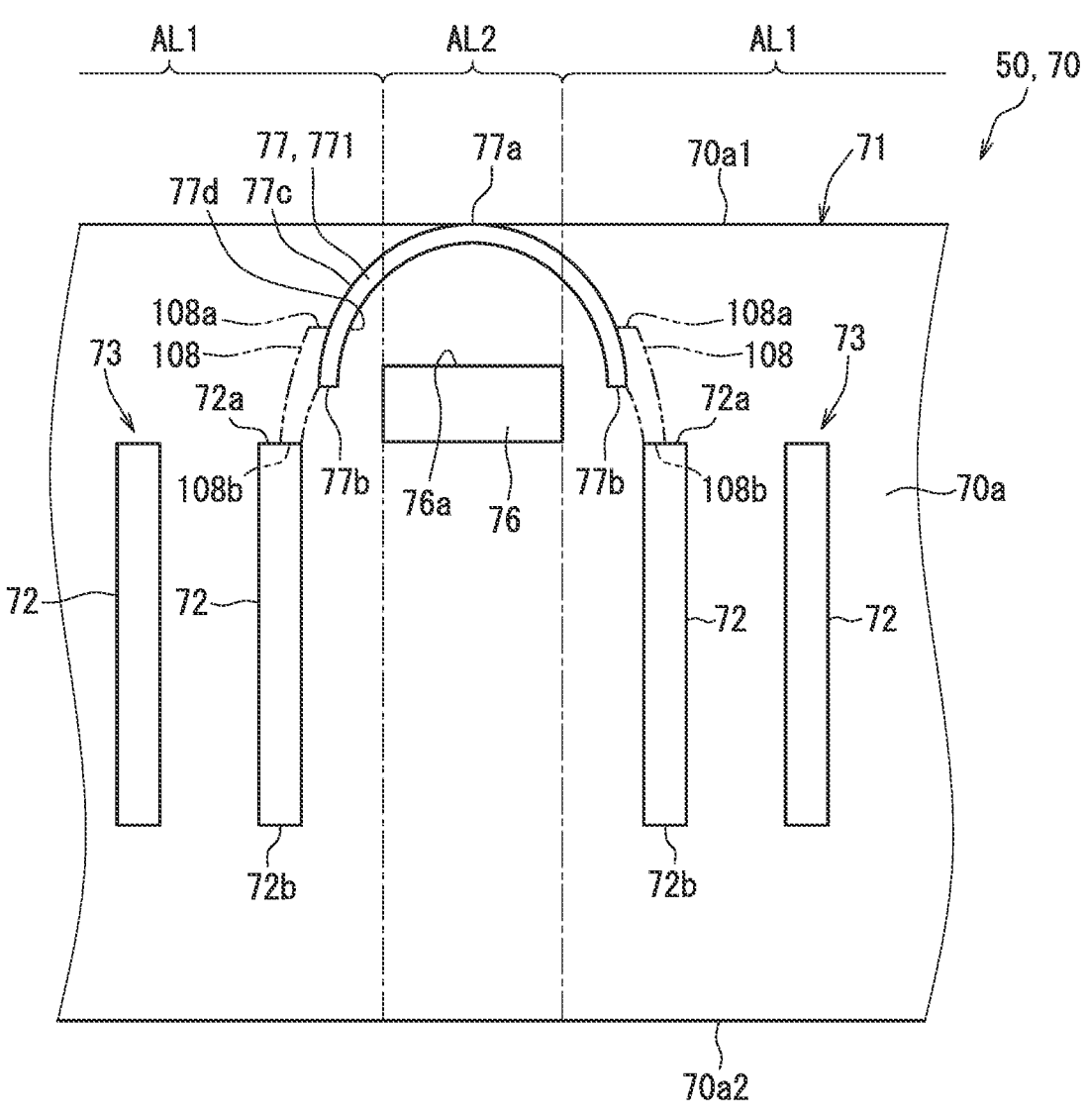
FIG. 27 is an enlarged view of a periphery of an exposed region guide plate in Modification 5-4.

An auxiliary guide portion that assists a guide portion may be provided in the fin cover 100. In Modification 5-4, for example, the auxiliary guide portion is in a state of spanning the guide portion and the radiation fins in the fifth embodiment described above. As shown in FIG. 27, the fin cover 100 includes a cover main body 101 and auxiliary guide plates 108. The cover main body 101 of the present modification has the same configuration as that of the second embodiment described above.

Each of the auxiliary guide plates 108 is provided on the inner peripheral surface 100b of the fin cover 100. The auxiliary guide plate 108 protrudes from the inner peripheral surface 100b. The auxiliary guide plate 108 is provided integrally with the housing main body 71. The auxiliary guide plate 108 is formed in a plate shape as a whole. The auxiliary guide plate 108 extends in the axial direction AD as a whole. For example, multiple auxiliary guide plates 108 are arranged in the circumferential direction CD.

In the radial direction RD, a protrusion dimension of the auxiliary guide plate 108 from the inner peripheral surface 100b is substantially the same as a protrusion dimension of the motor fin 72 from the outer peripheral surface 70a. In the motor housing 70, the auxiliary guide plate 108 is in contact with the outer peripheral surface 70a. For example, a tip end surface of the auxiliary guide plate 108 is overlapped with the outer peripheral surface 70a. For example, in the fin cover 100, the tip end surface of the auxiliary guide plate 108 is in a state of being pressed against the outer peripheral surface 70a by a restoring force generated due to elastic deformation.

The auxiliary guide plate 108 has an auxiliary guide plate upstream end 108a and an auxiliary guide plate downstream end 108b. In both ends of the auxiliary guide plate 108 arranged in the axial direction AD, an upstream-side end portion is the auxiliary guide plate upstream end 108a, and a downstream-side end portion is the auxiliary guide plate downstream end 108b.

The auxiliary guide plate 108 is in a state of spanning the exposed region guide plate 771 and the motor fin 72. The auxiliary guide plate 108 is provided for each of the pair of guide plate end portions 77b of the exposed region guide plate 771. The auxiliary guide plate 108 is in a state of closing a gap between the exposed region guide plate 771 and the motor fin 72 from the upstream side in the axial direction AD. In the auxiliary guide plate 108, a portion on the auxiliary guide plate upstream end 108a is in contact with the exposed region guide plate 771, and a portion on the auxiliary guide plate downstream end 108b is in contact with the motor fin 72. In the auxiliary guide plate 108, a portion facing a cover guide plate 107 is overlapped with the guide plate outer surface 77c in one of the plate surfaces, and the auxiliary guide plate downstream end 108b is overlapped with the fin upstream end 72a.

The auxiliary guide plate 108 extends in at least one of the axial direction AD and the circumferential direction CD. Regarding the exposed region guide plate 771 and the motor fin 72, in a configuration in which the guide plate end portion 77b and the fin upstream end 72a are separated from each other in the axial direction AD, the auxiliary guide plate 108 extends in the axial direction AD at least. In a configuration in which the guide plate end portion 77b and the fin upstream end 72a are separated from each other in the circumferential direction CD, the auxiliary guide plate 108 extends in the circumferential direction CD at least.

In the manufacturing process of manufacturing the EDS 50, when attaching the fin cover 100 to the motor housing 70, the operator brings the fin upstream end 72a into contact with the auxiliary guide plate downstream end 108b. In this case, the operator moves the fin cover 100 in the axial direction AD with respect to the motor housing 70 until the fin upstream end 72a comes into contact with the auxiliary guide plate downstream end 108b. In this way, by bringing the fin upstream end 72a and the auxiliary guide plate downstream end 108b into contact with each other, a relative position of the fin cover 100 with respect to the motor housing 70 in the axial direction AD can be determined.

In FIG. 27, the air reaching the exposed region guide plate 771 due to the blower fan 111, flowing along the guide plate outer surface 107c, and reaching the auxiliary guide plate 108 is guided in the axial direction AD toward the motor fin 72 by the auxiliary guide plate 108. Therefore, even if a gap is formed between the exposed region guide plate 771 and each of the two motor fins 72, the auxiliary guide plate 108 restricts the air from passing through the gap in the axial direction AD.

<Modification 5-5>

Figure 36:
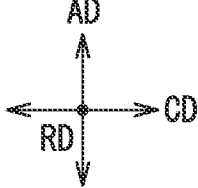
FIG. 36 is a partially developed view of outer peripheral surfaces of a motor and an inverter in Modification 5-5.

A guide plate may span a radiation fin and an obstacle. In Modification 5-5, for example, each of bridging guide plates 773 spans the inverter fin 92 and the housing protrusion portion 96 in the fifth embodiment described above. As shown in FIG. 36, the bridging guide plate 773 is provided on the outer peripheral surface 70a as the motor guide plate 77. The bridging guide plate 773 is provided on a downstream side of the motor fin 72 in the axial direction AD together with the housing protrusion portion 96. Similarly to the downstream flange 75 or the like, the housing protrusion portion 96 is likely to be an obstacle for the air flowing in the axial direction AD.

The bridging guide plate 773 spans the housing protrusion portion 96 and the inverter fin 92 that is adjacent to the housing protrusion portion 96 among the multiple inverter fins 92. The bridging guide plate 773 may be or may not be in contact with the inverter fin 92 and the housing protrusion portion 96 as long as the bridging guide plate 773 is in a state of spanning the inverter fin 92 and the housing protrusion portion 96.

For example, in the bridging guide plate 773, a first guide plate end portion 77b1 may be located at a position close to the fin upstream end 92a, and a second guide plate end portion 77b2 may be located at a position close to a protrusion upstream end 96a. In this case, a distance between the first guide plate end portion 77b1 and the fin upstream end 92a is substantially equal to a distance between the second guide plate end portion 77b2 and the protrusion upstream end 96a. In the pair of guide plate end portions 77b of the guide plate 77, one guide plate end portion 77b is the first guide plate end portion 77b1, and the other guide plate end portion 77b is the second guide plate end portion 77b2. The protrusion upstream end 96a is an upstream end of the housing protrusion portion 96. The protrusion upstream end 96a extends from the outer peripheral surface 90a toward a radially outer side and faces the motor housing 70 in the axial direction AD.

In the bridging guide plate 773, the first guide plate end portion 77b1 and the second guide plate end portion 77b2 are located at positions deviated in the axial direction AD. For example, the first guide plate end portion 77b1 is located at a position away from the second guide plate end portion 77b2 toward a downstream side in the axial direction AD. In the bridging guide plate 773, the first guide plate end portion 77b1 and the second guide plate end portion 77b2 are deviated in the axial direction AD due to the fact that the fin upstream end 92a and the protrusion upstream end 96a are deviated in the axial direction AD.

Due to the fact that the first guide plate end portion 77b1 and the second guide plate end portion 77b2 are deviated in the axial direction AD, the bridging guide plate 773 does not have a line-symmetric shape with a top portion line Ca as a target axis. The top portion line Ca is a straight virtual line that extends in the axial direction AD passing through the guide plate top portion 77a of the bridging guide plate 773. In the bridging guide plate 773, a portion connecting the top portion line Ca and the first guide plate end portion 77b1 is longer than a portion connecting the top portion line Ca and the second guide plate end portion 77b2.

The bridging guide plate 773 has a shape corresponding to a positional relationship between the inverter fin 92 and the housing protrusion portion 96. Therefore, depending on the positional relationship between the inverter fin 92 and the housing protrusion portion 96, the bridging guide plate 773 may have a line-symmetric shape with the top portion line Ca as the target axis.

In the present modification, the bridging guide plate 773 is provided to cover an obstacle such as the downstream flange 75 from an upstream side. The bridging guide plate 773 may not cover the obstacle from the upstream side. For example, the bridging guide plate 773 may be provided at a position away from the downstream flange 752 and the upstream flange 951 in the circumferential direction CD. The bridging guide plate 773 may be provided on a downstream side with respect to the downstream flange 752 and the upstream flange 951 in the axial direction AD.

<Modification 5-6>

Figure 37:
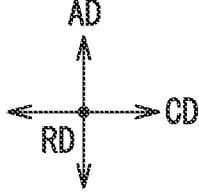
FIG. 37 is a partially developed view of outer peripheral surfaces of a motor and an inverter in Modification 5-6.

The guide plate may be provided with respect to a downstream blocking portion such that the guide plate is not in a state of spanning the radiation fin and the downstream blocking portion. In Modifications 5-6, for example, a separation guide plate 774 is provided with respect to the housing protrusion portion 96 in the fifth embodiment described above such that the separation guide plate 774 is not in a state of spanning the inverter fin 92 and the housing protrusion portion 96. As shown in FIG. 37, the separation guide plate 774 is provided on the outer peripheral surface 70a as the motor guide plate 77.

The separation guide plate 774 is provided on a downstream side of the motor fin 72 in the axial direction AD together with the housing protrusion portion 96. The housing protrusion portion 96 is located on a downstream side with respect to the inverter fin 92 in the axial direction AD. The housing protrusion portion 96 is likely to restrict air from flowing in the axial direction AD. The housing protrusion portion 96 corresponds to the downstream blocking portion. The separation guide plate 774 corresponds to the separation guide portion.

The separation guide plate 774 is provided at a position to straddle a region between the inverter fin 92 and the housing protrusion portion 96 in the circumferential direction CD. The region which is straddled by the separation guide plate 774 is a region between the housing protrusion portion 96 and the inverter fin 92 that is adjacent to the housing protrusion portion 96 among the multiple inverter fins 92. In the separation guide plate 774, the first guide plate end portion 77b1 is located on a side facing the inverter fin 92 and the second guide plate end portion 77b2 is located on a side facing the housing protrusion portion 96 in the circumferential direction CD.

The separation guide plate 774 as a whole is provided at a position away from the housing protrusion portion 96 toward the motor fin 72. At least a part of the separation guide plate 774 is provided on an upstream side with respect to the housing protrusion portion 96 in the axial direction AD. In the separation guide plate 774, at least the guide plate top portion 77a and the second guide plate end portion 77b2 are located at positions away from the housing protrusion portion 96 toward the motor fin 72. In the separation guide plate 774, the first guide plate end portion 77b1 is located on a downstream side with respect to the protrusion upstream end 96a.

The separation guide plate 774 as a whole extends from the inverter fin 92 toward the upstream side. The separation guide plate 774 may or may not be in contact with the inverter fin 92. For example, in the separation guide plate 774, the first guide plate end portion 77b1 is located at a position close to the fin upstream end 92a. The separation guide plate 774 is located at a position closer to the inverter fin 92 than to the housing protrusion portion 96. For example, a distance between the first guide plate end portion 77b1 and the fin upstream end 92a is smaller than a distance between the second guide plate end portion 77b2 and the protrusion upstream end 96a. The separation guide plate 774 may be located at a position away from the inverter fin 92 by a certain distance as long as the air can be guided to the inverter fin 92.

In the EDS unit 130, the air easily flows between the separation guide plate 774 and the housing protrusion portion 96. For example, the air that has passed through the motor fin 72 in the axial direction AD passes between the separation guide plate 774 and the housing protrusion portion 96 and flows toward a downstream side with respect to the protrusion upstream end 96a. A distance between the separation guide plate 774 and the housing protrusion portion 96 is large enough to allow the air flowing from the upstream side to flow easily. For example, the distance between the second guide plate end portion 77b2 and the protrusion upstream end 96a is larger than a distance between the guide plate top portion 77a and the second guide plate end portion 77b2 in the separation guide plate 774. The distance between the second guide plate end portion 77b2 and the protrusion upstream end 96a is larger than a distance between the upstream flange 951 covered by the separation guide plate 774 and the housing protrusion portion 96.

In the separation guide plate 774, similarly to the bridging guide plate 773 according to Modification 5-5, the first guide plate end portion 77*b*1 and the second guide plate end portion 77*b*2 are deviated in the axial direction AD. For example, the distance between the first guide plate end portion 77*b*1 and the second guide plate end portion 77*b*2 in the axial direction AD is larger in the separation guide plate 774 than in the bridging guide plate 773. Similarly to the bridging guide plate 773, the separation guide plate 774 does not have a line-symmetric shape with the top portion line Ca as a target axis. As long as the air easily flows between the separation guide plate 774 and the housing protrusion portion 96, the separation guide plate 774 may have a line-symmetrical shape with the top portion line Ca as the target axis.

According to the present modification, the separation guide plate 774 is provided to straddle a region between the inverter fin 92 and the housing protrusion portion 96 in the circumferential direction CD. Therefore, the separation guide plate 774 guides the air on the downstream side of the motor fin 72 to be separated from the housing protrusion portion 96 in the circumferential direction CD. Therefore, a configuration in which the air that has passed through the motor fin 72 flows easily along the inverter fin 92 can be implemented by the separation guide plate 774.

The separation guide plate 774 is provided at a position away from the housing protrusion portion 96 toward the motor fin 72. In the configuration, on the upstream side of the housing protrusion portion 96, the air easily flows as cooling air between the housing protrusion portion 96 and the separation guide plate 774. Therefore, even if the cooling air that has passed through the motor fin 72 flows toward the housing protrusion portion 96 in the axial direction AD, the cooling air easily flows around in the circumferential direction CD to avoid the protrusion upstream end 96*a*. Therefore, air or heat is less likely to be accumulated on the upstream side of the housing protrusion portion 96. That is, the accumulation of air or heat on the upstream side of the housing protrusion portion 96 can be restricted due to a positional relationship between the separation guide plate 774 and the housing protrusion portion 96.

In Modification 5-5, for example, the bridging guide plate 773 spans the inverter fin 92 and the housing protrusion portion 96. Therefore, the cooling air that has passed through the motor fin 72 and reached the housing protrusion portion 96 is likely to hit the bridging guide plate 773 even if the cooling air flows around the protrusion upstream end 96*a* in the circumferential direction CD. The cooling air that hits the bridging guide plate 773 cannot avoid the protrusion upstream end 96*a* in the circumferential direction CD, and accumulates on the upstream side of the housing protrusion portion 96 together with the heat. The accumulation of cooling air on the upstream side of the housing protrusion portion 96 means that the cooling air does not flow at a periphery of the motor fin 72 on the upstream side of the housing protrusion portion 96. Therefore, there is a concern that on the upstream side of the housing protrusion portion 96, air or heat is accumulated at the periphery of the motor fin 72 and the cooling effect of the motor fin 72 is reduced.

Meanwhile, in the present modification, as described above, since the cooling air easily passes between the separation guide plate 774 and the housing protrusion portion 96, air or heat is less likely to be accumulated at the periphery of the motor fin 72 on the upstream side of the housing protrusion portion 96. Therefore, a decrease in the cooling effect of the motor fin 72 can be reduced by the positional relationship between the separation guide plate 774 and the housing protrusion portion 96.

Sixth Embodiment

In a sixth embodiment, the fin cover 100 includes a guide portion. Configurations, operations, and effects not particularly described in the sixth embodiment are the same as those of the fifth embodiment described above. In the sixth embodiment, differences from the fifth embodiment described above will be mainly described.

Figure 28:
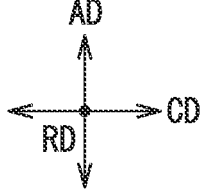
FIG. 28 is a partially developed view of outer peripheral surfaces of a motor and an inverter in a sixth embodiment.
Figure 29:
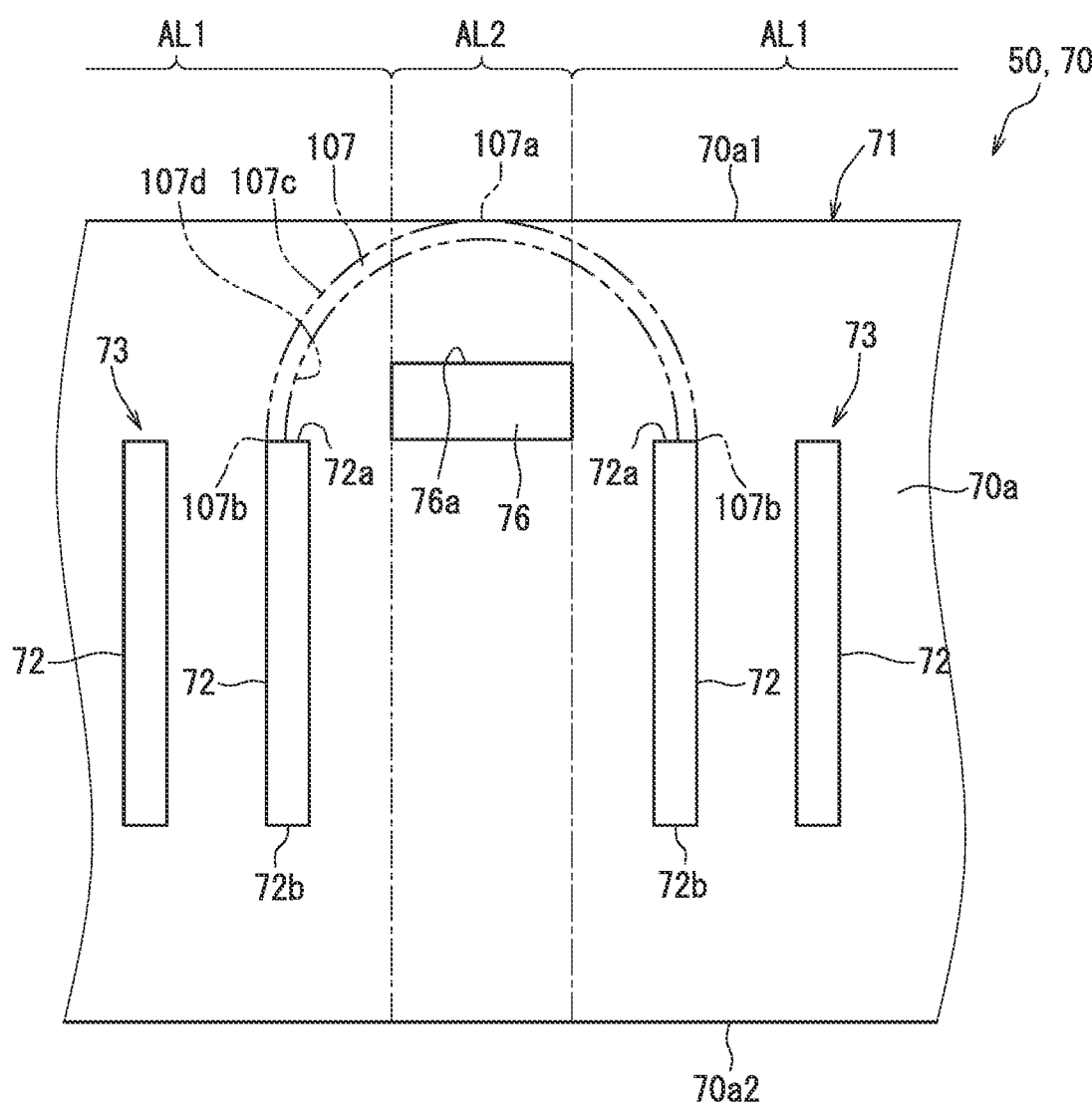
FIG. 29 is an enlarged view of a periphery of an exposed region guide plate in FIG. 28.
Figure 30:
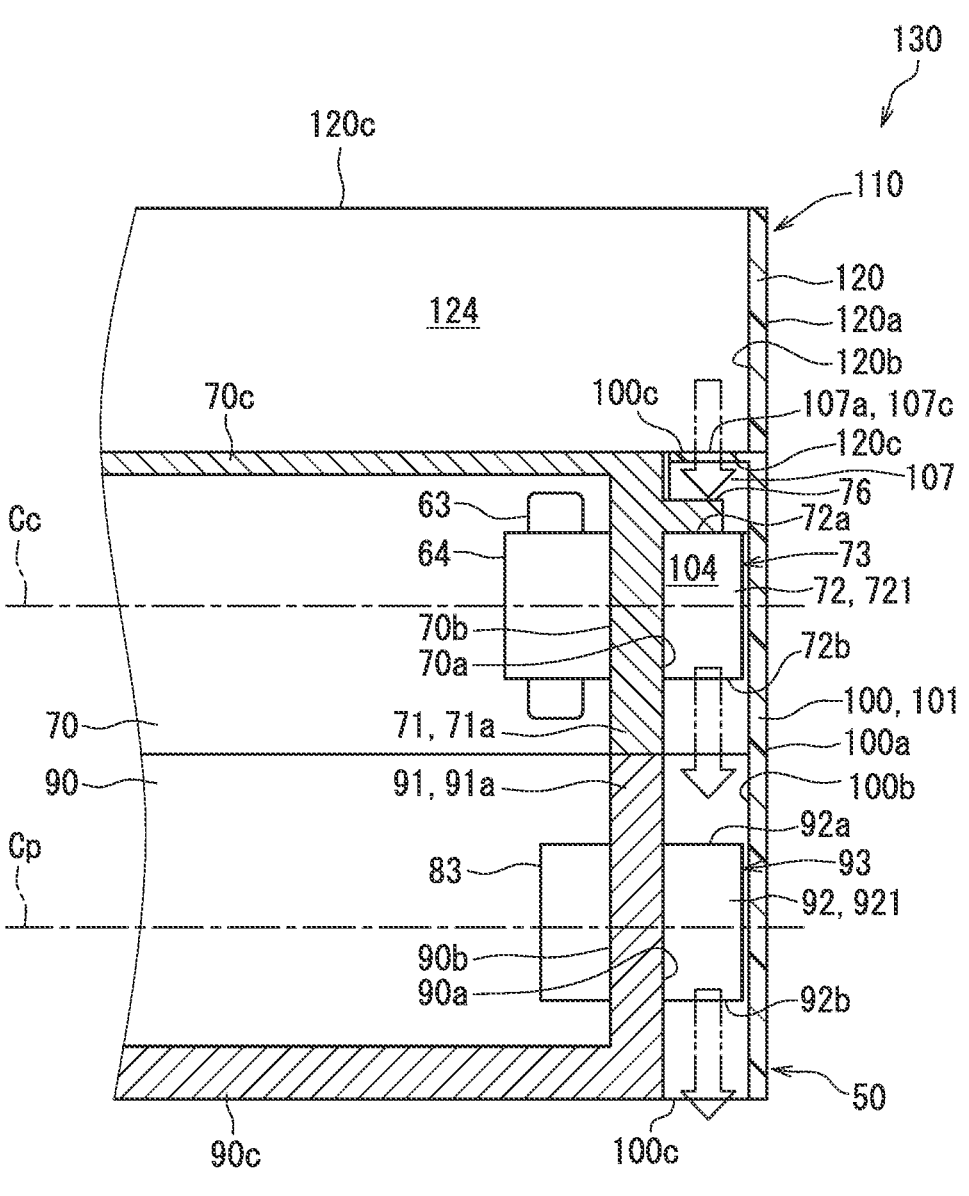
FIG. 30 is a partial vertical cross-sectional view of the motor and the inverter.
Figure 30:
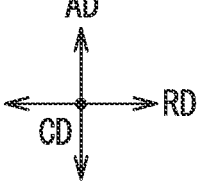

As shown in FIGS. 28, 29, and 30, the fin cover 100 includes the cover main body 101 and the cover guide plates 107. The cover main body 101 of the present embodiment has the same configuration as that of the second embodiment described above.

Each of the cover guide plates 107 is provided on the inner peripheral surface 100*b* of the fin cover 100. The cover guide plate 107 protrudes from the inner peripheral surface 100*b*. The cover guide plate 107 is provided integrally with the cover main body 101. The cover guide plate 107 is formed in a plate shape as a whole. The cover guide plate 107 is bent to bulge toward an upstream side in the axial direction AD. For example, the cover guide plate 107 is curved such that a central portion thereof bulges toward the upstream side. Multiple cover guide plates 107 are arranged in the circumferential direction CD. The cover guide plate 107 corresponds to the guide portion and a cover guide portion.

As shown in FIG. 30, in the radial direction RD, a protrusion dimension of the cover guide plate 107 from the inner peripheral surface 100*b* is substantially the same as a protrusion dimension of the motor fin 72 from the outer peripheral surface 70*a*. In the motor housing 70, the cover guide plate 107 is in contact with the outer peripheral surface 70*a*. For example, a tip end surface of the cover guide plate 107 is overlapped with the outer peripheral surface 70*a*. For example, in the fin cover 100, the tip end surface of the cover guide plate 107 is in a state of being pressed against the outer peripheral surface 70*a* by a restoring force generated due to elastic deformation. In FIG. 30, for convenience of illustration, a gap is illustrated between the outer peripheral surface 70*a* and the cover guide plate 107, but actually, the gap is less likely to occur.

As shown in FIGS. 28 and 29, the cover guide plate 107 includes a guide plate top portion 107*a*, guide plate end portions 107*b*, the guide plate outer surface 107*c*, and a guide plate inner surface 107*d*. The cover guide plate 107 has a pair of plate surfaces, and both of the plate surfaces are bent to bulge toward the upstream side in the axial direction AD. In the pair of plate surfaces of the cover guide plate 107, an outer plate surface is the guide plate outer surface 107*c*, and an inner plate surface is the guide plate inner surface 107*d*. The guide plate outer surface 107*c* faces the upstream side in the axial direction AD. The guide plate outer surface 107*c* is inclined in the circumferential direction CD with respect to the motor axis Cm. The guide plate inner surface 107*d* faces the downstream side in the axial direction AD. The cover guide plate 107 guides air from the blower fan 111 in the circumferential direction CD to flow toward the guide portion such as the motor fin 72. The guide plate outer surface 107*c* corresponds to the guide surface.

The guide plate top portion 107*a* is a most upstream portion of the guide plate outer surface 107*c*. The guide plate end portions 107*b* are downstream end portions of the guide plate outer surface 107*c* and are provided in pair on the guide plate outer surface 107*c*. The pair of guide plate end portions 107*b* are aligned with each other in the circumferential direction CD with the guide plate top portion 107*a* interposed therebetween. Each of the guide plate end portions 107*b* is provided on the downstream end portion of the cover guide plate 107. An inclination angle of the guide plate outer surface 107*c* with respect to the motor axis Cm gradually decreases from the guide plate top portion 107*a* toward the guide plate end portion 107*b*.

The cover guide plate 107 guides the air, that flows toward the hidden region AL2 in the axial direction AD, in the circumferential direction CD to flow toward the exposed region AL1. The cover guide plate 107 is provided on the upstream side of the hidden region AL2 and extends along the inner peripheral surface 100*b* toward the exposed region AL1. The cover guide plate 107 is in a state of protruding from the hidden region AL2 in the circumferential direction CD. The cover guide plate 107 is in a state of spanning two of the exposed regions AL1 adjacent to each other with the hidden region AL2 interposed therebetween in the circumferential direction CD.

The cover guide plate 107 is in a state of spanning the respective motor fin 72 of the two exposed regions AL1. The two motor fins 72 spanned by the cover guide plate 107 are adjacent to each other in the circumferential direction CD with the hidden region AL2 interposed therebetween. In the cover guide plate 107, the guide plate outer surface 107*c* is in a state of spanning the two motor fins 72.

The cover guide plate 107 is in contact with the two motor fins 72. For example, for the cover guide plate 107 and the motor fin 72 that are in contact with each other, a downstream end portion of the cover guide plate 107 and the fin upstream end 72*a* are in contact with each other in a manner of being overlapped with each other in the axial direction AD. With respect to the cover guide plate 107 and the motor fin 72, the cover guide plate 107 is in a state of extending from the motor fin 72 toward the upstream side. For example, at least one of the guide plate outer surface 107*c* and the guide plate inner surface 107*d* extends continuously from the plate surface of the motor fin 72. For example, in a configuration in which the guide plate outer surface 107*c* continuously extends from the plate surface of the motor fin 72, the air flowing along the guide plate outer surface 107*c* continuously flows along the plate surface of the motor fin 72.

In the manufacturing process of manufacturing the EDS 50, when attaching the fin cover 100 to the motor housing 70, the operator brings the fin upstream end 72*a* into contact with the downstream end portion of the cover guide plate 107. In this case, the operator moves the fin cover 100 in the axial direction AD with respect to the motor housing 70 until the fin upstream end 72*a* comes into contact with the downstream end portion of the cover guide plate 107. In this way, by bringing the fin upstream end 72*a* and the downstream end portion of the cover guide plate 107 into contact with each other, a relative position of the fin cover 100 with respect to the motor housing 70 in the axial direction AD can be determined.

As shown in FIG. 28, the air reaching the cover guide plate 107 due to the blower fan 111 flows along the guide plate outer surface 107*c* in the cover guide plate 107. In this case, the air flowing in the axial direction AD toward the housing protrusion portion 76 is guided in the circumferential direction CD to travel toward the exposed region AL1 by flowing along the guide plate outer surface 107*c*. The air guided by the cover guide plate 107 in this way easily passes through the multiple motor fins 72 in the exposed region AL1 in the axial direction AD.

According to the present embodiment, the air is guided in the circumferential direction CD by the cover guide plate 107, that is provided on the fin cover 100, to flow toward the motor fins 72 and the inverter fins 92. In the configuration, since a volume of air passing through the motor fins 72 and the inverter fins 92 tends to be increased by the cover guide plate 107, the cooling effect based on the motor fins 72 and the inverter fins 92 can be enhanced. Therefore, for example, even if the number and the size of the motor fins 72 and the inverter fins 92 are limited in order to avoid the EDS 50 from becoming too heavy for the eVTOL 10, a decrease in the effect of cooling the EDS 50 can be reduced by the cover guide plate 107. Therefore, both the cooling effect enhancement and weight reduction of the EDS 50 can be achieved by the cover guide plate 107. In this way, the EDS 50 and the EDS unit 130 suitable for mounting on the eVTOL 10 can be implemented by the cover guide plate 107.

For example, in a configuration in which the motor guide plate 77 serving as the guide portion is provided on the motor housing 70 together with the housing protrusion portion 76 as in the fifth embodiment described above, it is conceivable that it is highly difficult to form the motor housing 70 with a mold. A reason is that a space between the upstream surface 76*a* and the guide plate inner surface 77*d* is surrounded by the housing protrusion portion 76 and the motor guide plate 77 from four sides in a direction orthogonal to the radial direction RD. Meanwhile, according to the present embodiment, the cover guide plate 107 is on the fin cover 100 and is provided on the inner peripheral surface 100*b*. In the configuration, since it is unnecessary to provide the guide portion on the motor housing 70, a shape of the motor housing 70 can be restricted from becoming excessively complicated. Therefore, the motor housing 70 can be easily formed with a mold.

Seventh Embodiment

In a seventh embodiment, the shroud 120 includes a guide portion. Configurations, operations, and effects not particularly described in the seventh embodiment are the same as those in the fifth embodiment described above. In the seventh embodiment, differences from the fifth embodiment described above will be mainly described.

Figure 31:
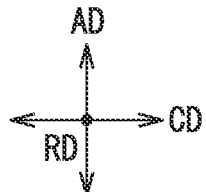
FIG. 31 is a partially developed view of outer peripheral surfaces of a motor and an inverter in a seventh embodiment.
Figure 32:
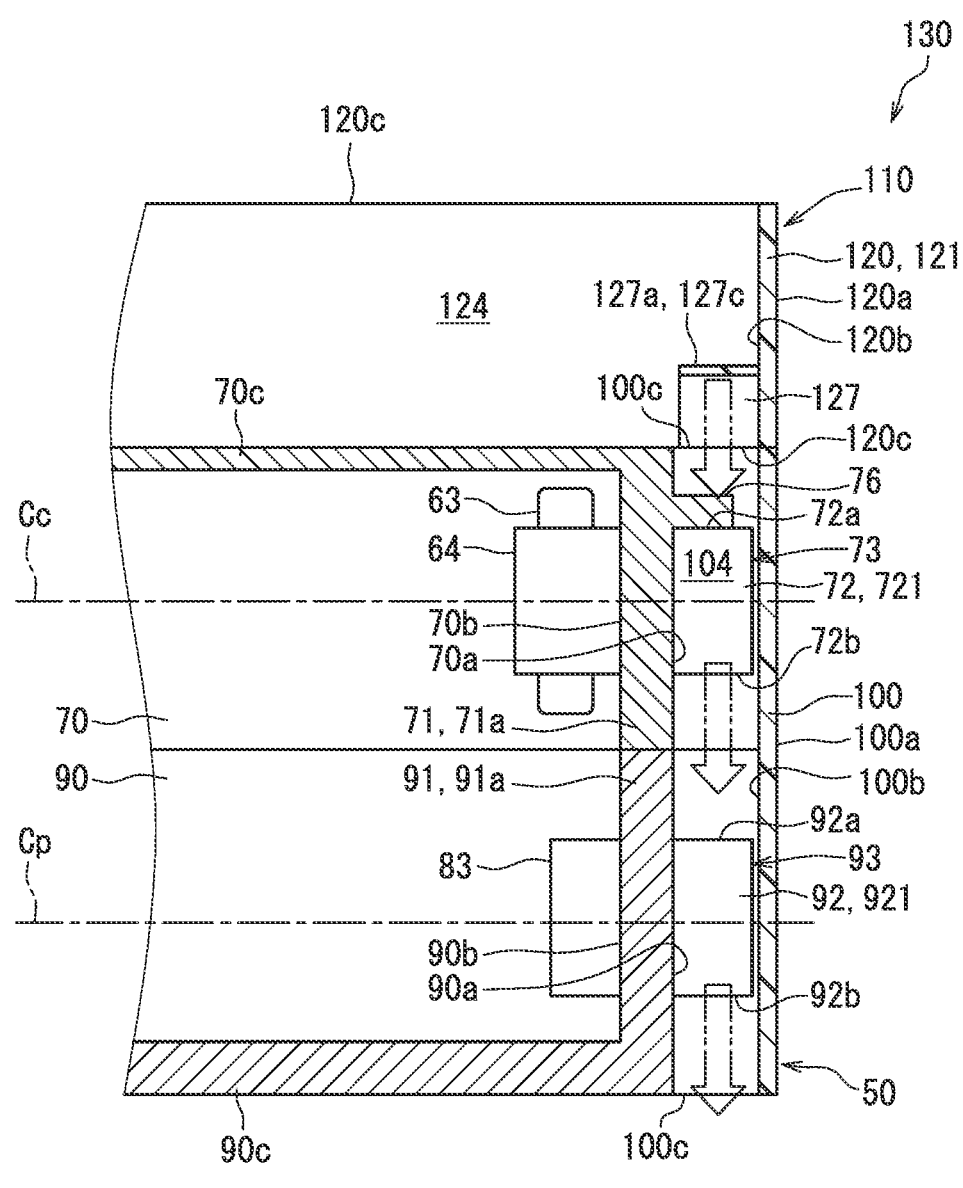
FIG. 32 is a partial vertical cross-sectional view of the motor and the inverter.
Figure 32:
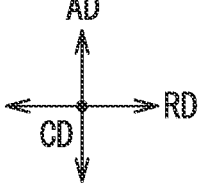

As shown in FIGS. 31 and 32, the shroud 120 includes the shroud main body 121 and shroud guide plates 127. The shroud main body 121 of the present embodiment has the same configuration as that of the third embodiment described above.

Each of the shroud guide plates 127 is provided on the inner peripheral surface 120*b* of the shroud 120. The shroud guide plate 127 protrudes from the inner peripheral surface 120*b*. The shroud guide plate 127 is provided integrally with the shroud main body 121. The shroud guide plate 127 is formed in a plate shape as a whole. The shroud guide plate 127 is bent to bulge toward an upstream side in the axial direction AD. For example, the shroud guide plate 127 is curved such that a central portion thereof bulges toward the upstream side. In the radial direction RD, a protrusion dimension of the shroud guide plate 127 from the inner peripheral surface 120*b* is substantially the same as a protrusion dimension of the motor fin 72 from the outer peripheral surface 70*a*. Multiple shroud guide plates 127 are arranged in the circumferential direction CD. The shroud guide plate 127 corresponds to the guide portion and a shroud guide portion. The shroud guide plate 127 is provided on the upstream side of the upstream flange 751 in the axial direction AD.

As shown in FIG. 31, the shroud guide plate 127 includes a guide plate top portion 127a, guide plate end portions 127b, a guide plate outer surface 127c, and a guide plate inner surface 127d. The shroud guide plate 127 has a pair of plate surfaces, and both of the plate surfaces are bent to bulge toward the upstream side in the axial direction AD. In the pair of plate surfaces of the shroud guide plate 127, an outer plate surface is the guide plate outer surface 127c, and an inner plate surface is the guide plate inner surface 127d. The guide plate outer surface 127c faces the upstream side in the axial direction AD. The guide plate outer surface 127c is inclined in the circumferential direction CD with respect to the motor axis Cm. The guide plate inner surface 127d faces the downstream side in the axial direction AD. The shroud guide plate 127 guides air from the blower fan 111 in the circumferential direction CD to flow toward the guide portion such as the motor fin 72. The guide plate outer surface 127c corresponds to the guide surface.

The guide plate top portion 127a is a most upstream portion of the guide plate outer surface 127c. The guide plate end portions 127b are downstream end portions of the guide plate outer surface 127c and are provided in pair on the guide plate outer surface 127c. The pair of guide plate end portions 127b are aligned with each other in the circumferential direction CD with the guide plate top portion 127a interposed therebetween. Each of the guide plate end portions 127b is provided on the downstream end portion of the shroud guide plate 127. An inclination angle of the guide plate outer surface 127c with respect to the motor axis Cm gradually decreases from the guide plate top portion 127a toward the guide plate end portion 127b.

The shroud guide plate 127 guides the air, that flows toward the hidden region AL2 in the axial direction AD, in the circumferential direction CD to flow toward the exposed region AL1. The shroud guide plate 127 is provided on the upstream side of the hidden region AL2 and extends along the inner peripheral surface 120b toward the exposed region AL1. The shroud guide plate 127 is in a state of protruding from the hidden region AL2 in the circumferential direction CD. The shroud guide plate 127 is in a state of spanning two of the exposed regions AL1 adjacent to each other in the circumferential direction CD with the hidden region AL2 interposed therebetween.

The air reaching the shroud guide plate 127 due to the blower fan 111 flows along the guide plate outer surface 127c in the shroud guide plate 127. In this case, the air flowing in the axial direction AD toward the upstream flange 751 is guided in the circumferential direction CD to travel toward the exposed region AL1 by flowing along the guide plate outer surface 127c. The air guided by the shroud guide plate 127 in this way easily passes through the multiple motor fins 72 in the exposed region AL1 in the axial direction AD.

According to the present embodiment, the air is guided in the circumferential direction CD by the shroud guide plate 127, that is provided on the shroud 120, to flow toward the motor fins 72 and the inverter fins 92. In the configuration, since a volume of air passing through the motor fins 72 and the inverter fins 92 tends to be increased by the shroud guide plate 127, the cooling effect based on the motor fins 72 and the inverter fins 92 can be enhanced. Therefore, for example, even if the number and the size of the motor fins 72 and the inverter fins 92 are limited in order to avoid the EDS 50 from becoming too heavy for the eVTOL 10, a decrease in the effect of cooling the EDS 50 can be reduced by the shroud guide plate 127. Therefore, both the cooling effect enhancement and weight reduction of the EDS 50 can be achieved by the shroud guide plate 127. In this way, the EDS 50 and the EDS unit 130 suitable for mounting on the eVTOL 10 can be implemented by the shroud guide plate 127.

Eighth Embodiment

In an eighth embodiment, a housing includes both inclined fins and a guide portion. Configurations, operations, and effects not particularly described in the eighth embodiment are the same as those in the first and fifth embodiments described above. In the eighth embodiment, differences from the first and fifth embodiments described above will be mainly described.

Figure 33:
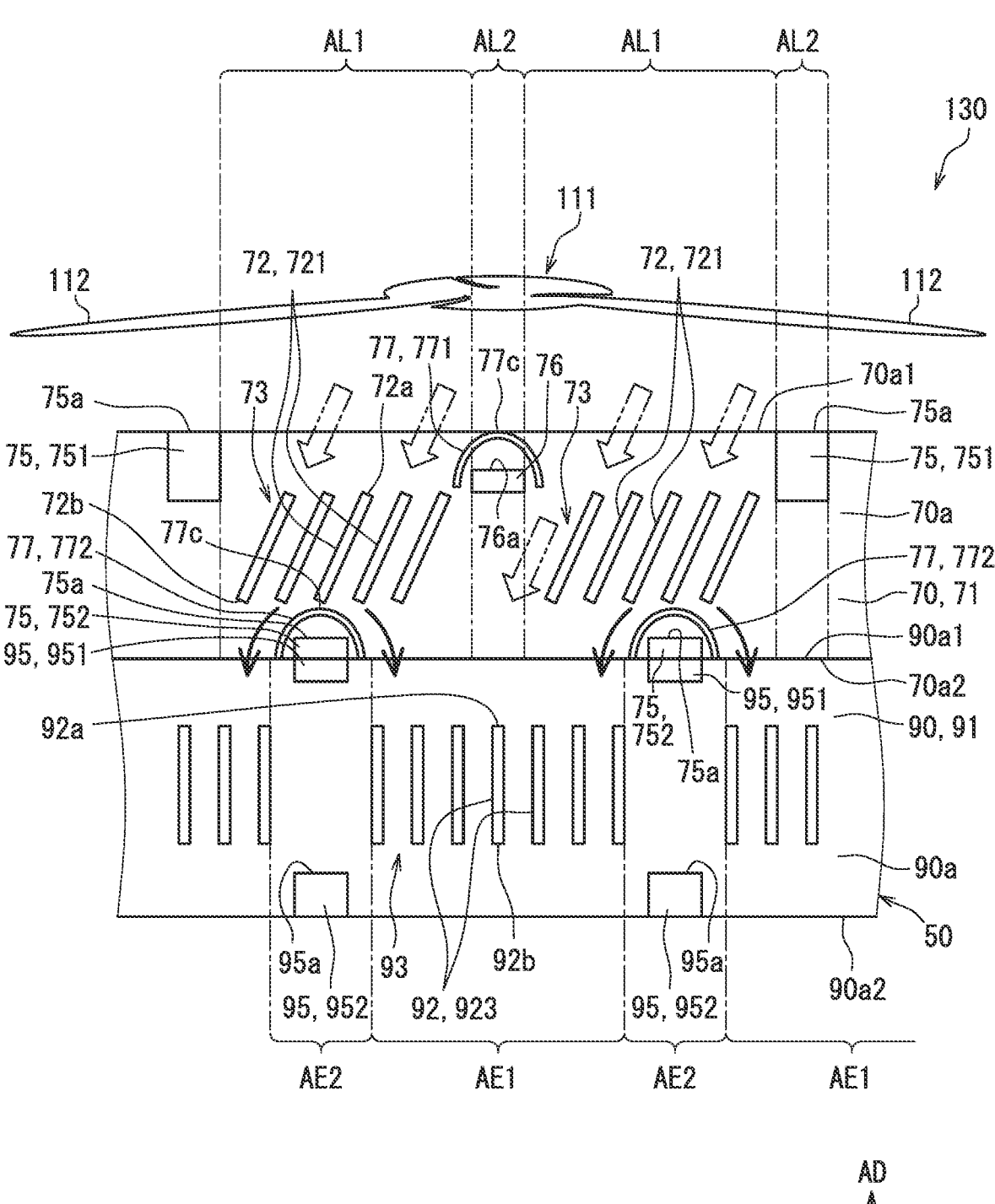
FIG. 33 is a partially developed view of outer peripheral surfaces of a motor and an inverter in an eighth embodiment.

As shown in FIG. 33, the motor housing 70 includes the forward inclined fins 721, the exposed region guide plates 771, and the high heat region guide plates 772. In the present embodiment, each of the forward inclined fins 721 has the same configuration as that of the first embodiment described above, and the exposed region guide plate 771 and the high heat region guide plate 772 have the same configurations as those of the fifth embodiment described above. In the axial direction AD, the exposed region guide plate 771 is located on an upstream side of the forward inclined fins 721, and the high heat region guide plate 772 is located on a downstream side of the forward inclined fins 721.

When a swirling flow generated by the blower fan 111 is sent toward the EDS 50, air reaching the exposed region guide plate 771 flows toward the forward inclined fins 721 along the guide plate outer surface 77c. In this case, the swirling flow is less likely to hit the housing protrusion portion 76 to cause the air flow to be disturbed, and a pressure loss of the air passing through the multiple forward inclined fins 721 is less likely to be increased. Moreover, the air guided in the circumferential direction CD toward the forward inclined fins 721 by the exposed region guide plate 771 is guided in the circumferential direction CD toward the downstream side of the housing protrusion portion 76 by the forward inclined fins 721. Therefore, the swirling flow toward the housing protrusion portion 76 easily reaches the hidden region AL2 from an upstream position of the housing protrusion portion 76 passing through the exposed region AL1 in a manner of going around the housing protrusion portion 76 in the circumferential direction CD. In this way, in the configuration in which the exposed region guide plate 771 is provided on the upstream side of the housing protrusion portion 76, a volume of air in the hidden region AL2 can be also increased by the forward inclined fins 721, and a cooling effect in the hidden region AL2 can be also enhanced.

Ninth Embodiment

In a ninth embodiment, a housing cover includes a cover flow-regulation portion. Configurations, operations, and effects not particularly described in the ninth embodiment are the same as those in the second and fifth embodiments described above. In the ninth embodiment, differences from the second and fifth embodiments described above will be mainly described.

Figure 34:
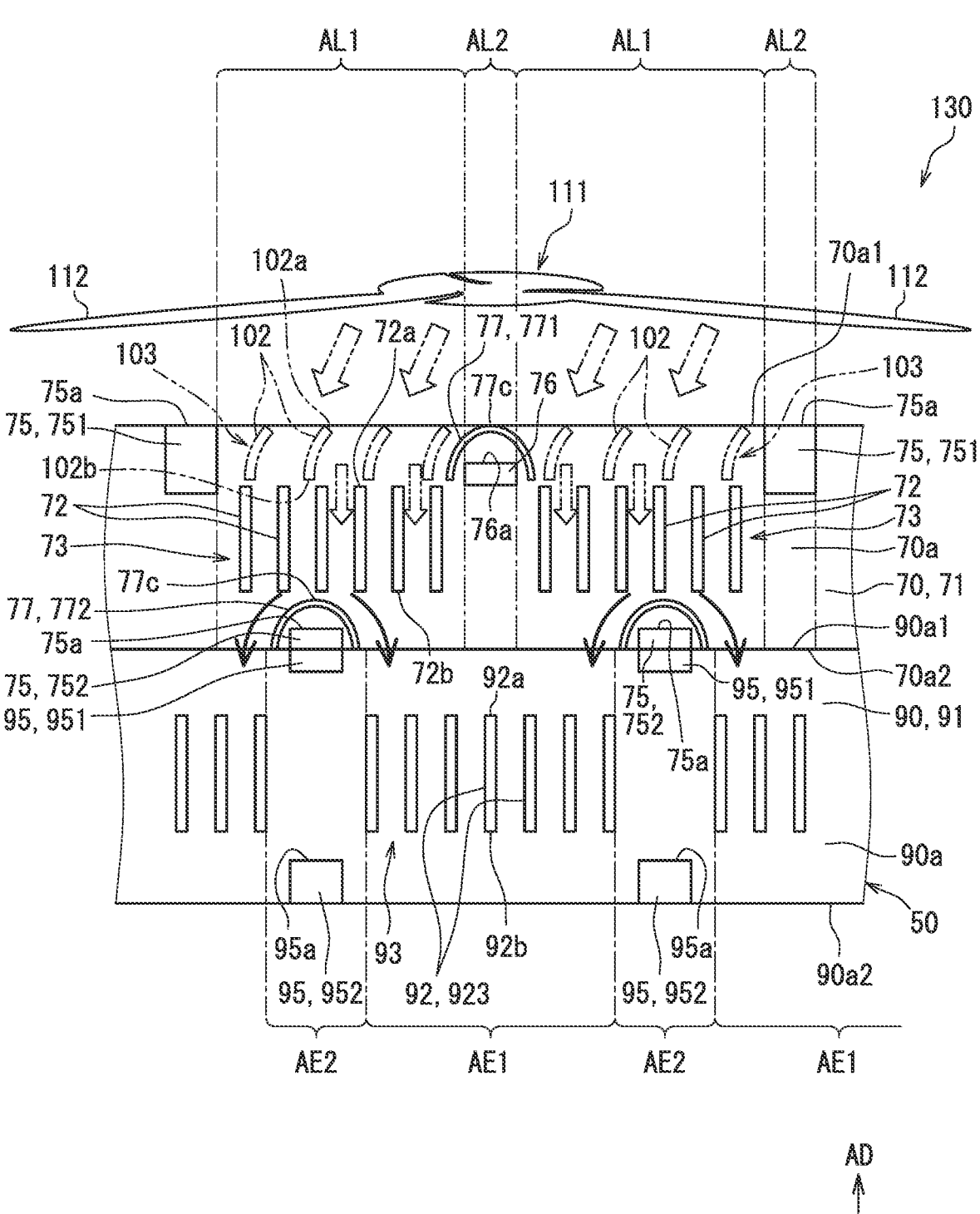
FIG. 34 is a partially developed view of outer peripheral surfaces of a motor and an inverter in a ninth embodiment.

As shown in FIG. 34, the motor housing 70 includes the exposed region guide plates 771 and the high heat region guide plates 772, and the fin cover 100 includes the cover fins 102. In the present embodiment, the exposed region guide plate 771 and the high heat region guide plate 772 have the same configurations as those of the fifth embodiment described above, and each of the cover fins 102 has the same configuration as that of the second embodiment described above. However, the cover fins 102 of the present embodiment regulate the swirling flow generated by the blower fan 111 to allow the swirling flow to flow parallel to the motor axis Cm. Each of the cover fins 102 has a flow regulation function and corresponds to the cover flow-regulation portion.

As in the second embodiment described above, the cover fin 102 is inclined in the circumferential direction CD with respect to the motor axis Cm and is bent to bulge toward an upstream side in the axial direction AD. The cover fin 102 is curved as a whole. The cover fin 102 is bent such that the swirling flow becomes a parallel flow by passing through the cover fin 102. For example, in the cover fin 102, the fin downstream end 102b is located at a position separated from the fin upstream end 102a toward a downstream side of the swirling flow in the circumferential direction CD. In the cover fin 102, an upstream portion extending from the fin upstream end 102a toward the downstream side is inclined with respect to the motor axis Cm. Meanwhile, a downstream portion extending from the fin downstream end 102b toward the upstream side extends parallel to the motor axis Cm.

As in the second embodiment described above, the cover fin 102 is in contact with the outer peripheral surface 70a of the motor housing 70. The cover fin 102 is in a state of spanning the cover main body 101 and the housing main body 71 in the radial direction RD. That is, the cover fin 102 is in a state of spanning the inner peripheral surface 100b and the outer peripheral surface 70a in the radial direction RD. The cover fin 102 is in a state of partitioning the cover passage 104 in the circumferential direction CD.

As in the second embodiment described above, the multiple cover fins 102 are arranged in the circumferential direction CD. The multiple cover fins 102 have the same size and shape. The multiple cover fins 102 are the same in, for example, a length dimension in the axial direction AD, a length dimension in the circumferential direction CD, a bending degree, a plate thickness dimension, and a protrusion dimension from the inner peripheral surface 100b. The multiple cover fins 102 are arranged at equal intervals in the circumferential direction CD. The multiple cover fins 102 are disposed such that air flows passing through the cover fins 102 are parallel to one another.

The multiple cover fins 102 are provided at positions aligned with the exposed region AL1 in the axial direction AD. The multiple cover fins 102 extend along the exposed region AL1 in the circumferential direction CD. The cover fin group 103 and the motor fin group 73 are arranged in the axial direction AD.

When the swirling flow generated by the blower fan 111 is sent toward the EDS 50, the air reaching the cover fin 102 is regulated into a parallel flow flowing in parallel to the motor axis Cm by flowing toward the motor fin 72 along the plate surfaces of the cover fin 102. The parallel flow regulated by the cover fin 102 in this way flows along the motor fin 72 in the axial direction AD. In particular, in a configuration in which the motor fin 72 is the parallel fin 723, the parallel flow regulated by the cover fin 102 easily flows along the parallel fin 723. Therefore, since the swirling flow is regulated into the parallel flow by the cover fin 102, the parallel flow reaching the motor fin 72 is less likely to be disturbed. In this way, the parallel flow regulated by the cover fin 102 passes through the motor fin 72, and thus a pressure loss of the air passing through the motor fin 72 is less likely to be increased.

According to the present embodiment, in the fin cover 100, the cover fin 102 provided on the inner peripheral surface 100b has the flow regulation function. In the configuration, the air that is to flow to the motor fin 72 can be regulated by the cover fin 102 to enhance the heat radiation effect of the motor fin 72. Therefore, for example, even if the number and the size of the motor fins 72 and the inverter fins 92 are limited in order to avoid the EDS 50 from becoming too heavy for the eVTOL 10, a decrease in the effect of cooling the EDS 50 can be reduced by the cover fins 102. Therefore, both the cooling effect enhancement and weight reduction of the EDS 50 can be achieved by the cover fins 102. In this way, the EDS 50 and the EDS unit 130 suitable for mounting on the eVTOL 10 can be implemented by the cover fins 102.

According to the present embodiment, the cover fin 102 is inclined in the circumferential direction CD with respect to the motor axis Cm and is bent to bulge toward the upstream side in the axial direction AD. In the configuration, the upstream portion of the cover fin 102 extending from the fin upstream end 102a does not extend in a direction that intersects the swirling flow and extends along the swirling flow. Therefore, the swirling flow that has reached the fin upstream end 102a does not flow to hit the plate surfaces of the cover fin 102, and is likely to flow along the plate surfaces of the cover fin 102. Moreover, since the swirling flow flows toward the fin downstream end 102b along the plate surfaces of the cover fin 102, a direction of the swirling flow that gradually travels along bending of the cover fin 102 is likely to change. Therefore, the flow regulation function of the cover fin 102 can be enhanced.

According to the present embodiment, the cover fin 102 is in a state of spanning the inner peripheral surface 100b and the outer peripheral surface 70a in the radial direction RD. In the configuration, the inner peripheral surface 100b restricts the swirling flow from flowing at a position radially outward with respect to the cover fin 102. Therefore, a configuration in which the flow regulation function based on the cover fin 102 is easily exerted can be implemented.

According to the present embodiment, the multiple cover fins 102 regulate the swirling flows passing therethrough to be parallel to each other. In the configuration, the swirling flow can be regulated into the parallel flow in the entire region in which the multiple cover fins 102 are provided in the circumferential direction CD. For example, the parallel flow regulated by the cover fin group 103 easily reaches the motor fin group 73. The parallel flow passes through the motor fin group 73 in this way, and thus the air flow at a periphery of the motor fin group 73 is less likely to be disturbed, so that a cooling effect of the motor fin group 73 can be enhanced by the cover fins 102.

Tenth Embodiment

In a tenth embodiment, a shroud includes a shroud flow-regulation portion. Configurations, operations, and effects not particularly described in the tenth embodiment are the same as those in the third and fifth embodiments described above. In the tenth embodiment, differences from the third and fifth embodiments described above will be mainly described.

Figure 35:
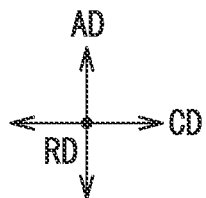
FIG. 35 is a partially developed view of outer peripheral surfaces of a motor and an inverter in a tenth embodiment.

As shown in FIG. 35, the motor housing 70 includes the exposed region guide plates 771 and the high heat region guide plates 772, and the shroud 120 includes the shroud fins 122. In the present embodiment, the exposed region guide plate 771 and the high heat region guide plate 772 have the same configurations as those of the fifth embodiment described above, and each of the shroud fins 122 has the same configuration as that of the third embodiment described above. However, the shroud fins 122 of the present embodiment regulate the swirling flow generated by the blower fan 111 to allow the swirling flow to flow parallel to the motor axis Cm. The shroud fin 122 has a flow regulation function and corresponds to the shroud flow-regulation portion.

As in the second embodiment described above, the shroud fin 122 is inclined in the circumferential direction CD with respect to the motor axis Cm and is bent to bulge toward an upstream side in the axial direction AD. The shroud fin 122 is curved as a whole. The shroud fin 122 is bent such that the swirling flow becomes a parallel flow by passing through the shroud fin 122. For example, in the shroud fin 122, the fin downstream end 122b is located at a position separated from the fin upstream end 122a toward a downstream side of the swirling flow in the circumferential direction CD. In the shroud fin 122, an upstream portion extending from the fin upstream end 122a toward the downstream side is inclined with respect to the motor axis Cm. Meanwhile, a downstream portion extending from the fin downstream end 122b toward the upstream side extends parallel to the motor axis Cm.

As in the third embodiment described above, the multiple shroud fins 122 are arranged in the circumferential direction CD. The multiple shroud fins 122 have the same size and shape. The multiple shroud fin 122 are the same in, for example, a length dimension in the axial direction AD, a length dimension in the circumferential direction CD, a bending degree, a plate thickness dimension, and a protrusion dimension from the inner peripheral surface 100b. The multiple shroud fins 122 are arranged at equal intervals in the circumferential direction CD. The multiple shroud fins 122 are disposed such that air flows passing through the shroud fins 122 are parallel to one another.

The multiple shroud fins 122 are provided at positions aligned with the exposed region AL1 in the axial direction AD. The multiple shroud fins 122 extend along the exposed region AL1 in the circumferential direction CD. The shroud fin group 123 and the motor fin group 73 are arranged in the axial direction AD.

When the swirling flow generated by the blower fan 111 is sent toward the EDS 50, the air reaching the shroud fin 122 is regulated into a parallel flow flowing in parallel to the motor axis Cm by flowing toward the motor fin 72 along the plate surfaces of the shroud fin 122. In this way, the parallel flow regulated by the shroud fin 122 flows along the motor fins 72 in the axial direction AD. In particular, in a configuration in which the motor fin 72 is the parallel fin 723, the parallel flow regulated by the shroud fin 122 easily flows along the parallel fin 723. Therefore, since the swirling flow is regulated into the parallel flow by the shroud fin 122, the parallel flow reaching the motor fin 72 is less likely to be disturbed. In this way, the parallel flow regulated by the shroud fin 122 passes through the motor fin 72, and thus a pressure loss of the air passing through the motor fin 72 is less likely to be increased.

According to the present embodiment, in the fin cover 100, the shroud fin 122 provided on the inner peripheral surface 100b has the flow regulation function. In the configuration, the air that is to flow to the motor fin 72 can be regulated by the shroud fin 122 to enhance the heat radiation effect of the motor fin 72. Therefore, for example, even if the number and the size of the motor fins 72 and the inverter fins 92 are limited in order to avoid the EDS 50 from becoming too heavy for the eVTOL 10, a decrease in the effect of cooling the EDS 50 can be reduced by the shroud fins 122. Therefore, both the cooling effect enhancement and weight reduction of the EDS 50 can be achieved by the shroud fins 122. In this way, the EDS 50 and the EDS unit 130 suitable for mounting on the eVTOL 10 can be implemented by the shroud fins 122.

According to the present embodiment, the shroud fin 122 is inclined in the circumferential direction CD with respect to the motor axis Cm and is bent to bulge toward the upstream side in the axial direction AD. In the configuration, the upstream portion of the shroud fin 122 extending from the fin upstream end 122a does not extend in a direction that intersects the swirling flow and extends along the swirling flow. Therefore, the swirling flow that has reached the fin upstream end 122a does not flow to hit the plate surfaces of the shroud fin 122, and is likely to flow along the plate surfaces of the shroud fin 122. Moreover, since the swirling flow flows toward the fin downstream end 122b along the plate surfaces of the shroud fin 122, a direction of the swirling flow that gradually travels along bending of the shroud fin 122 is likely to change. Therefore, the flow regulation function of the shroud fin 122 can be enhanced.

According to the present embodiment, the shroud fin 122 is in a state of spanning the inner peripheral surface 120b and the outer peripheral surface 70a in the radial direction RD. In the configuration, the inner peripheral surface 120b restricts the swirling flow from flowing at a position radially outward with respect to the shroud fin 122. Therefore, a configuration in which the flow regulation function based on the shroud fins 122 is easily exerted can be implemented.

According to the present embodiment, the multiple shroud fins 122 regulate the swirling flows passing therethrough to be parallel to one another. In the configuration, the swirling flow can be regulated into the parallel flow in the entire region in which the multiple shroud fins 122 are provided in the circumferential direction CD. For example, the parallel flow regulated by the shroud fin group 123 easily reaches the motor fin group 73. The parallel flow passes through the motor fin group 73 in this way, and thus the air flow at a periphery of the motor fin group 73 is less likely to be disturbed, so that a cooling effect of the motor fin group 73 can be enhanced by the shroud fins 122.

Other Embodiments

The disclosure in the present description is not limited to the illustrated embodiments. The disclosure encompasses the illustrated embodiments and modifications thereof by those skilled in the art. For example, the disclosure is not limited to the combination of components and elements described in the embodiments, and various modifications and implementations can be performed. The disclosure may be implemented in various combinations. The disclosure may have an additional portion that can be added to the embodiments. The disclosure encompasses the omission of components and elements of the embodiments. The disclosure encompasses the replacement or combination of components, elements between one embodiment and other embodiments. The disclosed technical scope is not limited to the description of the embodiments. The disclosed technical scope is indicated by the description of the claims, and should be construed to include all changes within the meaning and range equivalent to the description of the claims.

<Configuration Group A>

In each of the embodiments described above, the inclined fin such as the forward inclined fin 721 may be inclined with respect to the radial line in the circumferential direction CD. For example, in the first embodiment described above, the forward inclined fin 721 may be inclined in the circumferential direction CD with respect to the radial line in the motor housing 70 such that one plate surface faces the radially inner side and the other plate surface faces the radially outer side. In the configuration, the swirling flow easily flows between the outer peripheral surface 70a and the plate surface of the forward inclined fin 721 facing the radially inner side.

In each of the embodiments described above, the pair of plate surfaces of the radiation fin such as the motor fin 72 may not extend parallel to each other. For example, in the first embodiment described above, at least one of the pair of plate surfaces of the forward inclined fin 721 may be bent to bulge outward.

In each of the embodiments described above, the inclined fin may be bent to bulge toward a downstream side in the axial direction AD. For example, in the first embodiment described above, the forward inclined fin 721 may be curved to bulge toward the downstream side in the axial direction AD.

In each of the embodiments described above, a part of the inclined fin may be inclined in the circumferential direction with respect to the rotation axis. That is, the entire inclined fins may not have to be the inclined portion. For example, in the first embodiment described above, the forward inclined fin 721 may be bent to bulge in the circumferential direction CD. In the forward inclined fin 721, an upstream portion extending from the fin upstream end 72a toward the downstream side extends straight in a direction inclined with respect to the motor axis Cm to form the inclined portion. Meanwhile, a downstream portion extending from the fin downstream end 72b toward the upstream side is a parallel portion extending straight parallel to the motor axis Cm.

In each of the embodiments described above, the multiple inclined fins may be arranged in the axial direction AD. For example, in the first embodiment described above, the multiple motor fins 72 may include the forward inclined fins 721, and the multiple inverter fins 92 may include the forward inclined fins 921. These forward inclined fins 721 and 921 may be arranged in the circumferential direction CD.

<Configuration Group B>

In each of the embodiments described above, the guide portion such as the motor guide plate 77 may be inclined in the circumferential direction CD with respect to the radial line. For example, in the fifth embodiment described above, by setting the motor guide plate 77 to be inclined in the circumferential direction CD with respect to the radial line, a surface portion of the guide plate outer surface 77c that extends from one guide plate end portion 77b may face the radially inner side, and a surface portion of the guide plate outer surface 77c that extends from the other guide plate end portion 77b may face the radially outer side.

In each of the embodiments described above, the motor guide portion may not have a plate shape. For example, in the fifth embodiment described above, a columnar column portion extending from the outer peripheral surface 70a toward the radially outer side may serve as the guide portion. In the configuration, a surface portion of the columnar portion facing the upstream side in the outer peripheral surface corresponds to the guide surface as the guide plate outer surface 77c.

In each of the embodiments described above, the guide portion may have any shape as long as the guide surface is inclined in the circumferential direction CD with respect to the motor axis Cm. For example, in the fifth embodiment described above, one of the pair of guide plate end portions

77b may be disposed on an upstream side with respect to the other. The guide plate outer surface 77c may extend from the guide plate top portion 77a toward one side in the circumferential direction CD. In the configuration, the guide plate outer surface 77c includes only one guide plate end portion 77b.

In each of the embodiments described above, in the configuration in which the guide portion is located at a position overlapped with the second region in the axial direction AD, at least a part of the guide portion may be located at a position aligned with the second region in the axial direction AD. For example, in the fifth embodiment described above, the entire exposed region guide plate 771 may be provided in the hidden region AL2. In the configuration, the width dimension of the exposed region guide plate 771 in the circumferential direction CD is equal to or less than the width dimension of the hidden region AL2. The exposed region guide plate 771 may be provided on an upstream side with respect to the hidden region AL2 in the axial direction AD. In the configuration, the exposed region guide plate 771 is in a state of covering the entire hidden region AL2 from the upstream side.

For example, in the fifth embodiment described above, the high heat region guide plate 772 may be provided in the low heat region AE2 in a manner of not protruding into the exposed region AL1. That is, the entire high heat region guide plate 772 may be provided in the low heat region AE2. The high heat region guide plate 772 may be in a state of protruding from the low heat region AE2 in the circumferential direction CD. In the configuration, the width dimension of the high heat region guide plate 772 in the circumferential direction CD is larger than the width dimension of the low heat region AE2.

In each of the embodiments described above, the first coupling portion such as the downstream flange 752 and the second coupling portion such as the upstream flange 951 may be arranged in the circumferential direction CD instead of being arranged in the axial direction AD. For example, in the fifth embodiment described above, the high heat region guide plate 772 may be in a state of spanning between the downstream flange 752 and the upstream flange 951 in the circumferential direction CD. Further, the guide portion may cover at least a part of the obstacle from the upstream side.

In each of the embodiments described above, the drive device unit such as the EDS unit 130 may be provided with both the cover guide portion such as the cover guide plate 107 and the shroud guide portion such as the shroud guide plate 127. For example, in the sixth embodiment described above, the shroud guide plate 127 may be provided at a position separated from the cover guide plate 107 in the circumferential direction CD.

<Configuration Group C>

In each of the embodiments described above, the drive device unit may be provided with both the cover flow-regulation portion such as the cover fin 102 and the shroud flow-regulation portion such as the shroud fin 122. For example, in the ninth embodiment described above, the cover fin 102 and the shroud fin 122 may be aligned with each other in the axial direction AD. In the configuration, both of the cover fin 102 and the shroud fin 122 exert a flow regulation effect.

In each of the embodiments described above, the cover flow-regulation portion and the shroud flow-regulation portion may have any shape as long as the cover flow-regulation portion and the shroud flow-regulation portion have the flow regulation function. For example, in the ninth embodiment described above, at least a part of the cover fin 102 may be inclined in the circumferential direction CD with respect to the motor axis Cm as long as the swirling flow can be regulated into the parallel flow. The cover fin 102 may not be inclined with respect to the motor axis Cm as long as the swirling flow can be regulated into the parallel flow. The cover fin 102 may not be bent to bulge in the circumferential direction CD as long as the swirling flow can be regulated into the parallel flow.

Similarly, in the tenth embodiment, at least a part of the shroud fin 122 may be inclined in the circumferential direction CD with respect to the motor axis Cm as long as the swirling flow can be regulated into the parallel flow. The shroud fin 122 may not be inclined with respect to the motor axis Cm as long as the swirling flow can be regulated into the parallel flow. The shroud fin 122 may not be bent to bulge in the circumferential direction CD as long as the swirling flow can be regulated into the parallel flow.

<Common>

In each of the embodiments described above, the motor housing 70 may be provided on the downstream side of the inverter housing 90. For example, the motor housing 70 may be provided between the inverter housing 90 and the blower fan 111 in the axial direction AD. In the EDS unit 130, the motor device 60 may be disposed between the blower fan 111 and the inverter device 80 in the axial direction AD, and the inverter device 80 may be disposed between the blower fan 111 and the motor device 60.

In each of the embodiments described above, the motor device 60 and the inverter device 80 may share the housing. For example, the motor 61 and the driver 81 may be accommodated in one housing. Both the motor 61 and the driver 81 may not be accommodated in the housing of the EDS 50. The housing only needs to accommodate a heat generator such as the motor 61 and the driver 81.

In each of the embodiments described above, the heat generator may be embedded in the housing as long as the heat generator is accommodated in the housing. For example, in the inverter device 80, the switch module 83 may be in a state of being embedded in the housing main body 91. In the configuration, the switch module 83 is provided between the outer peripheral surface 90a and the inner peripheral surface 90b in the inverter housing 90.

In each of the embodiments described above, a power source for rotating the blower fan 111 may not be the EDS 50. For example, the power source such as an electric motor different from the EDS 50 may be configured to rotate the blower fan 111. For example, in the fourth embodiment described above, the power source different from the EDS 50 may be provided on a side opposite to the EDS 50 with the blower fan 111 interposed therebetween in the axial direction AD. In this case, the rotation axis of the blower fan 111 also preferably coincides with the motor axis Cm.

In each of the embodiments described above, the air flow such as the swirling flow flowing along the outer peripheral surface of the EDS 50 may be an air flow generated by at least one of the rotor 20 and the blower fan 111. For example, the blower fan 111 may not be provided for the EDS 50, and in the configuration, the rotor 20 corresponds to a fan.

In each of the embodiments described above, the drive device unit such as the EDS unit 130 may be a unit including the drive device such as the EDS 50 and the fan such as the blower fan 111. For example, the drive device unit may include only the blower fan 111 of the blower fan 111 and the shroud 120. The drive device unit may be a unit including the rotor 20 in addition to the drive device and the fan.

In each of the embodiments described above, the fin cover 100 may be fixed to the housing such as the motor housing 70 by fixing tools such as bolts. The fin cover 100 may not be elastically deformable. The fin cover 100 may be located at a position separated from the radiation fin such as the motor fin 72 toward the radially outer side. The shroud 120 may be fixed to the fin cover 100. Further, the fin cover 100 and the shroud 120 may be integrally formed.

In each of the embodiments described above, the cover fin 102 may be provided on the downstream side of the radiation fin. For example, in the second embodiment described above, the cover fin 102 may be provided on at least one of the downstream side of the motor fin 72 and the downstream side of the inverter fin 92.

In each of the embodiments described above, the EDS 50 may not include the fin cover 100. That is, the fin cover 100 may not be attached to the housing such as the motor housing 70. The EDS unit 130 may not include the shroud 120. That is, the shroud 120 may not be attached to the blower fan 111.

In each of the embodiments described above, the eVTOL 10 may not be the tiltrotor aircraft. That is, in the eVTOL 10, the rotor 20 does not need to be tiltable. For example, in the eVTOL 10, the multiple rotors 20 may include a lift rotor 20 and a cruise rotor 20. In the eVTOL 10, for example, the lift rotor 20 drives when the eVTOL 10 moves upward, and the cruise rotor 20 drives when the eVTOL 10 moves forward.

In each of the embodiments described above, the flight vehicle on which the EDS 50 and the EDS unit 130 are mounted may not be a vertical take-off and landing aircraft. For example, the flight vehicle may be a rotorcraft or a fixed-wing aircraft. In the rotorcraft, a rotary blade corresponds to the rotor. In the fixed wing aircraft, a propeller corresponds to the rotor. The flight vehicle may be an unmanned aircraft on which a person does not ride.

In each of the embodiments described above, the flight controller 40 and the drive controller 54 are provided by a control system including at least one computer. The control system includes at least one processor that is hardware. When the processor is referred to as a hardware processor, the hardware processor can be implemented by (i), (ii), or (iii) to be described below.

(i) The hardware processor may be a hardware logic circuit. In this case, the computer is implemented by a digital circuit including many programmed logic units (gate circuits). The digital circuit may include a memory in which at least one of a program and data is stored. The computer may be implemented by an analog circuit. The computer may be implemented by a combination of the digital circuit and the analog circuit.

(ii) The hardware processor may be at least one processor core that executes a program stored in at least one memory. In this case, the computer is implemented by at least one memory and at least one processor core. The processor core is referred to as a CPU, for example. The memory is also referred to as a storage medium. The memory is a non-transitory and tangible storage medium non-temporarily storing "at least one of a program and data" readable by the processor.

(iii) The hardware processor may be a combination of (i) and (ii) described above. (i) and (ii) are arranged on different chips or a common chip.

That is, at least one of means and functions provided by the flight controller 40 can be provided by hardware alone, software alone, or a combination thereof.

<Features of Configuration Group A>

[Feature A1]

A drive device (50) for driving a rotor (20) of a flight vehicle (10) to rotate includes:

a heat generator (61, 81) configured to generate heat when driven to rotate the rotor;

a housing (70, 90) accommodating the heat generator and having an outer peripheral surface (70a, 90a) extending along a rotation axis (Cm) of a fan (20, 111) that sends a gas; and a radiation fin (72, 721, 722, 723, 92, 921, 923) extending along the outer peripheral surface in an axial direction (AD) in which the rotation axis extends, and configured to release the heat from the heat generator to the gas that flows along the outer peripheral surface due to rotation of the fan, and as the radiation fin, an inclined fin (721, 722, 921), at least a part of which is inclined in the circumferential direction (CD) of the rotation axis with respect to the rotation axis, is provided on the outer peripheral surface.

[Feature A2]

In the drive device according to feature A1, the fan is capable of generating a swirling flow in which the gas flows in a direction inclined in the circumferential direction with respect to the rotation axis, and as the inclined fin, a forward inclined fin (721), at least a part of which is inclined to extend along the swirling flow, is provided on the outer peripheral surface.

[Feature A3]

The drive device according to feature A1 or A2 further includes an obstacle (75, 751, 752, 95, 951, 952) provided on the outer peripheral surface and configured to restrict the gas from flowing in the axial direction, the outer peripheral surface includes an axial arrangement region (AL2) which is aligned with the obstacle in the axial direction and which is located on a side opposite to the fan with the obstacle interposed therebetween in the axial direction, and a circumferential arrangement region (AL1) which is aligned with the axial arrangement region in the circumferential direction, and at least a part of the inclined fin is inclined to guide the gas from the circumferential arrangement region to the axial arrangement region.

[Feature A4]

In the drive device according to any one of features A1 to A3, the outer peripheral surface includes a first heat region (AE1) to which the heat from the heat generator is applied and a second heat region (AE2) aligned with the first heat region in the circumferential direction and disposed such that a separation distance between the heat generator and the second heat region is larger than a separation distance between the heat generator and the first heat region, and at least a part of the inclined fin is inclined to guide the gas to the first heat region.

[Feature A5]

In the drive device according to feature A4, the inclined fin is provided at a position separated from the second heat region and the first heat region toward an upstream side in the axial direction, and at least a part of the inclined fin is inclined to extend toward the first heat region.

[Feature A6]

In the drive device according to feature A4 or A5, a heat generation member (83) constituting the heat generator is attached to an inner peripheral surface (80b) of the housing, the first heat region is a region located at a position overlapped with the heat generation member in a radial direction (RD) of the rotation axis, and the second heat region is a region located at a position not overlapped with the heat generation member in the radial direction.

[Feature A7]

In the drive device according to any one of features A4 to A6, the first heat region is a fin region in which the radiation fin is provided, and the second heat region is a finless region in which no radiation fin is provided.

[Feature A8]

In the drive device according to any one of features A1 to A7, in the inclined fin, at least an upstream portion extending from a fin upstream end (72a), which is an upstream-side end portion, toward a downstream side is inclined.

[Feature A9]

In the drive device according to any one of features A1 to A8, as the radiation fin, a parallel fin (923) extending parallel to the rotation axis is provided on the outer peripheral surface on a downstream side of the inclined fin with respect to a flow of the gas.

[Feature A10]

The drive device according to any one of features A1 to A9 further includes a housing cover (100) having a cover inner peripheral surface (100a) facing the outer peripheral surface and attached to the housing to cover the radiation fin from an outer peripheral side.

[Feature A11]

The drive device according to feature A10 further includes a cover guide portion (102) provided on the cover inner peripheral surface, protruding from the cover inner peripheral surface toward the outer peripheral surface (70a, 90a), and configured to guide the gas to the inclined fin.

[Feature A12]

A drive device unit (130) to be mounted on a flight vehicle (10) includes:

a drive device (50) configured to drive a rotor (20) of the flight vehicle to rotate; and a fan (20, 111) configured to rotate about a rotation axis (Cm) to send a gas and aligned with the drive device along the rotation axis, the drive device includes a heat generator (61, 81) configured to generate heat when driven to rotate the rotor, a housing (70, 90) accommodating the heat generator and having an outer peripheral surface (70a, 90a) extending along the rotation axis (Cm) of the fan (20, 111) that sends a gas, a radiation fin (72, 721, 722, 723, 92, 921, 923) extending along the outer peripheral surface (70a, 90a) in an axial direction (AD) in which the rotation axis extends, and configured to release the heat from the heat generator to the gas that flows along the outer peripheral surface due to rotation of the fan, and as the radiation fin, an inclined fin (721, 722, 921), at least a part of which is inclined in the circumferential direction (CD) of the rotation axis with respect to the rotation axis, is provided on the outer peripheral surface.

[Feature A13]

The drive device unit according to feature A12, further includes:

a shroud (120) aligned with the housing along the rotation axis and covering the fan from a radially outer side of the rotation axis; and a shroud guide portion (122) provided on an inner peripheral surface (120*b*) of the shroud, protruding from the inner peripheral surface toward the outer peripheral surface, and configured to guide the gas to the inclined fin.

<Features of Configuration Group B>

[Feature B1]

A drive device (50) for driving a rotor (20) of a flight vehicle (10) to rotate includes:

a heat generator (61, 81) configured to generate heat when driven to rotate the rotor;

a housing (70, 90) accommodating the heat generator and having an outer peripheral surface (70*a*, 90*a*) extending along a rotation axis (Cm) of a fan (20, 111) that sends air;

a radiation fin (72, 721, 722, 723, 92, 921, 923) extending along the outer peripheral surface in an axial direction (AD) in which the rotation axis extends, and configured to release the heat from the heat generator to a gas that flows along the outer peripheral surface due to rotation of the fan; and a guide portion (77, 771, 772, 97, 107) aligned with the radiation fin along the outer peripheral surface, and configured to guide the gas in a circumferential direction (CD) of the rotation axis to flow toward the radiation fin.

[Feature B2]

In the drive device according to feature B1, the guide portion has a guide surface (77*c*) that is bent to bulge toward an upstream side in the axial direction and extends toward the radiation fin in the circumferential direction.

[Feature B3]

In the drive device according to feature B2, multiple of the radiation fins are arranged in the circumferential direction, and the guide surface is in a state of spanning two of the radiation fins adjacent to each other in the circumferential direction.

[Feature B4]

In the drive device according to feature B3, the guide portion is connected to each of the two radiation fins spanned by the guide surface.

[Feature B5]

The drive device according to any one of features B1 to B4 further includes an obstacle (75, 752, 76, 95, 951) provided on the outer peripheral surface and configured to restrict the gas from flowing in the axial direction, and the guide portion is provided to cover the obstacle from an upstream side.

[Feature B6]

In the drive device according to feature B5, the housing includes a first housing (70) including a first coupling portion (752), and a second housing (90) including a second coupling portion (951), aligned with the first housing in the axial direction, and fixed to the first housing by coupling the first coupling portion and the second coupling portion to each other, and the guide portion is provided to cover the first coupling portion and the second coupling portion from an upstream side with the first coupling portion and the second coupling portion as the obstacle.

[Feature B7]

The drive device according to any one of features B1 to B6, further includes:

a downstream blocking portion (96) provided on a downstream side in the axial direction with respect to an upstream fin (72) that is the radiation fin and configured to block flow of the gas in the axial direction, and as the guide portion, a separation guide portion (774) provided at a position away from the downstream blocking portion toward the upstream fin and configured to guide, on the downstream side of the upstream fin, the gas in the circumferential direction to be separated from the downstream blocking portion is provided.

[Feature B8]

In the drive device according to any one of features B1 to B7, the outer peripheral surface is provided with a first region (AL1, AE1) in which multiple of the radiation fins are provided and to which the heat from the heat generator is released by the multiple radiation fins, and a second region (AL2, AE2) aligned with the first region in the circumferential direction, and the guide portion is provided at a position overlapped with the second region in the axial direction and guides the gas in the circumferential direction to flow toward the first region.

[Feature B9]

In the drive device according to feature B8, the first region is a high heat region (AE1) to which the heat from the heat generator is applied, the second region is a low heat region (AE2) aligned with the high heat region in the circumferential direction and disposed such that a separation distance between the heat generator and the low heat region is larger than a separation distance between the heat generator and the high heat region, and the guide portion is provided at a position overlapped with the low heat region in the axial direction and guides the gas in the circumferential direction to flow toward the high heat region.

[Feature B10]

In the drive device according to feature B9, the high heat region is a fin region in which the radiation fin is provided, and the low heat region is a finless region in which no radiation fin is provided.

[Feature B111]

In the drive device according to any one of features B1 to B110, as the guide portion, a housing guide portion (77, 771, 772, 97) included in the housing and provided on the outer peripheral surface is provided.

[Feature B12]

The drive device according to any one of features B1 to B111 further includes a housing cover (100) having an inner peripheral surface (100*b*) opposed to the outer peripheral surface and attached to the housing to cover the radiation fin from an outer peripheral side.

[Feature B13]

In the drive device according to feature B112, as the guide portion, a cover guide portion (107) provided on the inner peripheral surface is provided.

[Feature B14]

A drive device unit (130) to be mounted on a flight vehicle (10) includes:

a drive device (50) configured to drive a rotor (20) of the flight vehicle to rotate; and a fan (20, 111) configured to rotate about a rotation axis (Cm) to send a gas and aligned with the drive device along the rotation axis, and the drive device includes a heat generator (61, 81) configured to generate heat when driven to rotate the rotor, a housing (70, 90) accommodating the heat generator and having an outer peripheral surface (70a, 90a) extending along the rotation axis (Cm) of the fan (20, 111) that sends air, a radiation fin (72, 721, 722, 92, 921, 923) extending along the outer peripheral surface in an axial direction (AD) in which the rotation axis extends, and configured to release the heat from the heat generator to the gas that flows along the outer peripheral surface due to rotation of the fan, and a guide portion (77, 771, 772, 723, 97, 127) aligned with the radiation fin along the outer peripheral surface, and configured to guide the gas in a circumferential direction (CD) of the rotation axis to flow toward the radiation fin.

[Feature B15]

The drive device unit according to feature B14, further includes:

a shroud (120) aligned with the housing along the rotation axis and covering the fan from a radially outer side of the rotation axis, and as the guide portion, a shroud guide portion (127) provided on an inner peripheral surface (120b) of the shroud is provided.

<Features of Configuration Group C>

According to a feature C1 to be described below, a cover flow-regulation portion is provided on an inner peripheral surface of a housing cover. In the configuration, air flowing toward a radiation fin can be regulated by the cover flow-regulation portion to enhance a heat radiation effect of the radiation fin. Therefore, even if the number of radiation fins is limited to avoid the drive device from becoming too heavy for a flight vehicle, the effect of cooling the drive device can be enhanced by the cover flow-regulation portion. Therefore, both heat radiation effect enhancement and weight reduction of the drive device can be achieved by the cover flow-regulation portion.

[Feature C1]

A drive device (50) for driving a rotor (20) of a flight vehicle (10) to rotate includes:

a heat generator (61, 81) configured to generate heat when driven to rotate the rotor;

a housing (70, 90) accommodating the heat generator and having an outer peripheral surface (70a, 90a) extending along a rotation axis (Cm) of a fan (20, 111) that sends air;

a radiation fin (72, 721, 722, 92, 921, 923) extending along the outer peripheral surface in an axial direction (AD) in which the rotation axis extends, and configured to release the heat from the heat generator to a gas that flows along the outer peripheral surface due to rotation of the fan;

a housing cover (100) having an inner peripheral surface (100b) opposed to the outer peripheral surface and attached to the housing to cover the radiation fin from an outer peripheral side; and a cover flow-regulation portion (102) provided on the inner peripheral surface and configured to regulate the gas flowing toward the radiation fin to flow along the rotation axis.

[Feature C2]

In the drive device according to feature C1, the cover flow-regulation portion is bent to bulge toward an upstream side in the axial direction, and at least a part of the cover flow-regulation portion is inclined in a circumferential direction (CD) of the rotation axis with respect to the rotation axis.

[Feature C3]

In the drive device according to feature C1 or C2, the cover flow-regulation portion is in a state of spanning the inner peripheral surface and the outer peripheral surface in a radial direction (RD) of the rotation axis.

[Feature C4]

In the drive device according to any one of features C1 to C3, multiple of the cover flow-regulation portions are arranged in the circumferential direction, and the multiple cover flow-regulation portions regulate air flows passing through the multiple cover flow-regulation portions to be parallel to one another.

[Feature C5]

A drive device unit (130) to be mounted on a flight vehicle (10) includes:

a drive device (50) configured to drive a rotor (20) of the flight vehicle to rotate; and a fan (20, 111) configured to rotate about a rotation axis (Cm) to send a gas and aligned with the drive device along the rotation axis, and the drive device includes a heat generator (61, 81) configured to generate heat when driven to rotate the rotor, a housing (70, 90) accommodating the heat generator and having an outer peripheral surface (70a, 90a) extending along the rotation axis (Cm) of the fan (20, 111) that sends air, a radiation fin (72, 721, 722, 92, 921, 923) extending along the outer peripheral surface in an axial direction (AD) in which the rotation axis extends, and configured to release the heat from the heat generator to the gas that flows along the outer peripheral surface due to rotation of the fan, a shroud (120) aligned with the housing along the rotation axis and covering the fan from a radially outer side of the rotation axis, and a shroud flow-regulation portion (122) provided on an inner peripheral surface (120b) of the shroud and configured to regulate the gas flowing toward the radiation fin to flow along the rotation axis.

[Feature C6]

In the drive device unit according to feature C5, the shroud flow-regulation portion is bent to bulge toward an upstream side in the axial direction, and at least a part of the shroud flow-regulation portion is inclined in a circumferential direction (CD) of the rotation axis with respect to the rotation axis.

[Feature C7]

In the drive device according to feature C5 or C6, multiple of the shroud flow-regulation portions are arranged in the circumferential direction, and the multiple shroud flow-regulation portions regulate air flows passing through the multiple shroud flow-regulation portions to be parallel to one another.

What is claimed is:

1. A drive device configured to drive a rotor of a flight vehicle to rotate the rotor, the drive device comprising:
   a heat generator configured to generate heat when driven to rotate the rotor;
   a housing accommodating the heat generator and having an outer peripheral surface extending along a rotation axis of a fan, the fan configured to send air;
   a radiation fin extending along the outer peripheral surface in an axial direction in which the rotation axis extends, and configured to release the heat from the heat generator to a gas that flows along the outer peripheral surface due to rotation of the fan;
   a guide portion aligned with the radiation fin along the outer peripheral surface, and configured to guide the gas in a circumferential direction of the rotation axis to flow toward the radiation fin; and
   an obstacle provided on the outer peripheral surface and configured to restrict the gas from flowing in the axial direction, wherein
   the guide portion is provided to cover the obstacle from an upstream side.

2. The drive device according to claim 1, wherein the guide portion has a guide surface that is bent to bulge toward an upstream side in the axial direction and extends toward the radiation fin in the circumferential direction.

3. The drive device according to claim 2, wherein a plurality of the radiation fins are arranged in the circumferential direction, and
   the guide surface spans two of the radiation fins adjacent to each other in the circumferential direction.

4. The drive device according to claim 3, wherein the guide portion is connected to each of the two radiation fins spanned by the guide surface.

5. The drive device according to claim 1, wherein the housing includes
   a first housing including a first coupling portion, and
   a second housing including a second coupling portion, aligned with the first housing in the axial direction, and fixed to the first housing by coupling the first coupling portion and the second coupling portion to each other, and
   the guide portion is provided to cover the first coupling portion and the second coupling portion as the obstacle from an upstream side with the first coupling portion and the second coupling portion.

6. The drive device according to claim 1, further comprising:
   a downstream blocking portion provided on a downstream side in the axial direction with respect to an upstream fin that is the radiation fin and configured to block flow of the gas in the axial direction, wherein
   the guide portion is a separation guide portion provided at a position away from the downstream blocking portion toward the upstream fin and configured to guide, on the downstream side of the upstream fin, the gas in the circumferential direction to be separated from the downstream blocking portion.

7. A drive device configured to drive a rotor of a flight vehicle to rotate the rotor, the drive device comprising:
   a heat generator configured to generate heat when driven to rotate the rotor;

a housing accommodating the heat generator and having an outer peripheral surface extending along a rotation axis of a fan, the fan configured to send air;
   a radiation fin extending along the outer peripheral surface in an axial direction in which the rotation axis extends, and configured to release the heat from the heat generator to a gas that flows along the outer peripheral surface due to rotation of the fan; and
   a guide portion aligned with the radiation fin along the outer peripheral surface, and configured to guide the gas in a circumferential direction of the rotation axis to flow toward the radiation fin, wherein
   the outer peripheral surface includes
      a first region in which a plurality of the radiation fins are provided and to which the heat from the heat generator is to be released by the plurality of radiation fins, and
      a second region aligned with the first region in the circumferential direction, and
   the guide portion is provided at a position overlapped with the second region in the axial direction and to guide the gas in the circumferential direction to flow toward the first region.

8. The drive device according to claim 7, wherein the first region is a high heat region to which the heat from the heat generator is to be applied,
   the second region is a low heat region aligned with the high heat region in the circumferential direction, such that a separation distance between the heat generator and the low heat region is larger than a separation distance between the heat generator and the high heat region, and
   the guide portion is provided at a position overlapped with the low heat region in the axial direction to guide the gas in the circumferential direction to flow toward the high heat region.

9. The drive device according to claim 8, wherein the high heat region is a fin region in which the radiation fin is provided, and
   the low heat region is a finless region in which no radiation fin is provided.

10. The drive device according to claim 1, wherein the guide portion includes a housing guide portion included in the housing and provided on the outer peripheral surface.

11. The drive device according to claim 1, further comprising:
   a housing cover having an inner peripheral surface opposed to the outer peripheral surface and attached to the housing to cover the radiation fin from an outer peripheral side.

12. The drive device according to claim 11, wherein the guide portion includes a cover guide portion provided on the inner peripheral surface.

13. A drive device unit to be mounted on a flight vehicle, the drive device unit comprising:
   a drive device configured to drive a rotor of the flight vehicle to rotate the rotor; and
   a fan configured to rotate about a rotation axis to send a gas and aligned with the drive device along the rotation axis, wherein
   the drive device includes
      a heat generator configured to generate heat when driven to rotate the rotor,
      a housing accommodating the heat generator and having an outer peripheral surface extending along the rotation axis of the fan, the fan configured to send air, a radiation fin extending along the outer peripheral surface in an axial direction in which the rotation axis extends, and configured to release the heat from the heat generator to the gas that flows along the outer peripheral surface due to rotation of the fan, and a guide portion aligned with the radiation fin along the outer peripheral surface, and configured to guide the gas in a circumferential direction of the rotation axis to flow toward the radiation fin, and an obstacle provided on the outer peripheral surface and configured to restrict the gas from flowing in the axial direction, and the guide portion is provided to cover the obstacle from an upstream side.

14. The drive device unit according to claim 13, further comprising:

a shroud aligned with the housing along the rotation axis and covering the fan from a radially outer side of the rotation axis, wherein the guide portion includes a shroud guide portion provided on an inner peripheral surface of the shroud.

\* \* \* \* \*